United States Patent [19]
Suzuki et al.

[11] Patent Number: 5,983,045
[45] Date of Patent: Nov. 9, 1999

[54] IMAGE FORMING APPARATUS FOR FORMING PLURAL TONER IMAGES ON PHOTOSENSITIVE MEMBER AND FOR TRANSFERRING TONER IMAGES ONTO TRANSFER MATERIAL COLLECTIVELY

[75] Inventors: Kazuo Suzuki, Yokohama; Takao Honda, Mishima; Yoshito Mizoguchi, Kawasaki; Nobuaki Itakura, Mishima, all of Japan

[73] Assignee: Canon Kabushiki Kaisha, Tokyo, Japan

[21] Appl. No.: 08/969,834

[22] Filed: Nov. 13, 1997

[30] Foreign Application Priority Data

| Nov. 14, 1996 | [JP] | Japan | 8-318836 |
| Nov. 15, 1996 | [JP] | Japan | 8-320856 |
| Nov. 15, 1996 | [JP] | Japan | 8-320857 |
| Jul. 3, 1997 | [JP] | Japan | 9-193092 |

[51] Int. Cl.$^6$ ............................................. G03G 15/043
[52] U.S. Cl. ................................ 399/51; 399/40; 399/50; 399/178
[58] Field of Search ................................ 399/39, 40, 46, 399/50, 51, 53, 177, 178; 358/475, 300

[56] References Cited

U.S. PATENT DOCUMENTS

| 4,349,268 | 9/1982 | Hirata . |
| 4,416,533 | 11/1983 | Tokunaga et al. . |
| 4,511,240 | 4/1985 | Suzuki et al. . |
| 4,564,287 | 1/1986 | Suzuki et al. . |
| 4,572,651 | 2/1986 | Komatsu et al. . |
| 4,583,839 | 4/1986 | Suzuki . |
| 4,660,961 | 4/1987 | Kuramoto et al. . |
| 4,755,850 | 7/1988 | Suzuki et al. . |
| 5,671,468 | 9/1997 | Yamamoto et al. ................ 399/169 |

FOREIGN PATENT DOCUMENTS

| 56-012650 | 2/1981 | Japan . |
| 56-144452 | 11/1981 | Japan . |
| 56-144562 | 11/1981 | Japan . |
| 58-080653 | 5/1983 | Japan . |
| 05197253 | 8/1993 | Japan . |

*Primary Examiner*—Matthew S. Smith
*Attorney, Agent, or Firm*—Fitzpatrick, Cella, Harper & Scinto

[57] ABSTRACT

The present invention aims to improve image quality in an image forming apparatus in which plural color toner images are formed on a photosensitive member and the toner images are collectively transferred onto a transfer material, and provides such an image forming apparatus that includes a first charge member for charging the photosensitive member, a digital optical system for exposing image information on the photosensitive member, a first developing device for inversion-developing a first latent image formed on the photosensitive member with first toner, a second charge member for charging the photosensitive member developed by the first developing member, a second developing member for developing a second latent image formed on the photosensitive member by exposing second image information onto the charged photosensitive member, with second toner, and a transfer means for collectively transferring first and second toner images formed on the photosensitive member onto a transfer material, and wherein an exposure amount of each pixel at a non-image portion in second exposure is made substantially equal to or greater than an exposure amount at a non-image portion in first exposure.

13 Claims, 36 Drawing Sheets

FIG. 3A
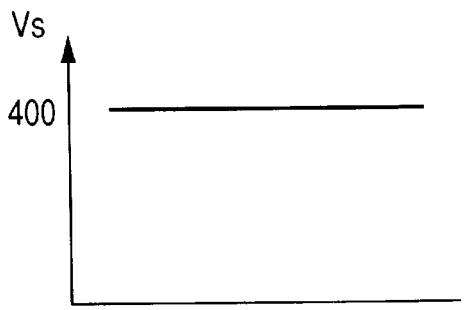
FIG. 3D
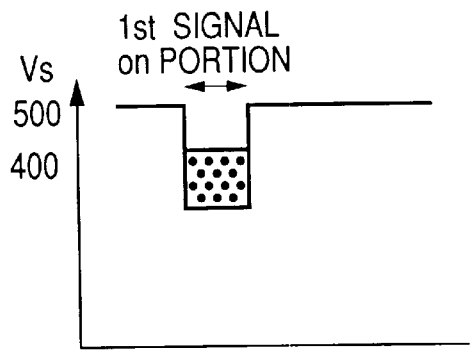
FIG. 3B
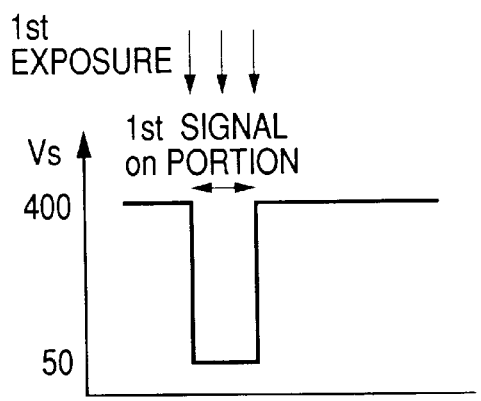
FIG. 3E
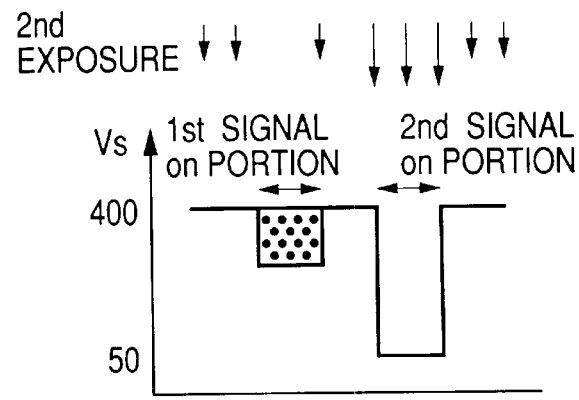
FIG. 3C
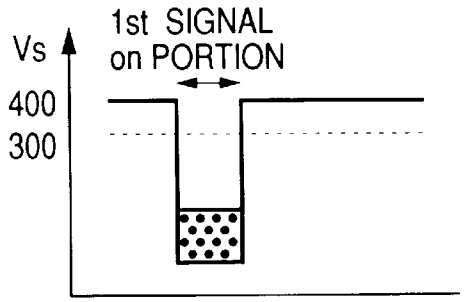
FIG. 3F
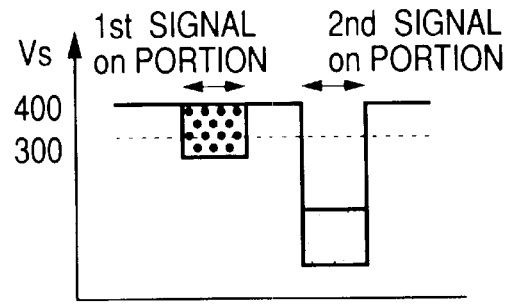
 1st DEVELOPING TONER
 2nd DEVELOPING TONER

EMBODIMENT 1

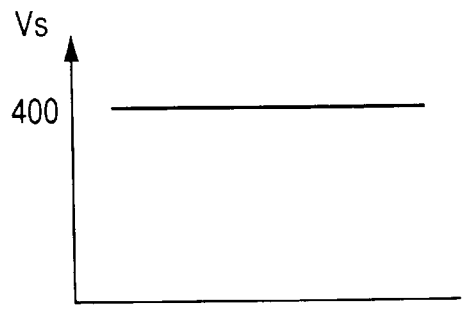
FIG. 9A
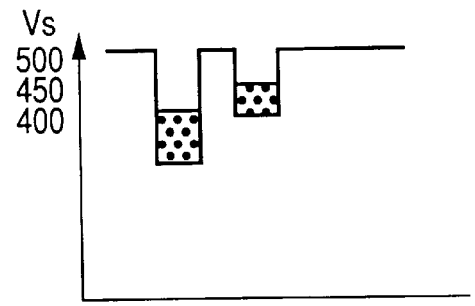
FIG. 9D
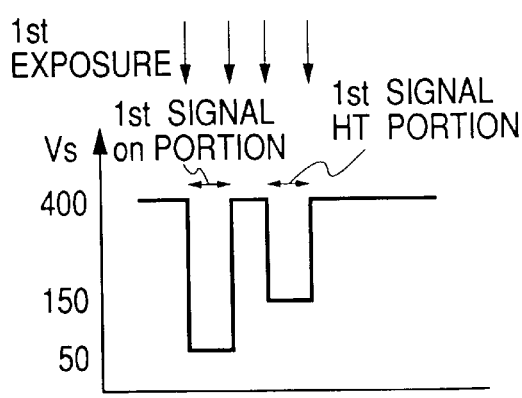
FIG. 9B
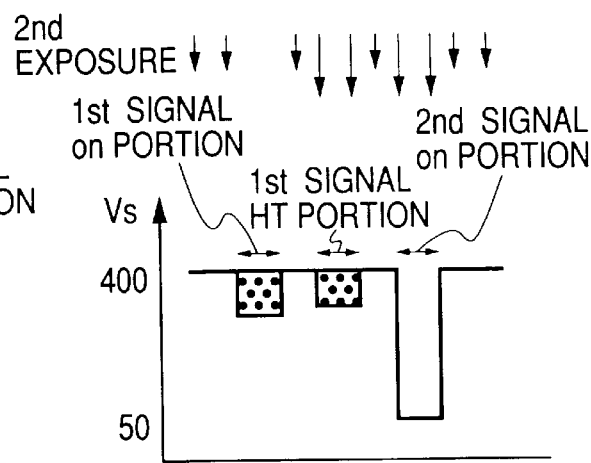
FIG. 9E
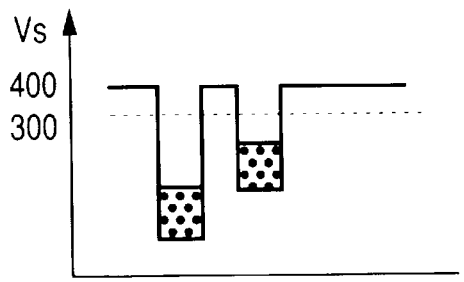
FIG. 9C
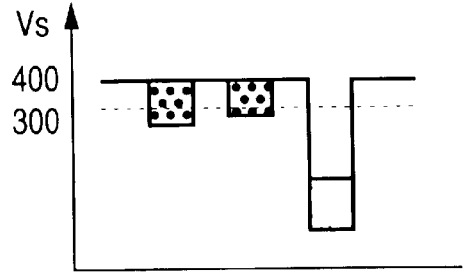
FIG. 9F
 1st DEVELOPING TONER
 2nd DEVELOPING TONER FIG. 12A
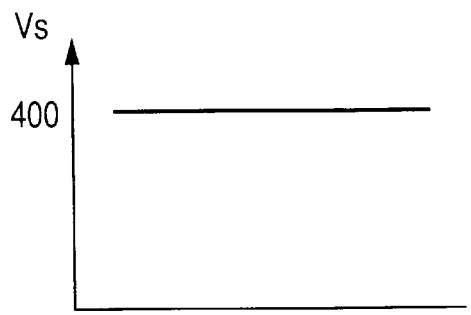
FIG. 12B
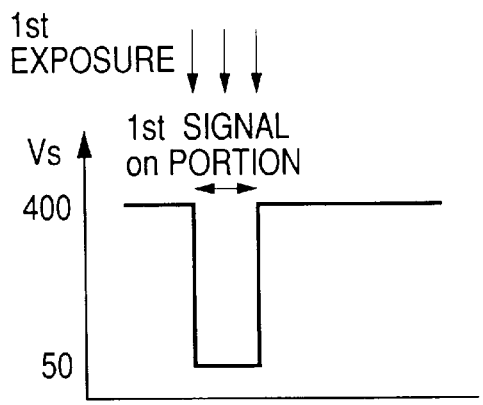
FIG. 12C
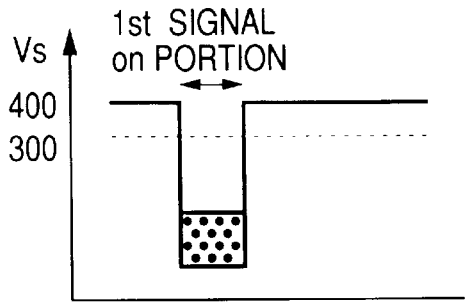
FIG. 12D
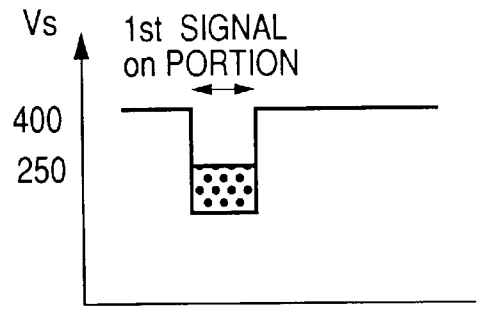
FIG. 12E
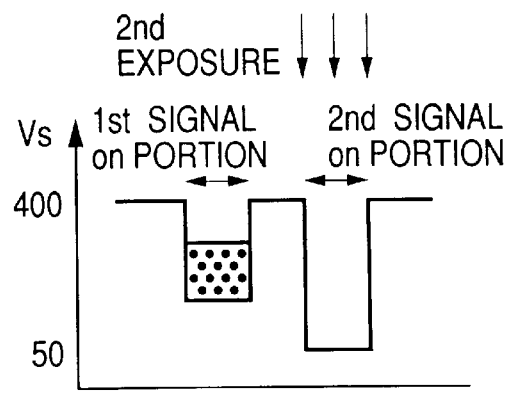
FIG. 12F
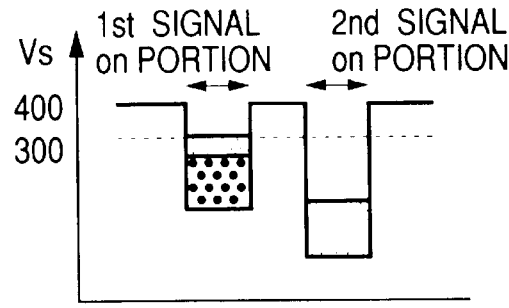
 1st DEVELOPING TONER
 2nd DEVELOPING TONER

IMAGE FORMING APPARATUS FOR FORMING PLURAL TONER IMAGES ON PHOTOSENSITIVE MEMBER AND FOR TRANSFERRING TONER IMAGES ONTO TRANSFER MATERIAL COLLECTIVELY

BACKGROUND OF THE INVENTION

1. Field of the Invention

The present invention relates to an image forming apparatus such as a laser beam printer, an electrostatic recording apparatus and the like, and more particularly, it relates to an image forming apparatus in which multi-color printing can be performed.

2. Related Background Art

In recent image forming techniques, different color visualized images or different information images have been composed on a single sheet, and, to this end, image forming apparatuses having a plurality of developing devices have been in the market. Among these techniques, a technique in which while a latent image bearing member is being rotated by one revolution latent images are visualized with plural colors by using two or more developing devices and at the same time the visualized images are transferred onto a sheet has been proposed. For example, U.S. Pat. Nos. 4,572,651 and 4,416,533 disclose a technique in which development is performed by applying DC bias to two developing device to generate constant electric fields. These Patents mainly disclose a method for forming a latent image but do not teach problems during the development.

On the other hand, U.S. Pat. No. 4,349,268 and Japanese Patent Application Laid-Open No. 56-144452 disclose a technique in which second color development is performed by using AC developing bias with non-contact development, and Japanese Patent Application Laid-Open No. 56-12650 discloses a technique in which non-contact development is performed by using DC bias. These techniques aim to prevent second color developer from rubbing a first color developed image, thereby preventing distortion of the image. Incidentally, the Japanese Patent Application Laid-Open No. 56-144452 does not teach or disclose potential of the first color developed image at all.

As mentioned above, in the conventional image forming apparatuses for forming a plurality of developed images, the technique in which second development is effected not to distort the previously developed image is used.

Similarly, U.S. Pat. No. 4,660,961 discloses a technique in which potential of a latent image to be firstly developed is increased (level-up). In this technique, after a first color developed image is formed, by uniformly charging an entire surface of a latent image bearing member with polarity same as that of developer, the potential of the latent image to be firstly developed can be substantially the same as potential of a non-image portion, so that distortion of the firstly formed image can effectively be prevented. An image forming apparatus using this technique is called as a one-pass multi-color print image forming apparatus of negative-negative re-charging type which has recently been investigated widely.

Further, recently, particularly in a field of high speed image forming apparatuses, a multi-color image forming apparatus in which amorphous silicone having high durability is used in a photosensitive member has been studied.

However, in the above-mentioned conventional techniques, there arises the following problem.

In some photosensitive members, since electrostatic capacity thereof becomes great, sufficient charging cannot be achieved by the re-charging, and, due to limitation regarding compactness and cheapness of the image forming apparatus, a re-charger having sufficient ability cannot be used. Thus, also in the above-mentioned negative-negative re-charging process, in dependence upon the construction of the photosensitive member and the image forming apparatus, since the potential of the latent image to be firstly developed cannot be substantially the same as the potential of the non-image portion, the first color developed image is distorted during the second color development, or density unevenness or fogging occurs during the second development.

FIGS. 12A to 12F show steps of an example of a conventional image forming process. In each of FIGS. 12A to 12F, surface potential of a photosensitive member is schematically shown.

In FIG. 12A, the photosensitive member is charged by a corona charger to +400V, for example. Then, in FIG. 12B, first exposure is effected regarding the photosensitive member on the basis of a first image signal to reduce surface potential of an exposure portion to +50V (at the maximum), for example, thereby forming a first electrostatic latent image. Then, in FIG. 12C, the exposure portion is inversion-developed by applying developing bias voltage (for example, +300V: shown by the dotted line) to a sleeve of a first developing device.

After first development, in FIG. 12D, re-charging is performed. In this case, as mentioned above, in dependence upon the construction of the photosensitive member and the image forming apparatus, the first developing image portion cannot be charged sufficiently while suppressing increase in potential of the first developing non-image porion. For example, the first developed image portion is charged merely to 250V, for example. Thus, if, in FIG. 12E, exposure responding to second image information is performed, and, in FIG. 12F, inversion-development is performed by applying developing bias voltage (for example, +300V: shown by the dotted line) to a sleeve of a second developing device, second developer will be developed also at the first developing image portion, thereby causing color-mixing.

If the bias voltage of the second developing device is selected to, for example, +200V to prevent the color-mixing, sufficient second developing density cannot be obtained, and, since a difference between the developing bias and the potential of the first developing non-image area also becomes great (200V), reversal toner having polarity opposite to desired polarity will be developed. Even the toner having desired polarity, unless the potential of the photosensitive member is greater than the developing bias potential by about 100V, the toner is developed. Thus, in this example, it is desirable that the potential of the second developing non-image portion becomes 400V greater than the developing bias by 100V at the first developing portion and the first non-developing portion. That is to say, after re-charging, the surface potential of the drum at the second development position must be converged regarding the first developing non-image portion and the first developing image portion.

As a means for solving the above problem, it is considered that the construction and bias of the re-charger are selected appropriately. FIG. 13 is a graph showing test results regarding relations between current applied to a corotron wire of the re-charger and drum surface potentials at the first developing non-image portion and the first developing image portion after the re-charging. From FIG. 13, it can be seen that it is difficult to converge the first developing non-image portion and the first developing image portion by the corotron re-charger (this is referred to as "re-charge convergence" hereinafter).

Alternatively, it is considered that a scorotron re-charger is used as a re-charger so that drum direction current flowing through the first developing non-image portion is reduced and drum direction current flowing through the first developing image portion is maintained. FIG. 14 is a graph showing test results regarding relations between voltage applied to a grid and drum surface potentials at the first developing non-image portion and the first developing image portion after the re-charging. As can be seen from FIG. 14, when the voltage applied to the grid becomes substantially the same as the first developing non-image portion, the first developing image portion can be sufficiently charged while suppressing the potential of the first developing non-image portion, thereby improving the convergence.

However, in such grid voltage, since great drum direction current is required for sufficiently increasing the potential of the first developing image portion after re-charging, a larger-sized re-charger must be provided, resulting in disadvantage regarding the cost and compactness (inner space) of the apparatus. This is true particularly when an amorphous silicone drum having great specific inductive capacity (hard to be charged) is used.

As a further method, there has been proposed a technique in which, after first development, uniform exposure is effected in a process prior to second exposure, and potential of a latent image for a first color developed image is made substantially the same as a non-development portion. However, in this technique, since a uniform exposure means must be provided for the process prior to the second exposure, disadvantage regarding the cost and compactness of the apparatus is arisen.

SUMMARY OF THE INVENTION

An object of the present invention is to provide a multi-color image forming apparatus which is compact and cheap and in which a previously developed image is not distorted in second and other developments and density unevenness and fog are not appeared in the second and other developments, regardless of the kind of a photosensitive member and ability of a re-charger.

To achieve the above object, according to the present invention, there is provided an image forming apparatus in which plural color toner images are formed on a photosensitive member and the toner images are collectively transferred onto a transfer material, the image forming apparatus comprising a first charge means for charging the photosensitive member, a digital optical means for exposing image information on the photosensitive member, a first developing means for inversion-developing a first latent image formed on the photosensitive member with first toner, a second charge means for charging the photosensitive member developed by the first developing means, a second developing means for developing a second latent image formed on the photosensitive member by exposing second image information onto the charged photosensitive member, with second toner, and a transfer means for collectively transferring first and second toner images formed on the photosensitive member onto a transfer material. Wherein an exposure amount of pixel unit at a non-image portion in second exposure is made substantially equal to or greater than an exposure amount at the non-image portion in first exposure.

BRIEF DESCRIPTION OF THE DRAWINGS

FIGS. 3A, 3B, 3C, 3D, 3E and 3F are schematic views each showing a condition of drum surface potential in a two-color image forming process according to the first embodiment;

FIGS. 9A, 9B, 9C, 9D, 9E and 9F are schematic views each showing a condition of drum surface potential in a two-color image forming process according to a fourth embodiment of the present invention;

FIGS. 12A, 12B, 12C, 12D, 12E and 12F are schematic views each showing a condition of drum surface potential in a two-color image forming process in a conventional technique;

DETAILED DESCRIPTION OF THE PREFERRED EMBODIMENTS (First Embodiment)

Figure 1:
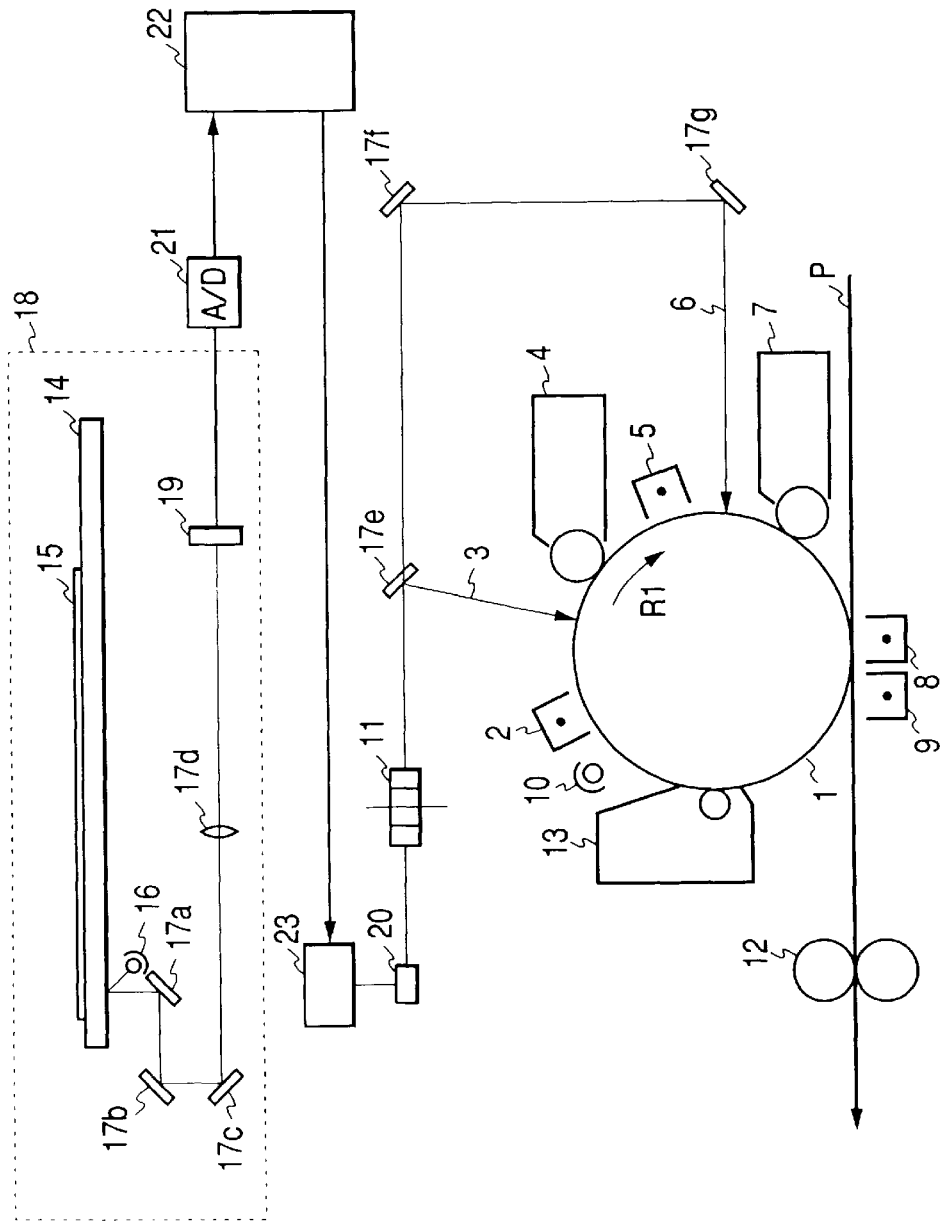
FIG. 1 is a schematic constructional view of a two-color image forming apparatus according to a first embodiment of the present invention.

FIG. 1 shows an example of a two-color image forming apparatus according to the present invention. A photosensitive member (photosensitive drum) 1 as an electrostatic latent bearing member is constituted by a cylindrical conductive substrate and a photo-conductive layer coated on the cylindrical substrate and is rotated in a direction shown by the arrow R1. Around the photosensitive drum 1 (in order along the rotational direction thereof), there are disposed a first scorotron charger 2 for uniformly charging a surface of the photosensitive drum 1, a first exposure means for reading an original and for exposing the photosensitive drum 1 with laser light 3 in response to a first image signal proportional to density of one of two color-decomposed images to thereby form a first electrostatic image, and a first developing device 4 for forming a first toner image by adhering toner to the first electrostatic image.

There are also provided a second scorotron charger (referred to as "re-charger" hereinafter) for charging the photosensitive drum 1 on which the first toner image was formed, a second exposure means for exposing the photosensitive drum 1 with laser light 6 in response to a second image signal proportional to density of the other of the two color-decomposed images to thereby form a second electrostatic image, and a second developing device 7 for forming a second toner image by adhering toner to the second electrostatic image. Further, there are provided a corona transfer charger 8 for transferring superimposed color images formed on the photosensitive drum 1 onto a transfer sheet (transfer material) P, an electrostatic separation charger 9 for separating the transfer sheet P to which the superimposed color images were transferred from the photosensitive drum 1, a cleaning device 13 for removing residual toner from the photosensitive drum 1 after the superimposed color images were transferred, and a pre-exposure lamp 10 for removing residual charges remaining on the photosensitive drum 1.

After the transfer sheet P to which the superimposed color images were transferred is separated from the photosensitive drum 1, the transfer sheet is conveyed to a fixing device 12, where the toner images are fixed to a surface of the transfer sheet to obtain a desired print image. Thereafter, the transfer sheet is discharged out of the image forming apparatus.

An image scanner portion 18 serves to scan an original rested on an original glass support 14 by using an illumination lamp 16 and to convert image information into an electric signal by using a photo-electric converting element 19. Light reflected from the original scanned by the illumination lamp 16 is introduced into a lens through mirrors 17a, 17b and 17c, and then is focused on the photo-electric converter 19 including red, green and blue filters therein. After an electric signal having red, green and blue components outputted by the photo-electric converter 19 is changed to a digital form by an A/D converter 21, the digital signal is sent to a signal processing portion 22 as a color decomposing portion, where the signal is converted into image signals proportional to image densities of red and black components.

The red image signal (first image signal) and the black image signal (second image signal) are sent to a laser driver (signal generating portion) 23, and turning ON/OFF a laser 20 in response to the red and black image signals. Laser light 3 emitted in response to the red image signal (first image information) serves to write a first electrostatic latent image on the photosensitive drum 1 through a polygon mirror 11 and a mirror 17e, and laser light 6 emitted by adding a predetermined amount to an amount corresponding to the black image signal serves to write a second electrostatic latent image on the photosensitive drum 1 through the polygon mirror 11 and mirrors 17f, 17g.

In the illustrated embodiment, the photosensitive drum 1 is formed from an amorphous silicone drum having high durability and long service life by using a photosensitive layer made of material having specific dielectric capacity $\in$ of 8 or more. However, particularly regarding one-pass two-color image forming apparatus of negative-negative re-charging type as described in the illustrated embodiment, in the amorphous silicone drum, it was difficult to re-charge a latent image for a first color developed image to potential substantially the same as potential of non-development portion (referred to as "re-charge convergence" hereinafter), in comparison with other photosensitive drum such as an OPC drum and the like.

In order to improve the re-charge convergence, in the negative-negative re-charging system, it is necessary that the first image developing portion is charged much more than the first non-image portion (i.e., drum direction current much more than the first non-image portion is applied to the first image developing portion). Corona current discharged from a re-charging discharge wire is divided into drum direction current flowing in a drum direction and shield direction current flowing to a charger shield. When the corona current is constant, a ratio between the drum direction current and the shield direction current depends upon resistance values in the respective directions. Although shield direction resistance is normally unchanged, drum direction resistance is varied with surface potential, presence/absence of toner and amount of toner. That is to say, since the drum direction current in the re-charging is changed in dependence upon a condition of the first development, the charge potential is also changed in dependence upon the condition of the first development.

Figure 2:
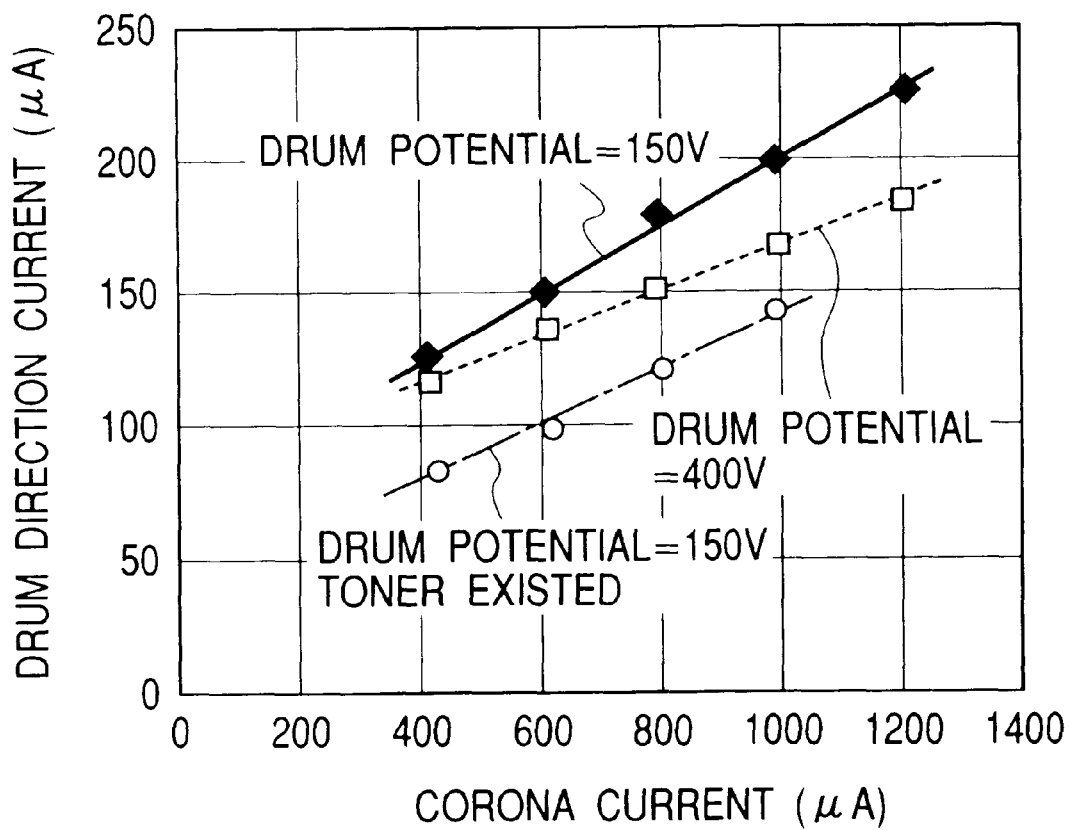
FIG. 2 is a graph showing test results regarding a relation between a first developing condition and drum direction current.

FIG. 2 shows test results showing a relation between the first development condition and the drum direction current. It is assumed that drum potential of the first developing non-image portion and drum potential of toner on the image portion are 400V and 150V, respectively, and these conditions are compared with a no-toner condition (drum potential=150V). First of all, comparing the condition of the first developing non-image portion (drum potential=400V) with the no-toner condition (drum potential=150V), in the no-toner condition in which the drum surface potential is smaller, greater drum direction current flows than the 400V condition regarding the same corona current, and it can be seen that the drum direction current ratio is (400V condition):(150V condition)≅4.5:5.5.

Then, in the same surface potential, comparing the toner-existed condition (drum potential=150V) with the no-toner condition (drum potential=150V), in the toner-existed condition, smaller drum direction current flows than the no-toner condition regarding the same corona current, and it can be seen that the drum direction current ratio is (no-toner):(toner-existed) ≅6:4. That is to say, in the negative-negative re-charging system, regarding the surface potential, greater direction current flows toward the first developing image portion (for example, toner existed, drum potential=150V) than the first developing non-image portion (drum potential=400V), and, this direction is advantageous for the re-charge convergence. However, in the viewpoint of the presence/absence of toner, this direction is disadvantageous for the re-charge convergence.

The entire re-charge convergence is determined by the both factors, and, in the above test results, it can be seen from the graph of FIG. 2 that the ratio is (first developing non-image portion):(first developing image portion)≅5.5:4.5 and the potential is not converged. Further, from the above graph, it can be assumed that, if the greater corona current is applied, the relation will be reversed and the potential will be converged at last. However, to do so, the greater charger is required, thereby affecting a bad influence upon the cost and compactness of the apparatus.

The above-mentioned relation is varied with kind and amount of toner and setting of potential more or less, but causes a fundamental problem in the negative—negative re-charging system. To solve this problem, it is considered that a re-charger having high charging ability is used. However, since such a re-charger is expensive and requires large installation space and large power source, it is not effective. Further, although it is considered that another exposure means operated after the re-charging and before second exposure is provided to make the potential of the latent image for the first color developed image substantially the same as the potential of the non-development portion, since this method requires another exposure means, it is not advantageous regarding cost and compactness of the apparatus.

Thus, in the illustrated embodiment, the second exposure means also acts as uniform exposure means operated after re-charging. With this arrangement, since any element is not added, a multi-color image forming apparatus having an advantage regarding cost and compactness can be obtained. Further, since the convergence after re-charging is not required, reasonable re-charging can be effected, and the re-charger itself is cheap and requires no great installation space, and current and voltage applied to the re-charger can be reduced.

FIGS. 3A to 3F show steps of an image forming process in a two-color image forming mode of the illustrated embodiment. Each step schematically shows surface potential of the photosensitive member (drum).

In FIG. 3A, the photosensitive drum is charged to +400V, for example, by the corona charger, and then, in FIG. 3B, first exposure regarding image information is effected to reduce the surface potential of the exposure portion to +50V, for example, thereby forming a first electrostatic latent image. Then, in FIG. 3C, by applying developing bias voltage (for example, +300V shown by the dotted line) to a sleeve of the first developing device, the exposure portion is nversion-developed. After the first development, in FIG. 3D, the re-charging is effected. In this case, voltage (500V) greater than desired target potential (400V) is applied to a grid at the second developing position to control to charge the first developing non-image portion to 500V, for example. In this case, the first developing portion is charged to 400V, for example.

Figure 4A:
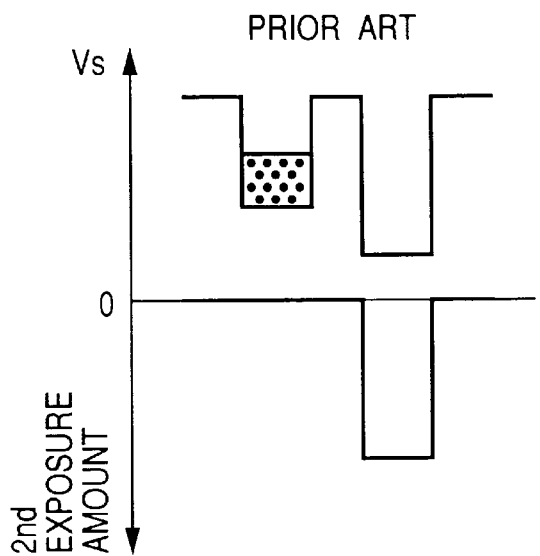
FIG. 4A is a schematic view showing conditions of drum surface potential and a second image exposure amount in a second image exposure step of the two-color image forming process in a conventional technique.
Figure 4B:
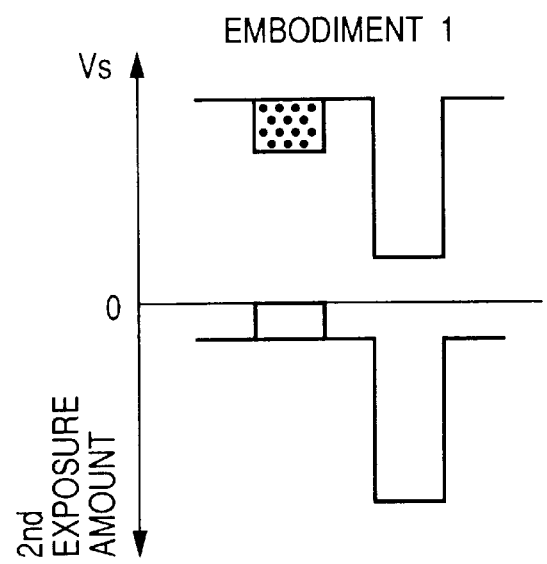
FIG. 4B is a schematic view showing conditions of drum surface potential and a second image exposure amount in a second image exposure step of the two-color image forming process in the first embodiment.

Then, in FIG. 3E, when exposure corresponding to the second image information is effected, exposure greater than the other by a predetermined exposure amount (for example, exposure amount for reducing the potential of the first developing non-image portion by 100V) is effected regarding an area where the first image information is OFF. That is to say, in this case, small or weak exposure is effected even regarding an area where the second image signal is OFF, so that the potential of the first developing image portion becomes 400V and the potential of the first developing non-image portion also becomes 400V, and, if the second image signal is ON, the exposure is effected so that the potential of the first developing non-image portion becomes 50V. FIGS. 4A and 4B show relations in the second exposure process between the conventional technique (FIG. 4A) and the first embodiment (embodiment 1) of the present invention (FIG. 4B).

Thereafter, by applying bias of 300V to the second sleeve in the exposure process, the second developer (toner) can be prevented from mixing with the first developing portion and can be prevented from being developed on the first and second non-image portions, and, thus, two-color image formation obtaining sufficient density of the second image can be achieved.

(Second Embodiment)

Next, a second embodiment of the present invention will be explained with reference to FIGS. 5 and 6. The second embodiment shows an example of an image forming apparatus in which a third color is obtained by developing first developer (toner) and second developer on the same area.

Even when the exposure same as the first embodiment is effected regarding the first developing image portion, due to transmission (permeability) of the first developing toner, the surface potential cannot be reduced sufficiently to become the second developing density insufficient. Thus, in the second embodiment, the exposure amount upon ON of the second exposure is increased to reduce the potential of the first developing image portion to 50V, without changing the fact that small exposure amount is added regarding the entire surface of the drum regardless of ON/OFF of the second exposure.

Figure 5:
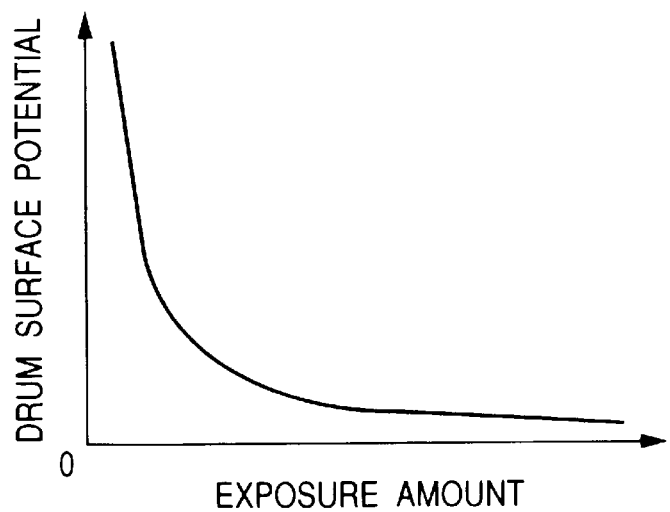
FIG. 5 is a graph showing a relation between an exposure amount on a photosensitive member and surface potential of the photosensitive member in a second embodiment of the present invention.

In this case, although the greater light amount is applied to the drum surface in an area of the first developing non-image portion where the second signal is ON, since the amorphous silicone photosensitive drum used in the second embodiment has property (unlike to the OPC photosensitive drum) that a feature regarding "exposure amount" vs "drum surface potential" does not change in the exposure amount exceeding a certain amount as shown in FIG. 5, the potential of the first non-image, second exposure portion becomes substantially the same as the potential of the first development, second exposure portion (45V).

Figure 6:
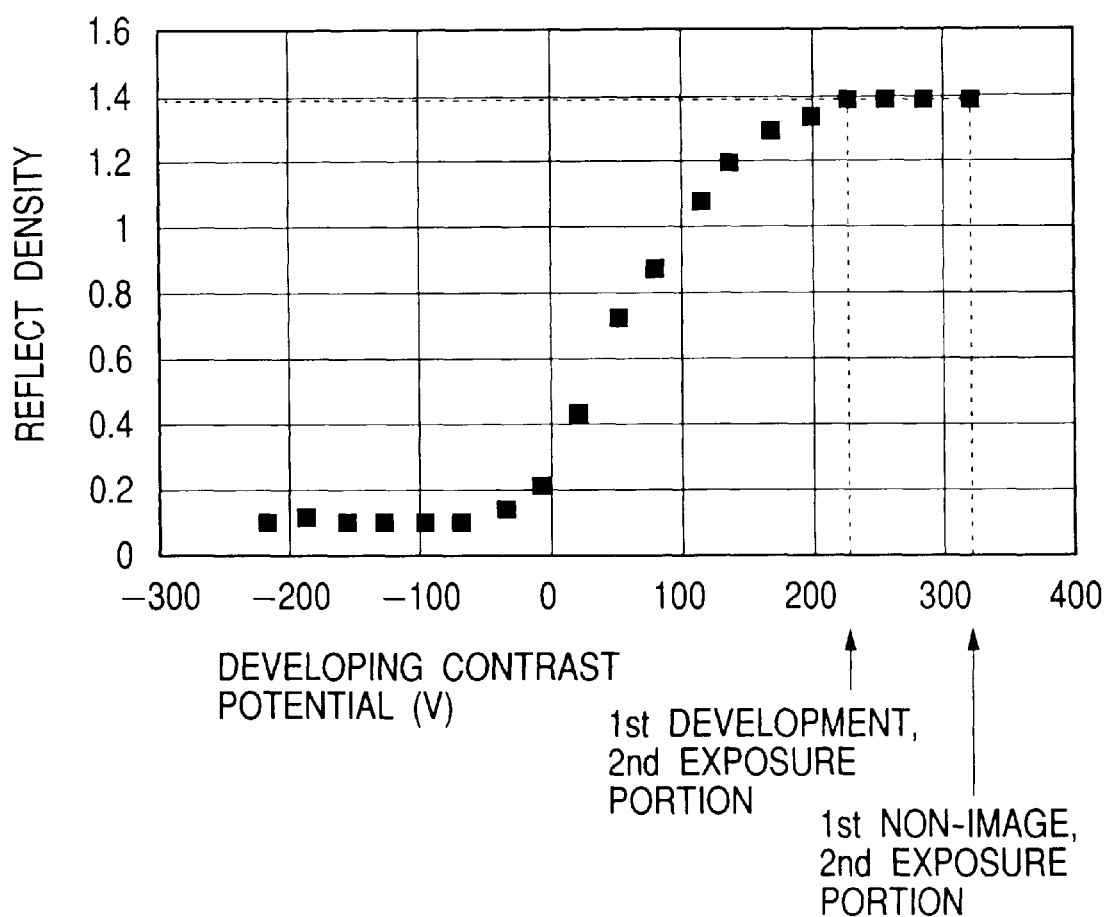
FIG. 6 is a graph showing a relation between developing contrast potential and density in a second developing device in the second embodiment.

Even such a difference to this extent, although the difference in density in the second development does not arise any problem, for example, as shown in FIG. 6, by setting the second developing device so that a relation between developing contrast potential and reflect density indicates a feature which is hard to be influenced upon the difference in potential between the first development, second exposure portion and the first non-image, second exposure portion, further improvement can be achieved. This developing feature can be changed, for example, by changing a wave-form of the developing bias or a rotational speed of the developing sleeve.

As a result, the potential of the first image, second non-exposure portion can be 400V, the potential of the first non-image, second non-exposure portion can be 400V, the potential of the first non-image, second exposure portion can be 45V and the potential of the first image, second exposure portion can be 50V, and, by selecting the bias voltage applied to the sleeve of the second developing device to 300V, the second developer can be prevented from entering into the first developing portion and can be prevented from being developed on the second image, non-image porion, and, thus, satisfactory second image density can be obtained and satisfactory density can be obtained even when two colors are superimposed.

(Third Embodiment)

Figure 7:
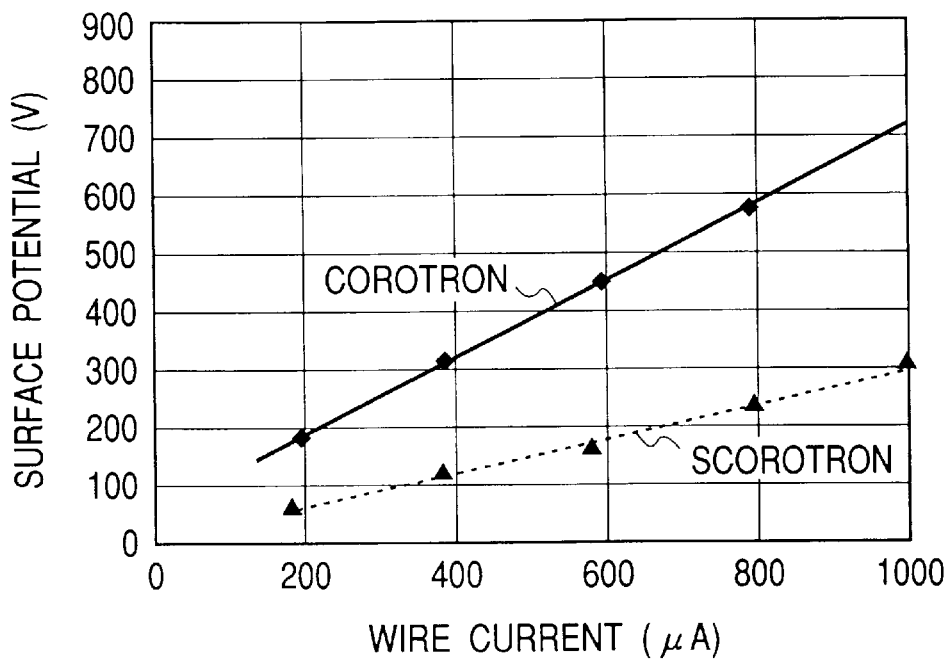
FIG. 7 is a graph showing a relation between drum surface potential and wire current applied to a corotron charger and a scorotron charger used in a third embodiment of the present invention.
Figure 8:
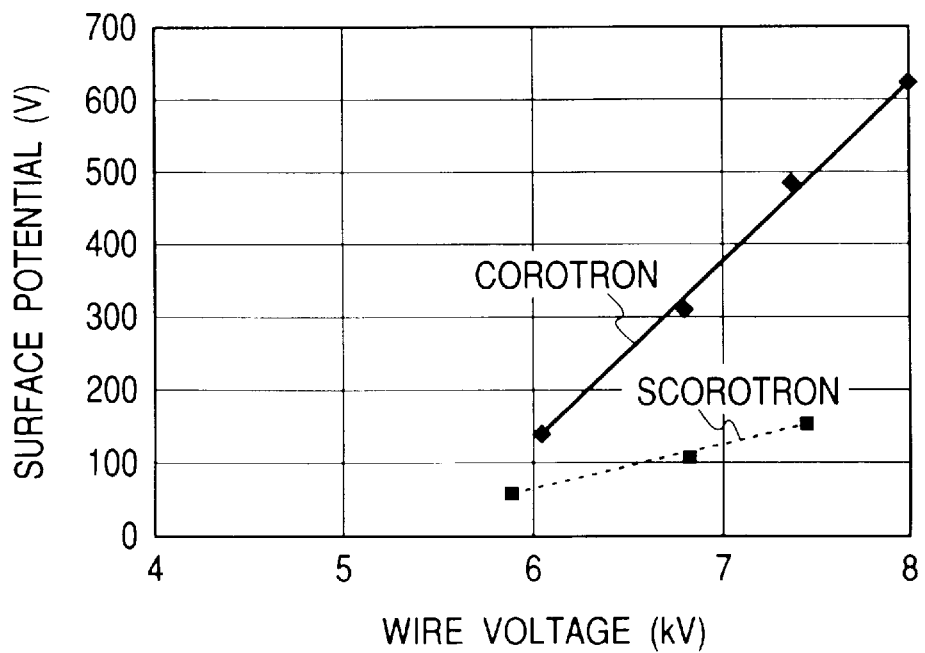
FIG. 8 is a graph showing a relation between drum surface potential and wire voltage applied to the corotron charger and the scorotron charger used in the third embodiment.

Next, a third embodiment of the present invention will be explained with reference to FIGS. 7 and 8.

In this third embodiment, in lieu of the scorotron charger, a corotron charger is used as the re-charger. Since the corotron charger has no grid, it is relatively simple and cheap, and, since charges generated by the discharge wire does not flow into the grid, the corotron charger has good charging ability. FIG. 7 is a graph showing a relation between wire current (current applied to the wire) and drum surface potential regarding both the corotron charger and the scorotron charger under the same condition, and FIG. 8 is a graph showing a relation between wire voltage and the drum surface potential regarding both the corotron charger and the scorotron charger under the same condition. From FIGS. 7 and 8, it can be seen that, when the corotron charger is used, smaller current and voltage is required to obtain the same drum surface potential in comparison with the scorotron charger; namely, it can be seen that the corotron charger has better charging ability.

Figure 13:
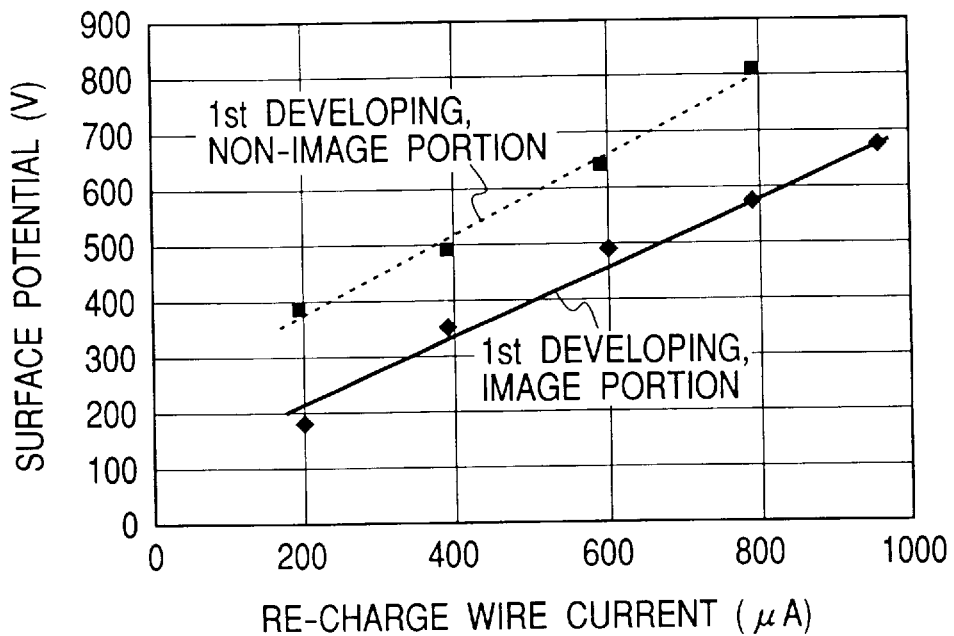
FIG. 13 is a graph showing test results regarding a relation between drum surface potential and wire current applied to a corotron re-charger in the conventional two-color image forming process.
Figure 14:
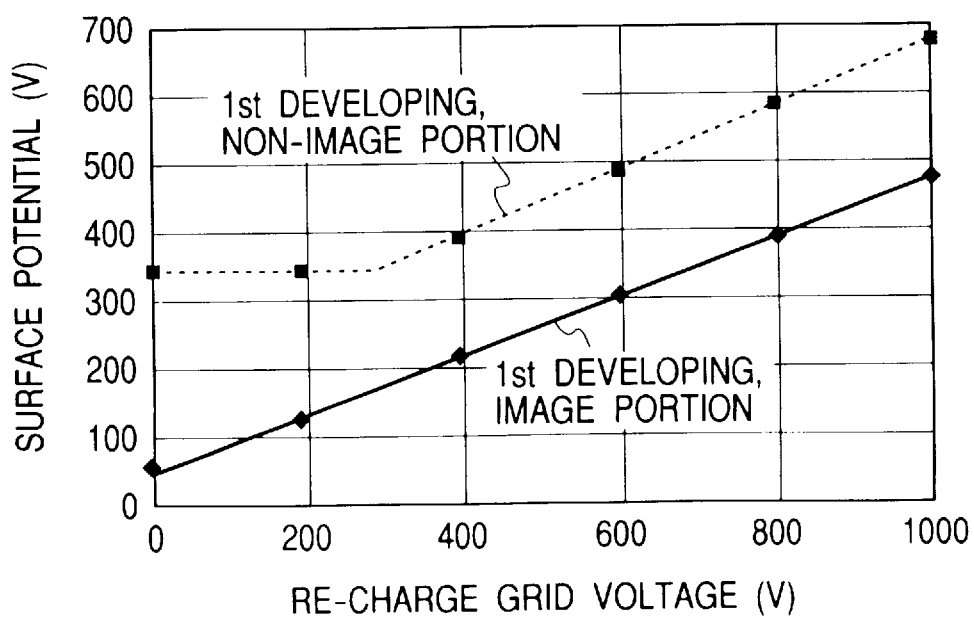
FIG. 14 is a graph showing test results regarding a relation between drum surface potential and grid voltage applied to a scorotron re-charger in the conventional two-color image forming process.

Since the corotron charger has no potential convergence effect as shown in FIG. 13, when the first developing portion tries to be charged to desired potential during the re-charging, the potential of the first non-image portion also increased. Thus, conventionally, it was considered that the corotron charger could not be used as the re-charger. However, as is in the present invention, in a system in which a good two-color image can be obtained without converging the potentials of the first developing portion and the first non-image portion immediately after the re-charging, the corotron charger can be as the re-charger.

Since the image forming process of the third embodiment is the same as that of the first embodiment, explanation thereof will be omitted. However, since the difference in potential between the first developing portion and the first non-image portion after the re-charging differs from the difference caused when the scorotron charger is used, the setting for the re-charging and the setting for the second exposure must be changed. As an example, it is controlled so that the potential of the first developing non-image portion becomes 600V, for example, and the potential of the first developing image portion becomes 400V, for example. Then, when the exposure is effected in response to the second image information, exposure greater than the other by a predetermined exposure amount (for example, exposure amount for reducing the potential of the first developing non-image portion by 200V) is effected regarding an area where the first image information is OFF.

As a result, even when the second image signal is OFF, the exposure is performed so that the potential of the first developing image portion becomes 400V and the potential of the first developing non-image portion also becomes 400V. Further, when the second image signal is ON, the exposure is performed so that the potential of the first developing non-image portion becomes 50V. Thereafter, in the developing process, by applying bias of 300V to the second developing sleeve, the second developer can be prevented from entering into the first developing portion and can be prevented from being developed on the first and second non-image portions, and, thus, satisfactory second image density can be obtained.

(Fourth Embodiment)

Next, a fourth embodiment of the present invention will be explained with reference to FIGS. 9A to 9F, FIG. 10 and FIGS. 11A and 11B. In this embodiment, the present invention is applied to a case where an exposure amount of the first image has not two values (ON and OFF) but has plural switching values. Explanation of the same construction as that of the first embodiment will be omitted, and only the difference will be described. Incidentally, for simplicity's sake, an example that the exposure amount has three switching values will be explained.

FIGS. 9A to 9F serve to explain an image forming process in a two-color image forming mode according to the fourth embodiment, where FIGS. 9A to 9F each shows the surface potential of the photosensitive drum in each step or process schematically. In FIG. 9A, the photosensitive drum is charged to +400V, for example, by the corona charger, and then, in FIG. 9B, first exposure in which first image information is divided into three values (ON, OFF and HT (half tone)) is effected to reduce the surface potential of the exposure ON portion to +50V, for example, and to reduce the surface potential of the exposure HT portion to +150V, for example, thereby forming a first electrostatic latent image.

Then, in FIG. 9C, by applying developing bias voltage (for example, +300V shown by the dotted line) to a sleeve of the first developing device, the exposure portion is inversion-developed, thereby effecting the development corresponding to the developing contrast. After the first development, in FIG. 9D, the re-charging is effected. In this case, voltage of 500V is applied to a grid to control to charge the first developing non-image portion to 500V, for example, and to charge the first exposure ON portion to 400V, for example. In this case, the first exposure HT portion is charged to 450V, for example.

Then, in FIG. 9E, when exposure corresponding to the second image information is effected, exposure greater than the other by a predetermined exposure amount (for example, exposure amount for reducing the potential of the first developing OFF portion by 100V) is effected regarding an area where the first image information is OFF, and exposure greater than the other by another predetermined exposure amount (for example, exposure amount for reducing the potential of the first developing HT portion by 50V) is effected regarding an area where the first image information is HT.

Figure 10:
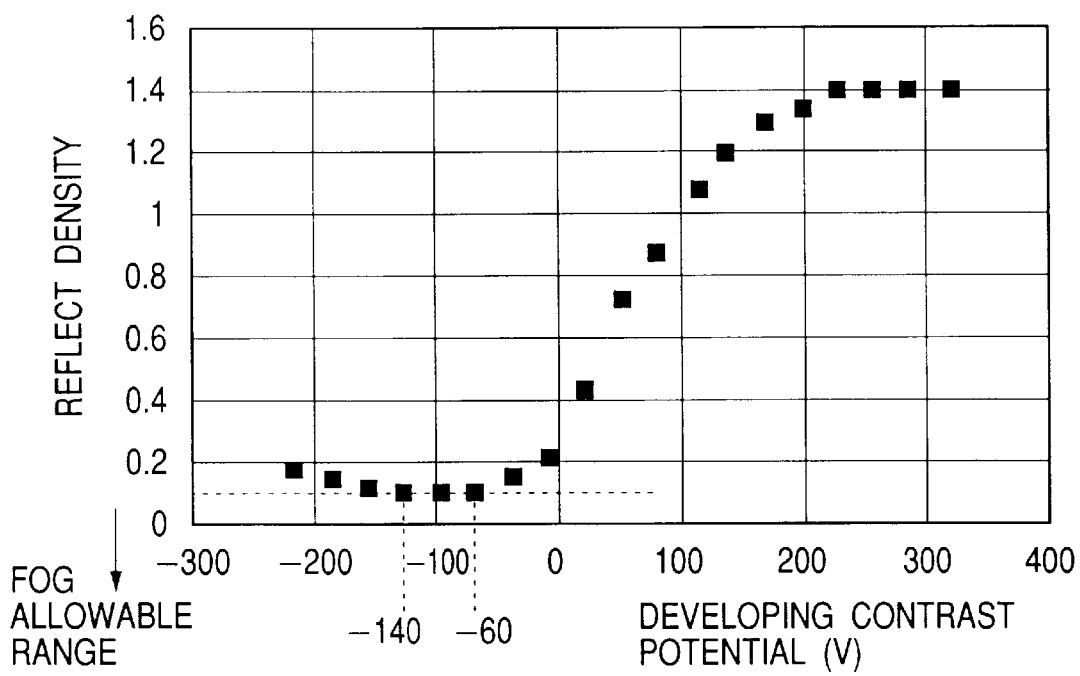
FIG. 10 is a graph showing a relation between density and developing contrast voltage of a second developing device in the fourth embodiment.

The reason is that, if the weak exposure is effected only regarding the first developing non-image portion as is in the first embodiment, the potential of the first developing HT portion becomes 450V and the second developing contrast potential becomes −150V to develop the reversal toner, with the result that fog exceeding an allowable range is generated in dependence upon the feature of the second development. FIG. 10 shows a relation between the developing contrast of the second developing device and density/fog in this case.

Further, because of difference in potential of the first developing OFF portion and because of difference caused by potential reduction during exposure due to transmission (permeability) of the developed toner, after the weak exposure, the potential of the first developing HT portion differs from the potential of the first developing OFF portion. In the illustrated embodiment, when the exposure having the same exposure amount as that of the first developing OFF portion is effected regarding the first developing HT portion, the potential becomes 350V and the second developing contrast potential becomes −50V, with the result that fog exceeding an allowable range is generated by the feature of the second development shown in FIG. 10.

Because of the above-mentioned reasons, in the illustrated embodiment, when the exposure corresponding to the second image information is effected, exposure greater than the other by a predetermined exposure amount (for example, exposure amount for reducing the potential of the first developing OFF portion by 100V) is effected regarding an area where the first image information is OFF, and exposure greater than the other by another predetermined exposure amount (for example, exposure amount for reducing the potential of the first developing HT portion by 50V) is effected regarding an area where the first image information is HT. As a result, even when the second image signal is OFF or HT, the weak exposure having different intensity is effected so that the potential of the first developing ON portion becomes 400V, the potential of the first developing HT portion also becomes 400V and the potential of the first developing OFF portion also becomes 400V.

Figure 11A:
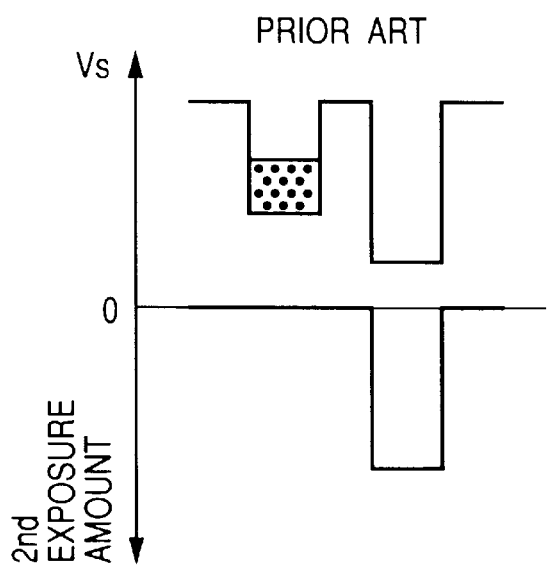
FIG. 11A is a schematic view showing conditions of drum surface potential and a second image exposure amount in a second image exposure step of the two-color image forming process in a conventional technique.
Figure 11B:
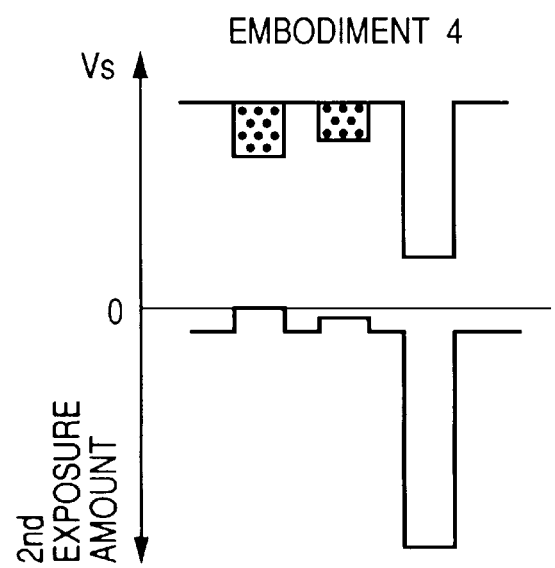
FIG. 11B is a schematic view showing conditions of drum surface potential and a second image exposure amount in a second image exposure step of the two-color image forming process in the fourth embodiment.

Further, when the second image signal is ON, exposure is effected so that the potential of the first developing non-image portion becomes 50V. FIGS. 11A and 11B show relations between the drum surface potential and the second exposure amount in the second exposure process (FIG. 11A shows the conventional case and FIG. 11B shows the fourth embodiment).

Thereafter, by applying bias of 300V to the second developing sleeve in the developing process, even when the first exposure means has three values (ON, OFF, HT), the second developer can be prevented from entering into the first developing portion and can be prevented from being developed on the second non-image portions, and, thus, satisfactory second image density can be obtained. In the illustrated embodiment, while an example that the first exposure means has three values was explained, the first exposure means may have four or more values.

As mentioned above, while the present invention was explained in connection with the aforementioned embodiments, the present invention can be applied to arrangement other than those in the aforementioned embodiments.

For example, in the above embodiments, while an example that toner having positive polarity is inversion-developed by using a-Si (amorphous silicone) photosensitive member charged positively was explained, an OPC drum may be used as the photosensitive member. In this case, since the OPC drum is normally charged negatively (negative or minus polarity), toner having negative polarity is used.

Regarding superimpose of different color images according to the present invention, while an example that the second toner image is superimposed onto the first toner image regarding each pixel was explained, in this case, the provision of a mechanism for registering or aligning two color toner image with each other is required. To simplify the arrangement, it may be designed so that superimpose of two color in each pixel is not controlled and the image processing portion can obtain desired image density and a desired red/black color-mixed image by microscopically preventing mixture between the red image and the black image and by macroscopically using surface-area gradation.

Although a pre-transfer charger for registering charge amounts of two color images on the photosensitive drum before the transferring was not fully described, it is known that the charge amounts can be controlled with alternate current or direct current by using corotron or scorotron. Of course, it is also known that separating and transferring of two color images (which will be performed later) can be performed effectively by reducing the potential of the photosensitive member by also using pre-transfer exposure means (not shown).

Further, regarding pre-exposure for removing electricity from the photosensitive member in the last process, it is necessary that ghost of the previous image is not generated by appropriately selecting wave length and intensity. In the above-mentioned embodiments, while the two-color image forming apparatus was explained, the present invention can be applied to a multi-color image forming apparatuses. Further, while an example that two color images are formed on the photosensitive member during one revolution of the photosensitive member was explained, the present invention can be applied to an image forming apparatus in which a plurality of toner images are formed on a photosensitive member while the photosensitive member is being rotated by plural revolutions. Further, any combinations thereof may be applied to the present invention.

As mentioned above, according to the illustrated embodiments, the exposure means for effecting the digital exposure has the first non-image portion and the first image portion regarding the light amount per unit pixel for exposing the electrostatic latent image bearing member (photosensitive member) on which any toner image was not formed and has the second non-image portion and the second image portion regarding the light amount per unit pixel for exposing the electrostatic latent image bearing member on which at least one color toner image was formed, and the second exposure amount per unit pixel in the non-image portion is greater than the first exposure amount, and, regarding the light amount per unit pixel in the image portion, the second exposure amount is equal to or greater than the first exposure amount, and the difference between the exposure amounts is controlled in accordance with the image information in the previous process. With this arrangement, there is provided a cheap and compact multi-color image forming apparatus in which, regardless of the kind of the photosensitive member and ability of the re-charger, the previously developed image(s) is not distorted in the second and other developing processes, and a high quality image having no density unevenness and inversion fog can be obtained in the second and other developing processes.

(Fifth Embodiment)

Next, a fifth embodiment of the present invention using the apparatus of the first embodiment will be explained. Incidentally, since construction, image formation and development are the same as those in the first embodiment, explanation thereof will be omitted.

In the fifth embodiment, an amorphous silicone drum having high durability and long service life is used as the photosensitive drum 1. However, particularly regarding one-path two-color image forming apparatus of negative-negative re-charging type, in the amorphous silicone drum, it was difficult to re-charge a latent image for a first color developed image to potential substantially the same as potential of non-development portion (referred to as "re-charge convergence" hereinafter), in comparison with other photosensitive drum such as an OPC drum and the like.

In order to improve the re-charge convergence, in the negative-negative re-charging system, it is necessary that the first image developing portion is charged much more than the first non-image portion (i.e., drum direction current much more than the first non-image portion is applied to the first image developing portion). Corona current discharged from a re-charging discharge wire is divided into drum direction current flowing in a drum direction and shield direction current flowing to a charger shield. When the corona current is constant, a ratio between the drum direction current and the shield direction current depends upon resistance values in the respective directions. Although shield direction resistance is normally unchanged, drum direction resistance is varied with surface potential, presence/absence of toner and amount of toner. That is to say, since the drum direction current in the re-charging is changed in dependence upon a condition of the first development, the charge potential is also changed in dependence upon the condition of the first development.

Figure 18:
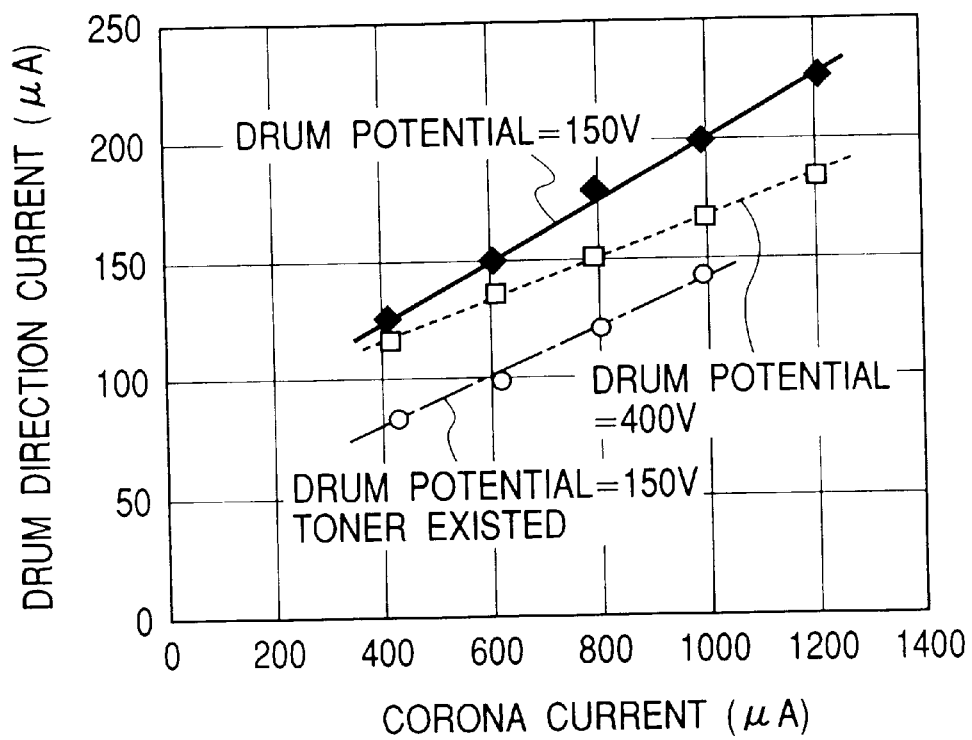
FIG. 18 is a graph showing test results regarding a relation between a first developing condition and drum direction current.

FIG. 18 shows test results showing a relation between the first development condition and the drum direction current. It is assumed that drum potential of the first developing non-image portion and drum potential of toner on the image portion are 400V and 150V, respectively, and these conditions are compared with a no-toner condition (drum potential=150V). First of all, comparing the condition of the first developing non-image portion (drum potential=400V) with the no toner condition (drum potential=150V), in the no-toner condition in which the drum surface potential is smaller, greater drum direction current flows than the 400V condition regarding the same corona current, and it can be seen that the drum direction current ratio is (400V condition):(150V condition)≅4.5:5.5.

Then, in the same surface potential, comparing the toner-existed condition (drum potential 150V) with the no-toner condition (drum potential=150V), in the toner-existed condition, smaller drum direction current flows than the no-toner condition regarding the same corona current, and it can be seen that the drum direction current ratio is (no-toner):(toner-existed) ≅6:4. That is to say, in the negative-negative re-charging system, regarding the surface potential, greater direction current flows toward the first developing image portion (for example, toner existed, drum potential=150V) than the first developing non-image portion (drum potential=400V), and, this direction is advantageous for the re-charge convergence. However, in the viewpoint of the presence/absence of toner, this direction is disadvantageous for the re-charge convergence.

The entire re-charge convergence is determined by the both factors, and, in the above test results, it can be seen from the graph of FIG. 2 that the ratio is (first developing non-image portion):(first developing image portion)≅5.5:4.5 and the potential is not converged. Further, from the above graph, it can be assumed that, if the greater corona current is applied, the relation will be reversed and the potential will be converged at last. However, to do so, the greater charger is required, thereby affecting a bad influence upon the cost and compactness of the apparatus.

The above-mentioned relation is varied with kind and amount of toner and setting of potential more or less, but causes a fundamental problem in the negative—negative re-charging system.

To solve this problem, it is considered that a re-charger having high charging ability is used. However, since such a re-charger is expensive and requires large installation space and large power source, it is not effective. Further, although it is considered that another exposure means operated after the re-charging and before second exposure is provided to make the potential of the latent image for the first color developed image substantially the same as the potential of the non-development portion, since this method requires another exposure means, it is not advantageous regarding cost and compactness of the apparatus.

Thus, in the fifth embodiment, the second exposure means also acts as uniform exposure means operated after re-charging. With this arrangement, since any element is not added, a multi-color image forming apparatus having an advantage regarding cost and compactness can be obtained. Further, since the convergence after re-charging is not required, reasonable re-charging can be effected, and the re-charger itself is cheap and requires no great installation space, and current and voltage applied to the re-charger can be reduced.

The apparatus used in the fifth embodiment is the same as the apparatus used in the first embodiment, and formation of latent images for two color images and the developing condition are the substantially the same as those in the first embodiment.

Figure 15:
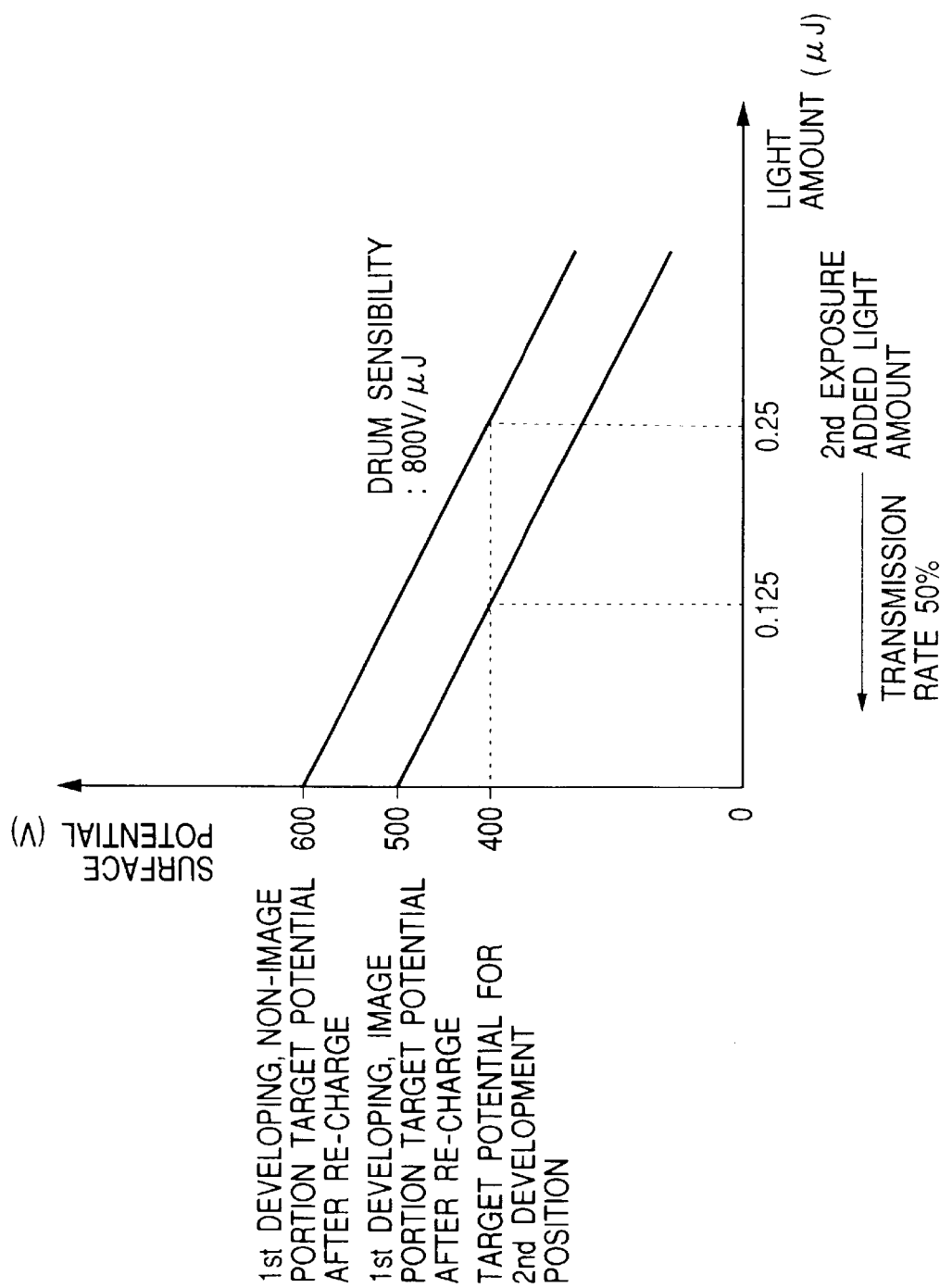
FIG. 15 is a graph for explaining reason and method for determining target potential after re-charging in a fifth embodiment of the present invention.

By the way, in the above-mentioned FIG. 3D, reason and method for setting the re-charge potential as mentioned above will be explained with reference to FIG. 15. First developing non-image portion target potential after re-charge (for which the surface potential after the exposure with second exposure added constant light amount of 0.25 μJ becomes target potential (400V) for the second development position) is 600V by assuming from a straight line of the known drum sensitivity of 800 V/μJ. Then, a light amount reaching the first image developing portion of the drum becomes 0.125 pJ by assuming from the known transmission ratio of toner layer of 50%. From the above, it can be seen that, as is in the aforementioned method, the first developing image portion target potential after re-charge may be set to 500V.

Figure 16:
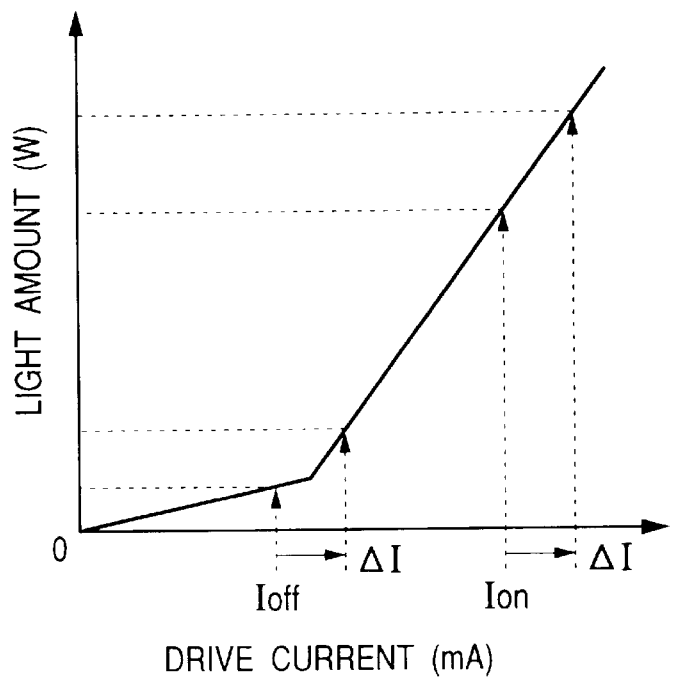
FIG. 16 is a graph showing a relation between a light amount and drive current of a second image exposure laser in the fifth embodiment.

In the illustrated embodiment, a semi-conductor laser is used as the second exposure means. However, complicated treatment is not required in a second developing mono-color mode and in a second developing two-color mode. As shown in FIG. 16, a laser light amount is determined by laser drive current. Thus, in the two-color mode, the second exposure can be achieved by adding constant offset current ΔI to drive current in a second developing mono-color mode.

Figure 17A:
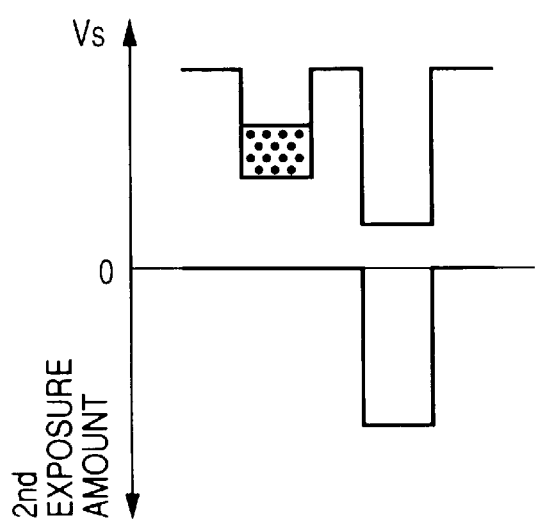
FIG. 17A is a schematic view showing conditions of drum surface potential and a second image exposure amount in a second image exposure step of the two-color image forming process in a conventional technique.
Figure 17B:
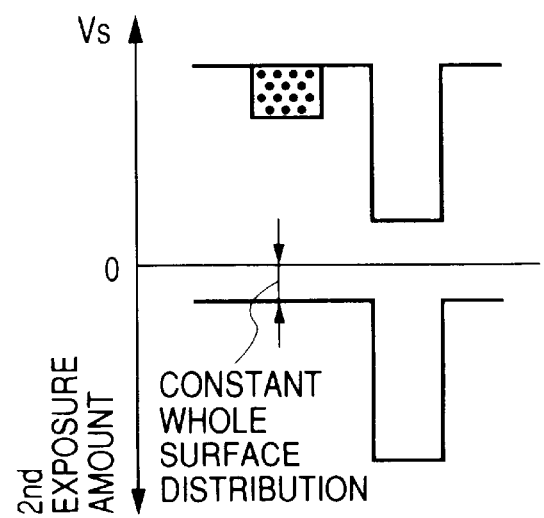
FIG. 17B is a schematic view showing conditions of drum surface potential and a second image exposure amount in a second image exposure step of the two-color image forming process in the fifth embodiment.

That is to say, weak exposure is effected on an area where the second image signal is OFF, and exposure in which the exposure amount substantially the same exposure amount as the weak exposure is added is effected on the second image signal ON portion so that the potential of the first developing image portion becomes 400V and the potential of the first developing non-image portion also becomes 400V, and, when the second image signal is ON, the exposure is effected so that the potential of the first developing non-image portion becomes 50V. FIGS. 17A and 17B show relations between the drum surface potential and the exposure amount in the second exposure process (FIG. 17A shows the conventional case and FIG. 17B shows the fifth embodiment). Thereafter, as shown in FIG. 3F, by applying bias of 300V to the second developing sleeve in the second developing process, the inversion-development is performed.

Incidentally, it is preferable that the photosensitive member including the photosensitive layer having specific dielectric capacity ∈ of 8 or more is used in the apparatus. In this case, excellent effect can be obtained, and, when the amorphous silicone drum is used, remarkable effect can be obtained.

According to the fifth embodiment, there is provided a cheap and compact two-color image forming apparatus in which, regardless of the kind of the photosensitive member and ability of the re-charger, the second developer can be prevented from entering into the first developing portion and can be prevented from being developed on the second non-image portion and sufficient second image density can be obtained.

(Sixth Embodiment)

Next, a sixth embodiment of the present invention will be explained with reference to FIGS. 19 and 20. This embodiment shows an example of an image forming method in which the first and second developers are developed on the same area to obtain a third color.

Even when the exposure same as the fifth embodiment is performed on the first developing image portion, the surface potential cannot be reduced sufficiently due to the transmission of the first developing toner as mentioned above, with the result that the second developing density became insufficient. Thus, in the sixth embodiment, regardless of ON/OFF of the second exposure, while weak exposure amount is being added regarding the whole surface of the photosensitive member, the exposure amount in the second exposure ON condition is increased so that the potential of the first developing image portion is reduced to 50V.

Figure 19:
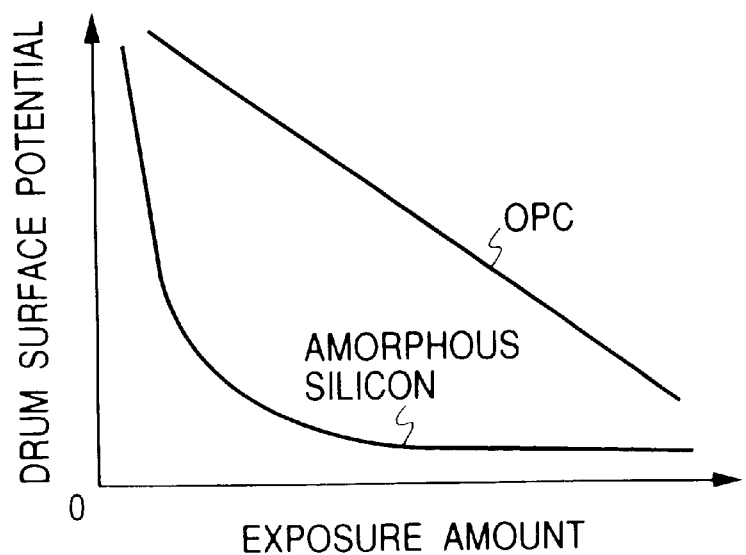
FIG. 19 is a graph showing a relation between drum surface potential and exposure amounts of an amorphous silicone photosensitive drum and an OPC photosensitive drum in a sixth embodiment of the present invention.

In this case, although the greater light amount is applied to the drum surface in an area of the first developing non-image portion where the second signal is ON, since the amorphous silicone photosensitive drum used in the sixth embodiment has property (unlike to the OPC photosensitive drum) that a feature regarding "exposure amount" vs "drum surface potential" does not change in the exposure amount exceeding a certain amount as shown in FIG. 19, the potential of the first non-image, second exposure portion becomes substantially the same as the potential of the first development, second exposure portion (45V).

Figure 20:
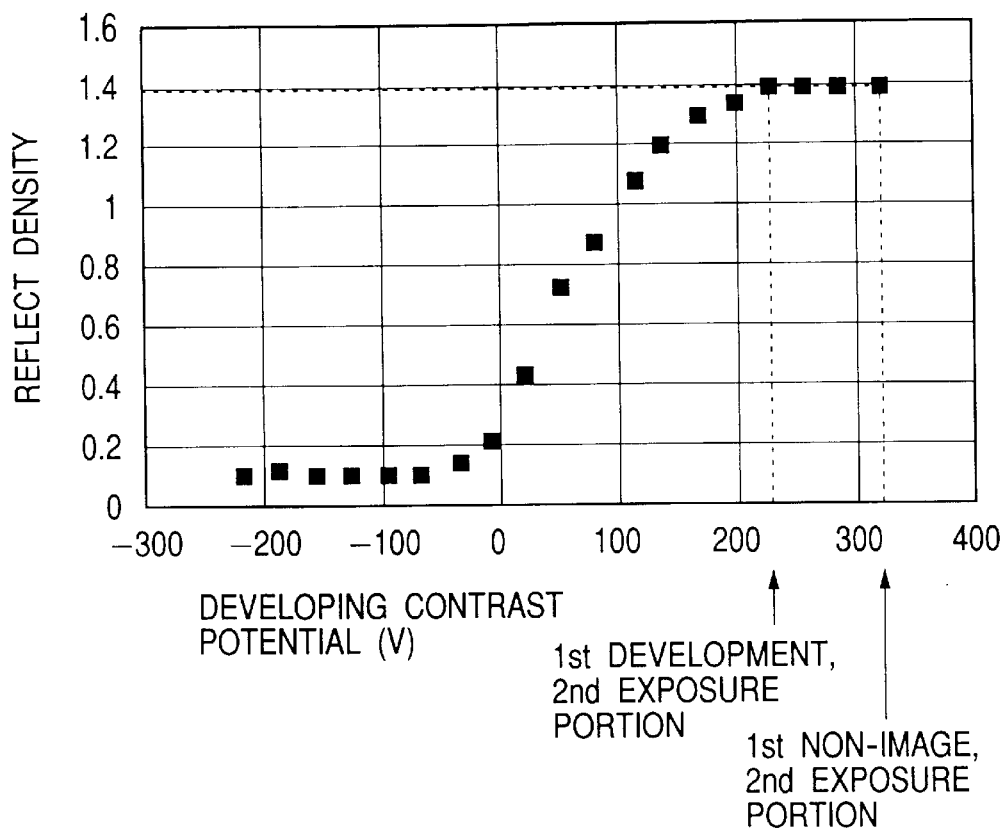
FIG. 20 is a graph showing a relation between developing contrast potential and density in a second developing device in the sixth embodiment.

Even such a difference to this extent, although the difference in density in the second development does not arise any problem, for example, as shown in FIG. 20, by setting the second developing device so that a relation between developing contrast potential and reflect density indicates a feature which is hard to be influenced upon the difference in potential between the first development, second exposure portion and the first non-image, second exposure portion, further improvement can be achieved. This developing feature can be changed, for example, by changing a wave-form of the developing bias or a rotational speed of the developing sleeve.

As a result, the potential of the first image, second non-exposure portion can be 400V, the potential of the first non-image, second non-exposure portion can be 400V, the potential of the first non-image, second exposure portion can be 45V and the potential of the first image, second exposure portion can be 50V, and, by selecting the bias voltage applied to the sleeve of the second developing device to 300V, the second developer can be prevented from entering into the first and second developing portions and can be prevented from being developed on the second image, non-image portion, and, thus, satisfactory second image density can be obtained and satisfactory density can be obtained even when two colors are superimposed.

(Seventh Embodiment)

Figure 21:
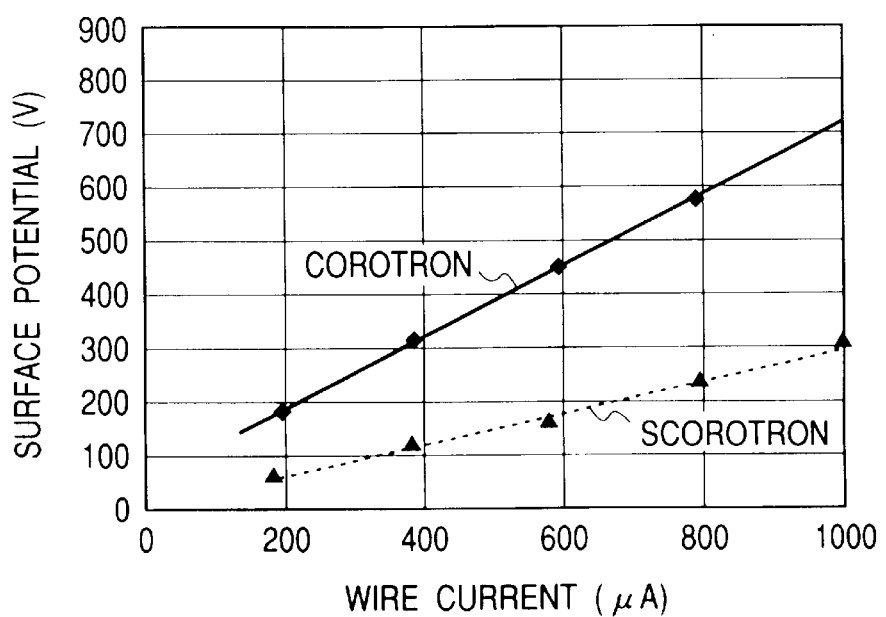
FIG. 21 is a graph showing a relation between drum surface potential and wire current applied to a corotron charger and a scorotron charger used in a seventh embodiment of the present invention.
Figure 22:
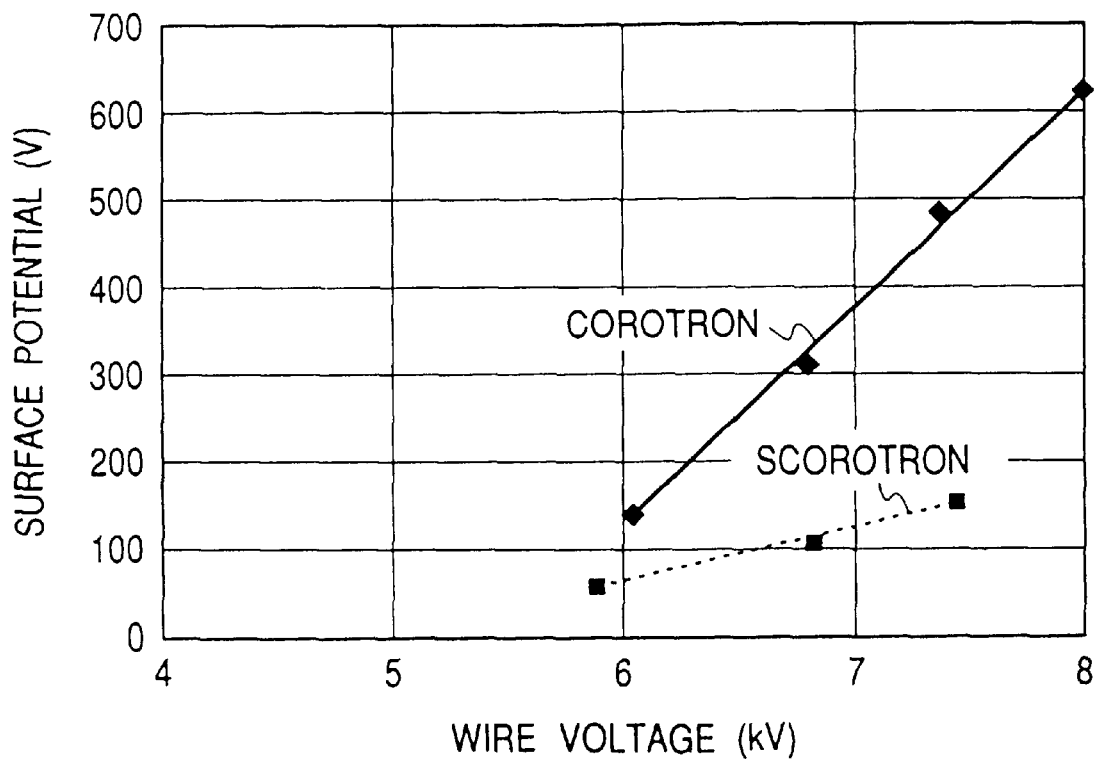
FIG. 22 is a graph showing a relation between drum surface potential and wire voltage applied to the corotron charger and the scorotron charger used in the seventh embodiment.

Next, a seventh embodiment of the present invention will be explained with reference to FIGS. 21 and 22.

In this seventh embodiment, in lieu of the scorotron charger, a corotron charger is used as the re-charger. Since the corotron charger has no grid, it has a simple and cheap, and, since charges generated by the discharge wire does not flow into the grid, the corotron charger has good charging ability. FIG. 21 is a graph showing a relation between wire current (current applied to the wire) and drum surface potential regarding both the corotron charger and the scorotron charger under the same condition, and FIG. 22 is a graph showing a relation between wire voltage and the drum surface potential regarding both the corotron charger and the scorotron charger under the same condition. From FIGS. 21 and 22, it can be seen that, when the corotron charger is used, smaller current and voltage is required to obtain the same drum surface potential in comparison with the scorotron charger; namely, it can be seen that the corotron charger has better charging ability.

Figure 23:
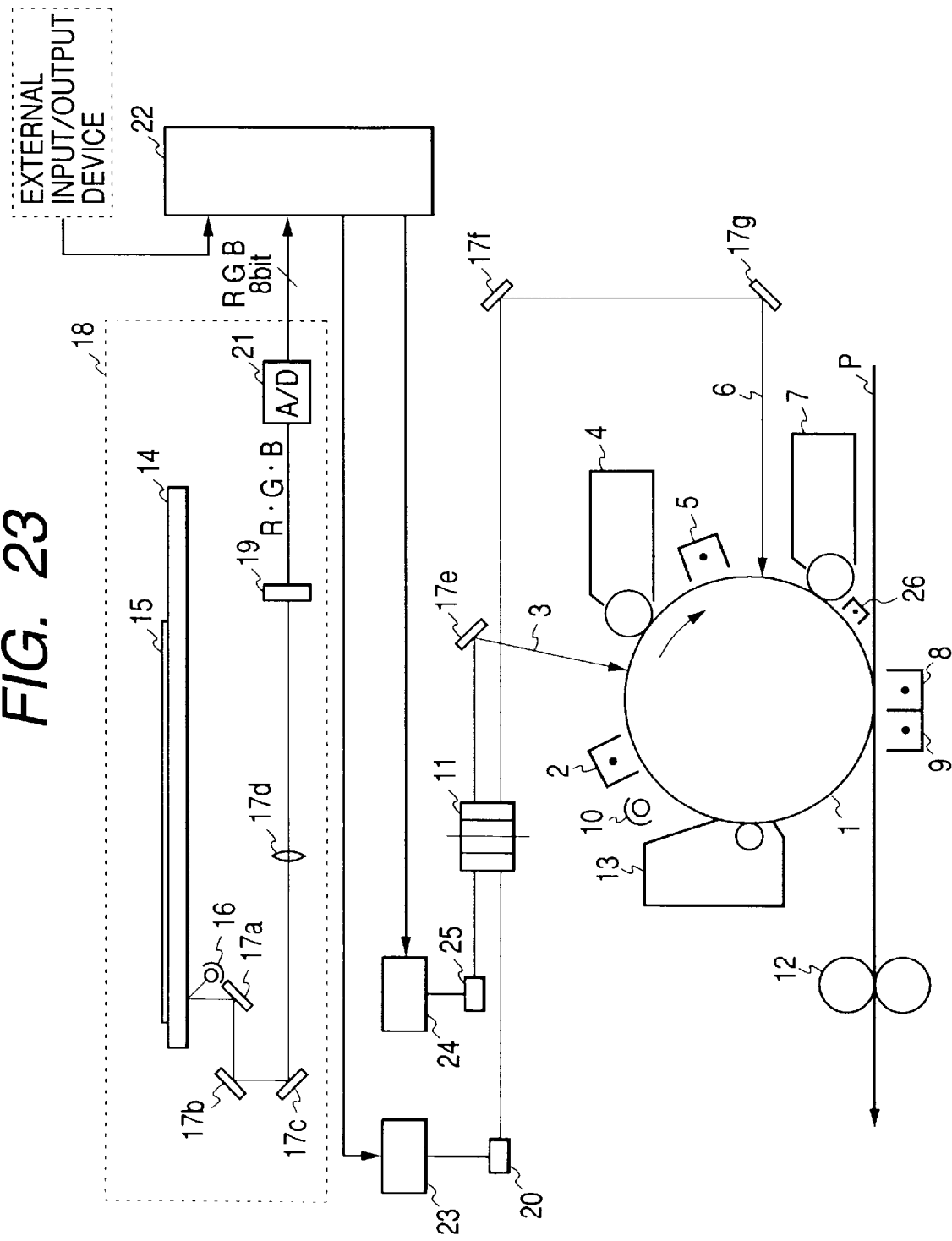
FIG. 23 is a schematic constructional view showing a conventional multi-color image forming apparatus.

Since the corotron charger has no potential convergence effect as shown in FIG. 23, when the first developing portion tries to be charged to desired potential during the re-charging, the potential of the first non-image portion also increased. Thus, it was considered that the corotron charger could not be used as the re-charger. However, as is in the present invention, in a system in which a good two-color image can be obtained without converging the potentials of the first developing portion and the first non-image portion immediately after the re-charging, the corotron charger can be as the re-charger.

Since the image forming process of the seventh embodiment is the same as that of the fifth embodiment, explanation thereof will be omitted. However, since the difference in potential between the first developing portion and the first non-image portion after the re-charging differs from the difference caused when the scorotron charger is used, the setting for the re-charging and the setting for the second exposure must be changed. As an example, it is controlled so that the potential of the first developing non-image portion becomes 800V, for example. In this case, the first developing image portion is charged to 600V. Then, when the exposure is effected in response to the second image information, exposure greater than the other by a predetermined exposure amount (for example, exposure amount for reducing the potential of the first developing non-image portion by 400V) is effected regarding the entire surface of the photosensitive drum. In this case, in the first developing portion, even when the above-mentioned exposure added predetermined exposure amount is effected, the potential of the first developing portion is not reduced to the same extent as the first developing non-image portion (for example, merely 200V is reduced). The reason is that the light is blocked and dispersed by the first developer.

As a result, even when the second image signal is OFF, the exposure is performed so that the potential of the first developing image portion becomes 400V and the potential of the first developing non-image portion also becomes 400V. Further, when the second image signal is ON, the exposure is performed so that the potential of the first developing non-image portion becomes 50V. Thereafter, in the developing process, by applying bias of 300V to the second developing sleeve, the second developer can be prevented from entering into the first developing portion and can be prevented from being developed on the first and second non-image portions, and, thus, satisfactory second image density can be obtained.

As is in this seventh embodiment, even when the simple and cheap corotron charger having good charging ability is used, good two-color image can be obtained.

(Eighth Embodiment)

FIG. 23 shows an alteration using the apparatus (printer) of FIG. 1. The printer includes a photosensitive drum 1 constituted by a drum-shaped conductive substrate and a photo-conductive layer coated on the substrate and is continuously rotated in a direction shown by the arrow. Around the photosensitive drum 1 (along the rotational direction thereof), there are disposed a first charger comprised of a corotron for uniformly charging the photosensitive drum 1, a laser illuminating portion (image exposure portion) 3 for forming a first latent image by using a laser optical system, a first developing device 4 for developing the first latent image, a second charger (re-charger) 5 comprised of a scorotron for re-charging the photosensitive drum 1, a laser illuminating portion (image exposure portion) 6 for forming a second latent image by using the laser optical system, a second developing device 7 (containing toner having a color different from the toner in the first developing device 4) for developing the second latent image, a pre-transfer charger 26 for controlling to make the transferability of two color toner images to a recording material (recording sheet) P equal, a transfer separation charger 9 for transferring the two color toner images onto the recording sheet P and for separating the recording sheet P from the photosensitive drum 1, a cleaner 13 for removing residual toner from the photosensitive drum 1, and a pre-exposure device 10 for removing electricity from the photosensitive drum 1.

In the multi-color (i.e., two-color) image formation, the photosensitive drum 1 is uniformly charged by the chargers 2, 5, and latent images corresponding to respective colors are formed by the image exposure portions 3, 6 in response to particular color signals. Then, the latent images are developed by the developing devices 4, 7 containing different color toners to form two color toner images on the photosensitive drum 1 in a superimposed fashion. The two color toner images are collectively transferred onto the recording sheet P by the transfer separation charger 9. The separated recording sheet P is sent to a fixing device 12, where the toner images are fixed to the recording sheet as a two-color print image.

Of course, the printer can be used as a mono-color printer. In this case, one or both of the chargers 2, 5 is operated to provide the required surface potential on the photosensitive drum 1, and required image exposure is effected and required development is also effected by using the developing device containing the corresponding color toner, thereby obtaining a mono-color image.

In the printer, digital image exposures in the image exposure portions 3, 6 are effected by driving semiconductor lasers 20, 25 in response to image information signals from a reader 18 or an external input device. Of course, In lieu of the lasers, LEDs may be used as light sources for the image exposures. The reader 18 reads-in image information on an original 15. That is to say, the original 15 rested on an original support 14 is illuminated by an illumination lamp 16 of the reader 18, and light reflected from the original is focused on a three-line CCD 19 including three color (red, green and black) filters to form red, green and black signals. These signals are A/D-converted by an A/D converter 21, thereby converting the image information of the original 15 into 8-bit digital image data.

If necessary, on the basis of the red, green and black digital image signals, an image processing portion 22 converts these signals into two color (for example, red and black) signals. To this end, as is well-known, conversion "RGB→CMY" (red, green, black→cyan, magenta, yellow) is effected. After brightness information is Log-converted into density information, UCR treatment (ground color removal) is effected to form black component. Remaining color components are distributed into red component and black component, and the distributed red component may be regarded as a red signal, and the distributed black component added to the black component obtained by the UCR treatment may be regarded as a black signal. Alternatively, the RGB signals may be appropriately treated to generate any color signals or C, R, Y, K (black) data may be used as they are.

In the illustrated embodiment, the 8-bit two color (red and black) signals formed as mentioned above are inputted to laser drive circuits 24, 23. The drive circuit 23, 24 drive the semi-conductor lasers 25, 20 in accordance with the magnitude of the signals (8-bit, 256 gradation). In the illustrated embodiment, the drive circuits 23, 24 are well-known PWM circuits which can modulate the times of ON/OFF of the semi-conductor lasers in accordance with the magnitude of the signals.

Figure 24A:
FIGS. 24A, 24B and 24C are explanatory views showing a relation between second image data and drive current of a second laser in the apparatus of FIG. 23.
Figure 24B:
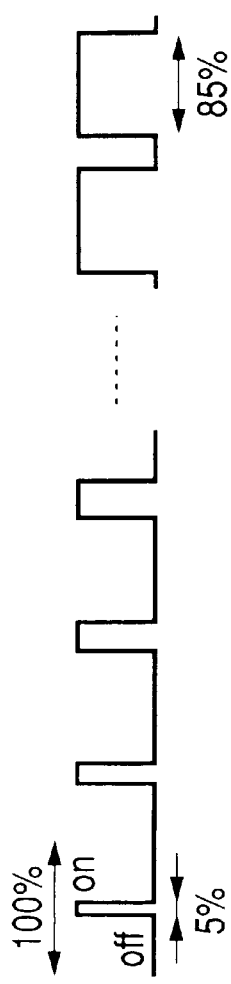

When the image data of each pixel is inputted in the scan direction of the laser, for example, as shown in FIG. 24A, the laser ON/OFF drive signal becomes as shown in FIG. 24B. That is to say, when the image data is 00 hex, On-Duty of the laser drive is selected to 5% of one pixel scan time, and, when the image data is FF hex, the On-Duty is selected to 85% of one pixel scan time. In this way, by performing area gradation within one pixel, light and shade can be realized.

Figure 24C:
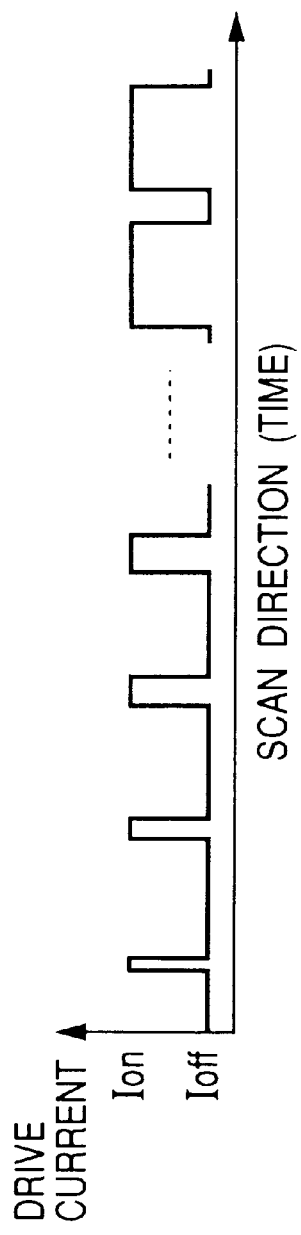
Figure 25:
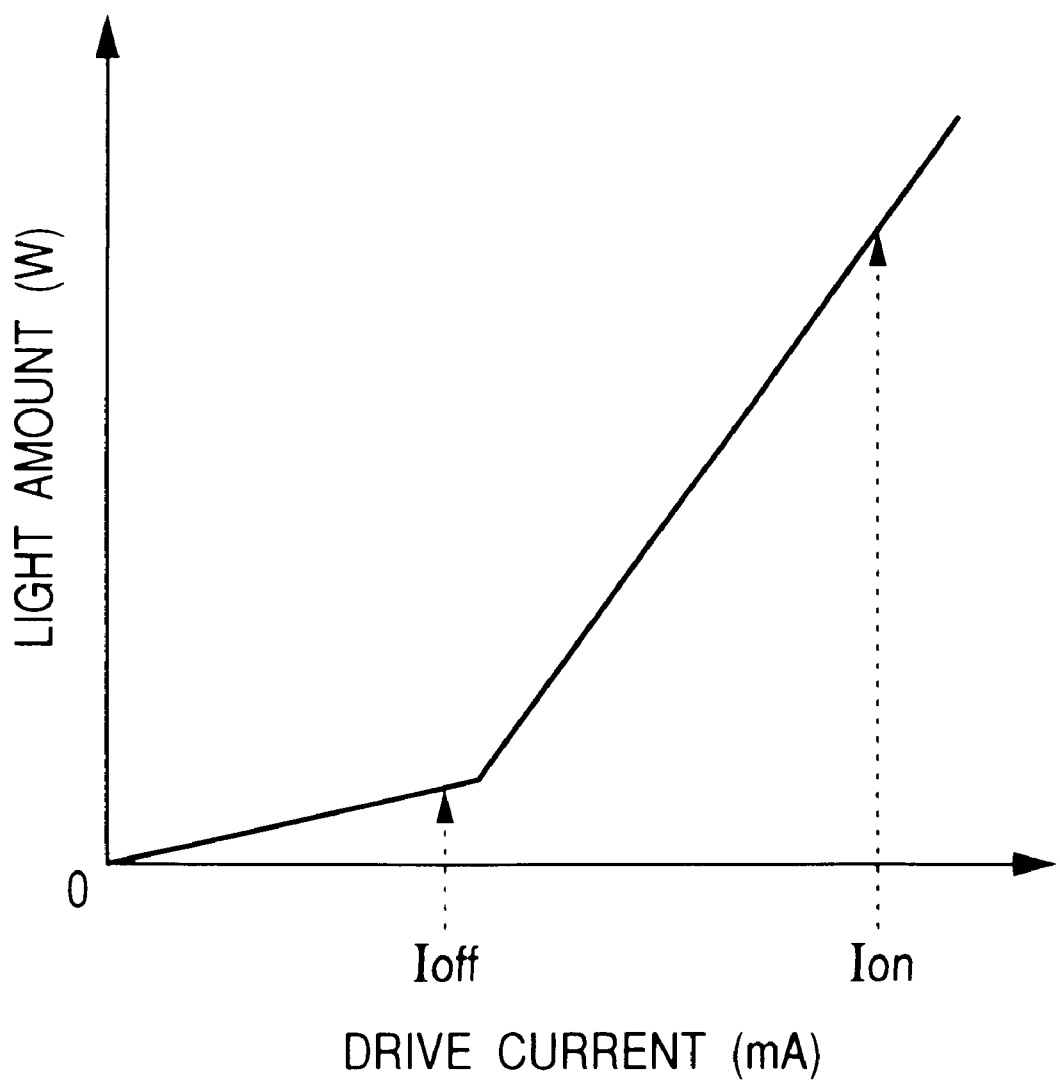
FIG. 25 is a graph showing a relation between second image data and drive current of the second laser in the apparatus of FIG. 23.

FIG. 25 shows a general I–L feature (drive current–light amount feature) of the laser. Since the drive currents used when the laser is OFF and ON are $I_{off}$, $I_{on}$, respectively, the laser drive current for the image signal (image data) shown in FIG. 24A becomes as shown in FIG. 24C, which is current for driving the laser 20 by means of the PWM circuit 24. As shown in FIG. 24C, when $I_{off}$ is set to a value slightly smaller than $I_{threshold}$ (not to 0 mA), as is well-known, the rising of the light amount upon laser drive ON is improved. Since light emission with drive current $I_{off}$ is not laser light emission but natural light emission, such light does not reach the photosensitive drum in the actual printer. Incidentally, in the illustrated embodiment, lasers each having visual light of 680 nm are used.

As mentioned above, the photosensitive drum 1 is scanned by laser light emitted by driving the semi-conductor lasers 25, 20 through a polygon scanner 11 which is rotated at a high speed, thereby forming digital electrostatic latent images on the photosensitive drum 1.

In the second development effected by the developing device 7, on the basis of the feature of the two-color printer that two color toner images are formed on the photosensitive drum 1 in a superimposed fashion to obtain a two-color image, the development is generally effected while not contacting the developing sleeve (developer bearing member) of the second developing device 7 with the photosensitive drum 1 in order that the first color toner image previously formed on the photosensitive drum 1 is not scraped by the second developer (see Japanese Patent Application Laid-Open No. 56-144562).

FIGS. 26A to 26F each shows a relation between surface potential of the photosensitive drum and the development in each step of a two-color image forming process. In the illustrated embodiment, an a-Si drum is used as the photosensitive drum 1.

Figure 26A:
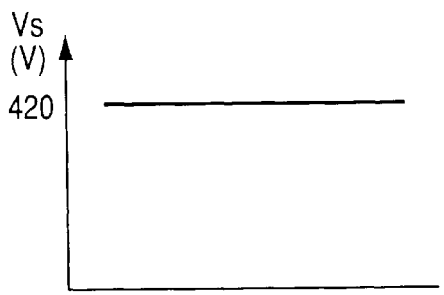
FIGS. 26A, 26B, 26C, 26D, 26E and 26F are views each showing surface potential of a photosensitive drum in two-color image formation effected by the apparatus of FIG. 23.
Figure 26D:
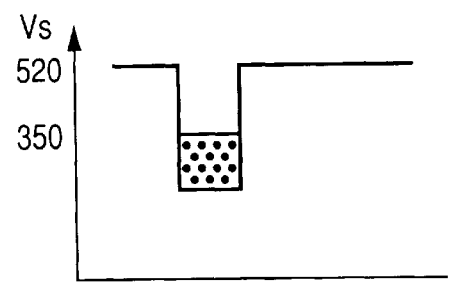
Figure 26B:
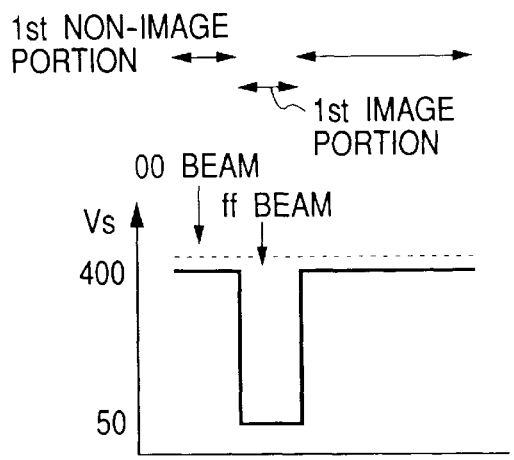

First of all, in FIG. 26A, the surface of the photosensitive drum 1 is charged to +420V, for example, by the first scorotron charger 2, and then, in FIG. 26B, image exposure 3 corresponding to the first image information is effected (only 00 beam and ff beam are shown in FIG. 26B). Since the image exposure 3 is the above-mentioned pulse-width-modulated light amount, the surface potential of the photosensitive drum 1 after exposure principally includes only potential at the laser OFF portion and potential at the laser ON portion. However, since the measured surface potential is integrated potential within a certain area, potential having intermediate gradation is obtained seemingly. Alternatively, if the sufficient pulse-width-modulation cannot be achieved within one pixel due to high pixel density (because the laser drive cannot provide such sufficient pulse-width-modulation), the actual surface potential often becomes potential having intermediate gradation.

In any cases, as mentioned above, since the weak exposure is effected regarding the non-image portion (image data 00 hex), the surface potential of the non- image portion (first non-image portion) of the first image is reduced to +400V, for example, by the image exposure 3. On the other hand, when the image data is ff hex, the image portion (first image portion) of the first image is reduced to +50V by the image exposure 3, thereby forming the first latent image.

Figure 26E:
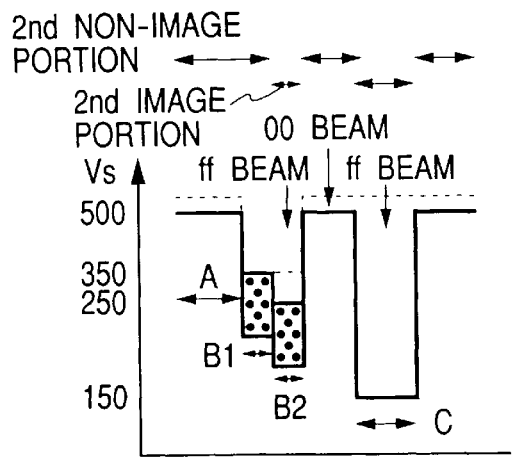
Figure 26C:
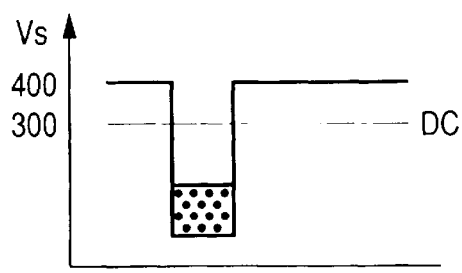

Then, in FIG. 26C, by applying developing bias voltage (for example, obtained by overlapping +300V DC voltage with AC voltage; DC voltage is shown by the dot and chain line) to the first developing device 4, the image portion (exposure portion) is inversion-developed, thereby forming a red toner image. In the illustrated embodiment, a well-known two-component developing device is used as the first developing device 4, and developer obtained by mixing carrier (ferrite coated by resin) with red toner (first toner) is used, and the development is effected by contacting the developer with the photosensitive drum 1.

After the first development, in FIG. 26D, the re-charging of the photosensitive drum 1 is effected by the re-charger 5. In this case, even when the charging is effected so that the potential of the first image, non-image portion is increased from +400V to +520V, for example, the image portion of the first image cannot be charged sufficiently in dependence upon the constructions of the photosensitive drum 1 and the re-charger 5, with the result that the first image, image portion is charged merely to +350V, for example (regarding potential of a toner layer of the first toner image surface) (similarly, hereinafter, the surface potential of the developed image portion is shown as potential of the toner layer). The difference (170V) between +520V and +350V is potential which cannot be made uniform by the re-charging (non-convergence of potential). The greater the difference the greater inconvenience is caused in the succeeding developing process.

Particularly, in a recent field of high speed image forming apparatus, amorphous silicone having high durability is frequently used for forming the photosensitive drum.

However, in the photosensitive drum having the photosensitive layer formed from amorphous silicone having great electrostatic capacity, the photosensitive drum cannot be charged sufficiently by the re-charging. Further, in photosensitive drums including a photosensitive layer having small electrostatic capacity, a re-charger having adequate charging ability cannot be used often due to limitation regarding compactness and cheapness of an image forming apparatus. Thus, inconvenience is apt to occur due to the potential non-convergence.

After the re-charging, as shown in FIG. 26E, the image exposure 6 corresponding to the second image information is effected. Regarding the non-image portion (image data 00 hex) of the second image on the surface of the photosensitive drum, in an area A where the first toner is not adhered (i.e., both the first and second images do not exist), since the weak exposure is effected, the surface potential thereof is reduced to +500V, for example. On the other hand, in an area B1 where the first toner is adhered (i.e., the first image is existed but the second image does not exist), since the light amount is fundamentally small and the light amount reaching the photosensitive drum becomes about 30% of 00 beam by the light shielding effect of the first toner not to reduce the potential (10V or less), the potential of the area B1 remains about 350V.

Regarding the second image portion, in an area C where the first toner is not adhered (i.e., the first image is not existed and the second image existed), for example, if the image data is ff hex, the potential is reduced to +150V. On the other hand, in an area B2 where the first toner is adhered (i.e., both the first and second images are existed), since the light amount reaching the photosensitive drum becomes about 30% of ff beam by the light shielding effect of the first toner (because the potential reducing property of the a-Si drum is substantially proportional to the light amount), although the potential is slightly reduced but is maintained to about 250V.

That is to say, the difference (100V) in potential between the area C (potential=150V) of the second image portion and the area B2 (potential=250V) of the second image portion B2 generates contrast difference, leading to density difference, thereby raising a problem.

The following Table 1 shows conditions of presence/absence of the first and second images on the surface areas A, B1, B2, C of the photosensitive drum and potentials in the second development.

TABLE 1

| Surface area of photosensitive drum | First image | Second image | Potential in second development |
| --- | --- | --- | --- |
| A | not existed | not existed | 500V |
| B1 | existed | not existed | 350V |
| B2 | existed | existed | 250V |
| C | not existed | existed | 150V |

Figure 26F:
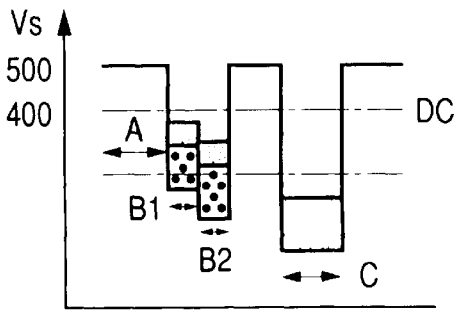

In this condition, as shown in FIG. 26F, by applying the developing bias (for example, obtained by overlapping +400V DC voltage with AC voltage; DC voltage is shown by the dot and chain line) to the second developing device 7, inversion-development is effected. The second developing device 7 is a well-known one-component developing device using magnetic toner (second toner) in which the development is effected in a condition that the magnetic toner is not contacted with the photosensitive drum. In this case, as shown, the second toner is slightly adhered to the area B1 where the second image is not formed, with the result that the second toner is mixed with the first toner in the area B1.

As another problem, as mentioned above, in the area B2 where the second image should fundamentally be existed with maximum density, since the developing contrast is small (in this example, contrast normally having 250V is reduced to 150V (=400V−250V)), the second toner is hard to be developed on the area B2.

In this way, even in the area (B1) where the second image should not be superimposed with the first image, in dependence upon the constructional conditions of the photosensitive drum 1 and the re-charger 5, after the first color development, the surface potential of the first color image portion of the photosensitive drum cannot be substantially the same as the non-image portion by the re-charger, with the result that unwanted color mixing is caused in the second development.

In order to prevent such color mixing, it is considered that the DC component of the developing bias of the second developing device 7 is selected to +250V, for example (shown by the two-dot and chain line in FIG. 26E). However, in this case, since the sufficient density is not obtained in the area C during the second development or the fundamentally low black density in the area B2 where the color mixing is desired is further reduced or the first color toner image on the photosensitive drum is scraped by the second toner, this consideration cannot be adopted.

Figure 27:
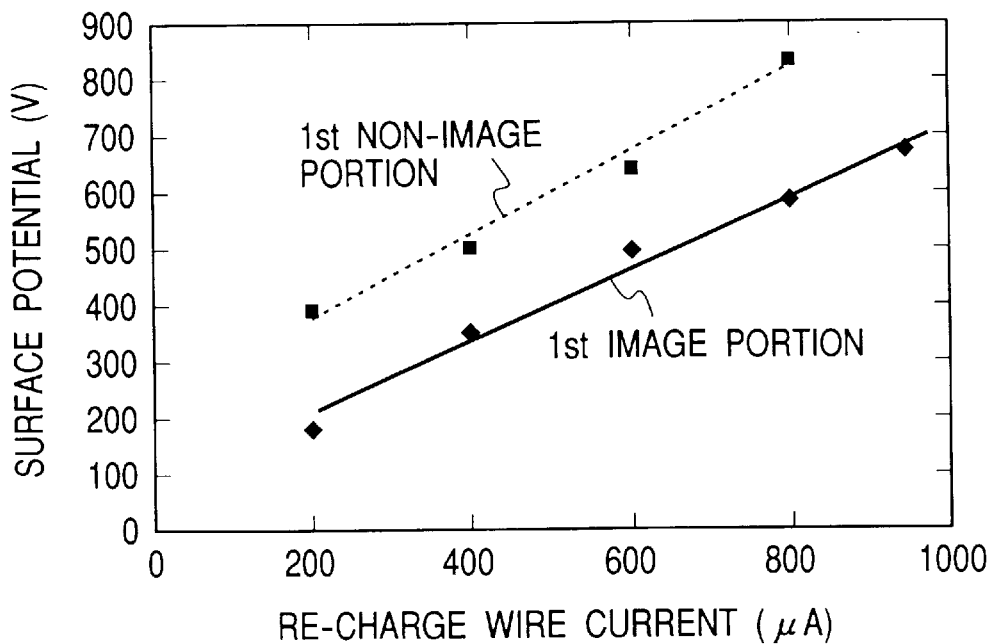
FIG. 27 is a graph showing a relation between surface potential of a photosensitive drum and current applied to a charge wire of a corotron charger when the photosensitive drum is re-charged by the corotron charger after a first image portion was developed.

In order to prevent the color mixing, it is also considered that the kind of the re-charger and the charging bias are appropriately selected. FIG. 27 is a graph showing a relation between current (re-charge wire current) applied to the charging wire of the corotron charger and the surface potential of the photosensitive drum when the photosensitive drum is re-charged by the corotron charger after the development of the first image portion. As shown in FIG. 27, in the re-charging effected by the corotron charger, it is difficult to converge (re-charging convergence) the surface potentials of the image portion and the non-image portion of the first image.

Figure 28:
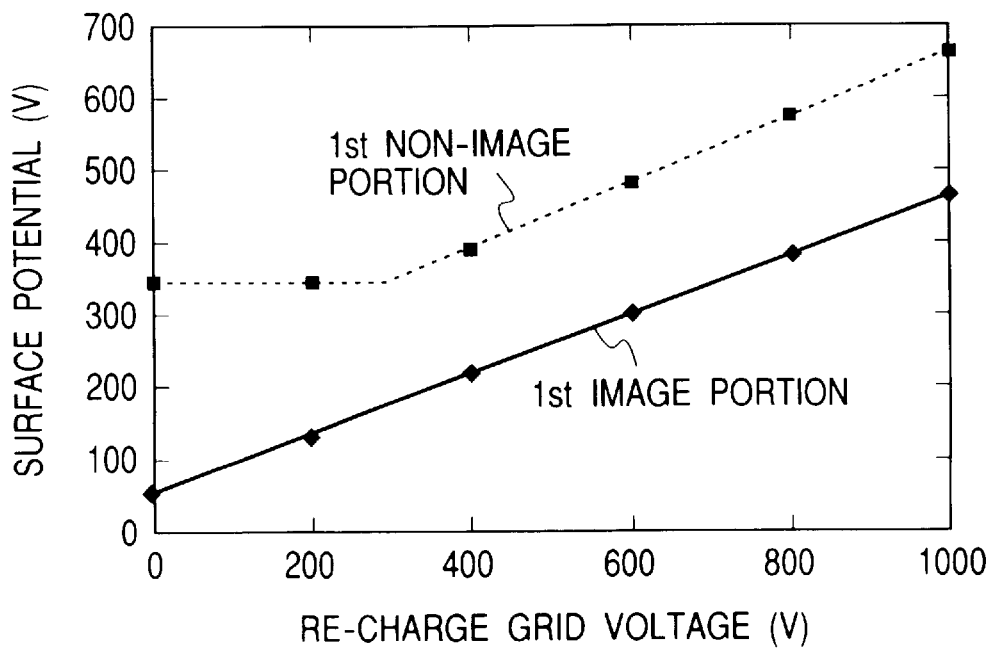
FIG. 28 is a graph showing a relation between voltage applied to a grid of the corotron charger and surface potential of the photosensitive drum after re-charging.

As another method, it is considered that the re-charging is effected by using a scorotron charger so that drum direction current flowing through the non-image portion of the first image is reduced and drum direction current flowing through the image portion of the first image is maintained. FIG. 28 is a graph showing a relation between voltage applied to a grid of the scorotron charger and the surface potential of the photosensitive drum after the re-charging. As can be seen from FIG. 28, when the voltage applied to the grid of the scorotron charger is selected to be substantially the same as the potential of the first non-image portion, the first image portion can be charged most effectively while suppressing the potential of the first non-image portion after the re-charging, thereby improving the re-charge convergence.

However, in such grid voltage, in order to make the potential of the first image portion after the re-charging sufficiently high, much drum direction current is required, with the result that the larger charger must be provided, leading to disadvantage regarding cost and installation space or compactness. This is true particularly when the amorphous silicone photosensitive drum having great specific inductive capacity (hard to be charged).

As a further means for preventing the color mixing, there has been proposed a technique in which, at a point after the first development and before the second development (i.e., in a process between the process shown in FIG. 26E and the process shown in FIG. 26F), analogue uniform exposure is effected so that the potential of the first image portion becomes substantially the same as that of the first non-image portion (see Japanese Patent Application Laid-Open No. 58-80653). However, in this technique, since the additional exposure means must be provided as well as the image exposure means, the apparatus is made bulky and expensive.

Further, as a means for solving the problem regarding the light shielding of the first toner, there has been proposed a technique in which the light amount of the second exposure is previously corrected in correspondence to the first image data to permit illumination of greater light amount (see Japanese Patent Application Laid-Open No. 5-197253). However, this technique utilizes only the areas B1, B2 of the photosensitive drum to correct the exposure amount, but does not teach the exposure amount regarding the areas A, C.

Now, the eighth embodiment will be fully explained with reference to the accompanying drawings.

First of all, before a multi-color image forming apparatus according to the eighth embodiment is explained, the potential convergence due to the re-charging will be further described to clarify its physical phenomenon.

In order to improve the re-charge convergence, in the negative-negative re-charging system, it is necessary that the first image portion (image portion of the first image) is charged much more than the first non-image portion (non-image portion of the first image) (i.e., drum direction current much more than the first non-image portion is applied to the first image portion). Corona current discharged from a discharge wire of the re-charger is divided into drum direction current flowing in a drum direction and shield direction current flowing to a re-charger shield. When the corona current is constant, a ratio between the drum direction current and the shield direction current depends upon resistance values in the respective directions.

Although shield direction resistance is normally unchanged, drum direction resistance is varied with surface potential, presence/absence of toner and amount of toner. That is to say, since the drum direction current in the re-charging is changed in dependence upon a condition of the first development, the charge potential is also changed in dependence upon the condition of the first development.

Figure 39:
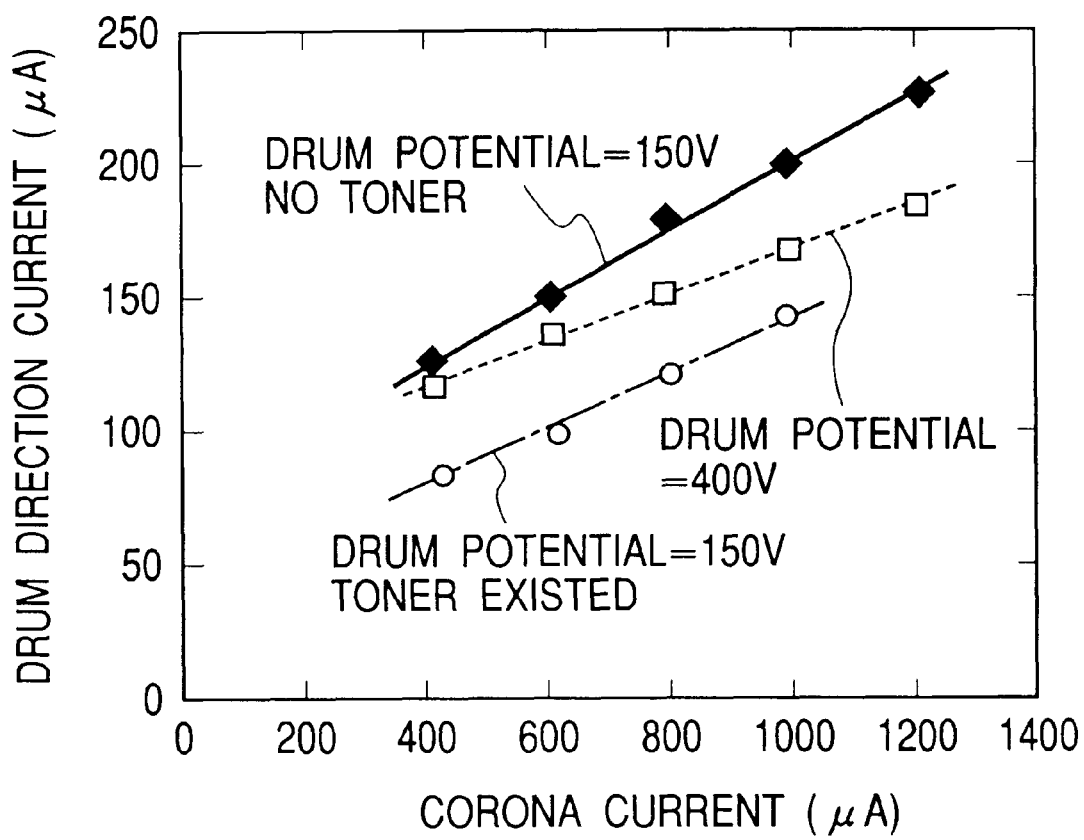
FIG. 39 is a graph showing various drum potential due to difference in first developing condition regarding a relation between corona current of the re-charging and drum direction current.

FIG. 39 shows the difference in drum direction current due to the difference in the first development regarding the corona current in the re-charging. It is assumed that drum potential of the first non-image portion and potential of toner on the first image portion are 400V (of course, no-toner) and 150V (toner existed), respectively, and these conditions are compared with a no-toner condition (drum potential=150V) to check a relation between the corona current and the drum direction current.

First of all, comparing the condition of the first non-image portion (drum potential=400V) with the no-toner condition (drum potential=150V), in the no-toner condition in which the drum surface potential is smaller, greater drum direction current flows than the 400V condition regarding the same corona current, and it can be seen that the drum direction current ratio is (400V condition):(150V condition)≅4.5:5.5 in the vicinity of 1000 $\mu$A. Then, in the same surface potential, comparing the toner-existed condition (drum potential=150V) with the no-toner condition (drum potential=150V), in the toner-existed condition, smaller drum direction current flows than the no-toner condition regarding the same corona current, and it can be seen that the drum direction current ratio is (no-toner):(toner-existed) ≅6:4 in the vicinity of 1000 $\mu$A.

That is to say, greater drum direction current flows toward the first image portion (for example, toner existed, drum potential=150V) than the first non-image portion (drum potential=400V), and, thus, regarding the surface potential, the negative-negative re-charging system is advantageous for the re-charge convergence. However, in the viewpoint of the presence/absence of toner, the negative-negative re-charging system is disadvantageous for the re-charge convergence. The fact whether the negative-negative re-charging system is advantageous or disadvantageous for the re-charge convergence is totally determined by the both factors.

Also in the illustrated embodiment, it can be seen from the graph of FIG. 39 that the ratio is I (first non-image portion):I (first image portion)=I (400V):I (150V; toner existed) ≅5.5:4.5 and the potential is not converged. As can be seen from FIG. 39, it is assumed that, if the greater corona current is applied, the relation of the ratio of the drum direction current will be reversed and the potential will be converged at last. However, to do so, the greater charger is required, thereby affecting a bad influence upon the cost and compactness of the apparatus.

The above-mentioned relation is varied with kind and amount of toner and setting of potential more or less, but causes a fundamental problem in the negative—negative re-charging system. To solve this problem, it is considered that a re-charger having high charging ability is used. However, since such a re-charger is expensive and requires large installation space and large power source, it is not effective. Further, although it is considered that another exposure means operated after the re-charging and before second exposure is provided for effecting uniform exposure to make the potential of the latent image for the first color developed image substantially the same as the potential of the non-development portion, since this method requires another exposure means, it is not advantageous regarding cost and compactness of the apparatus.

In the present invention, as mentioned above, the second image exposure portion also acts as uniform exposure means operated after re-charging. Therefore, according to the present invention, since any element is not added, a multi-color image forming apparatus having an advantage regarding cost and compactness can be obtained. Further, since the potential is not required to be converged by the re-charging, reasonable re-charging can be effected, and the re-charger itself is cheap and requires no great installation space, and current and voltage applied to the re-charger can be reduced.

The present invention is characterized by the second image exposure after the re-charging of the photosensitive drum. Since the construction of the multi-color image forming apparatus is the same as the conventional apparatus shown in FIG. 23, in the following explanation, FIG. 23 will be referred to, if necessary.

Figure 29:
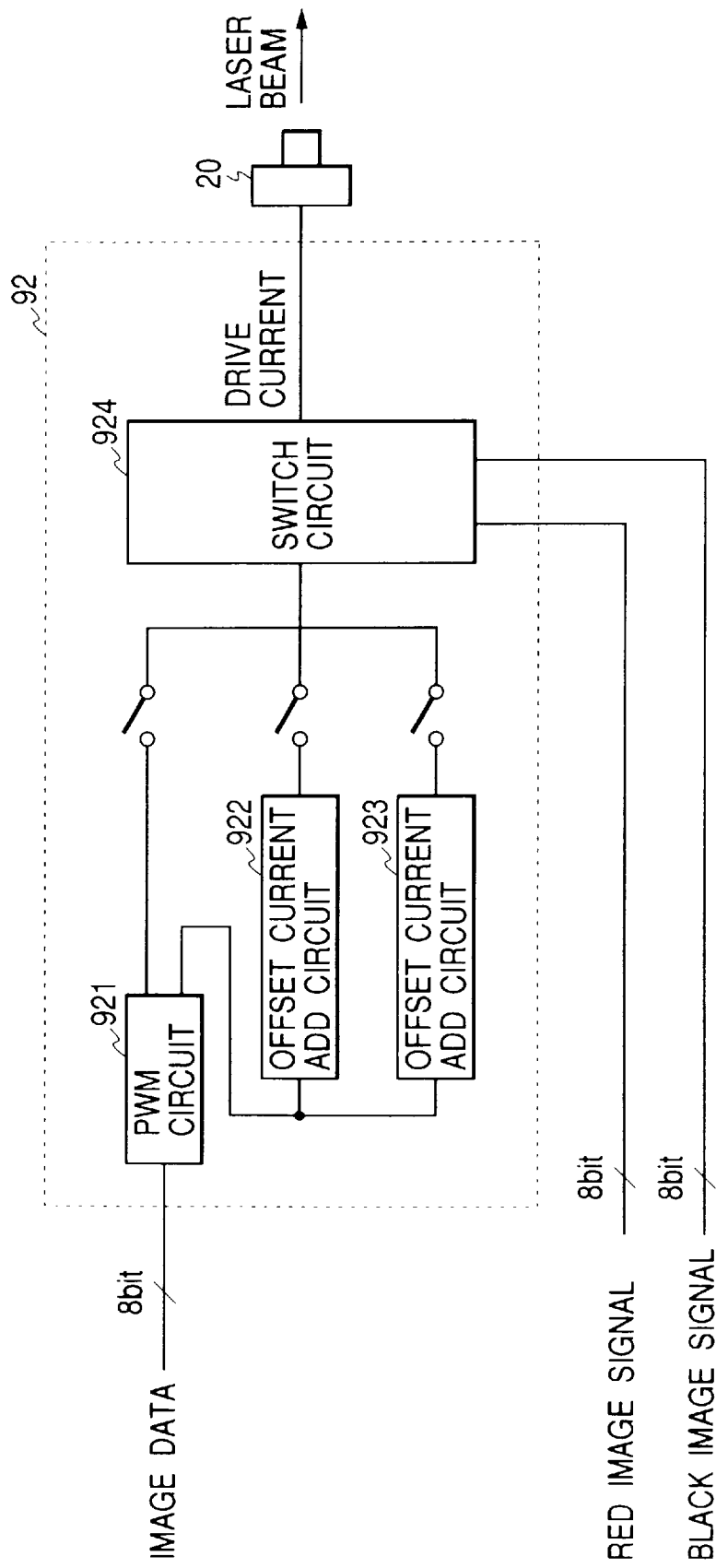
FIG. 29 is a block diagram showing a second laser drive circuit of a multi-color image forming apparatus according to an embodiment of the present invention.

FIG. 29 is a block diagram showing a second laser drive circuit of the multi-color image forming apparatus according to the present invention. In FIG. 29, the reference numeral 921 denotes a PWM circuit; 922, 923 denote offset current add circuits; and 924 denotes a switch circuit. The provision of the offset current add circuits 922, 923 is the characteristic of the invention.

When the 8-bit second image data (black image data, in this case) is inputted to the PWM circuit 921, as explained in connection with the conventional multi-color image forming apparatus shown in FIG. 23, drive current for the semi-conductor laser (20) is outputted from the PWM circuit 921. The offset current add circuits 922, 923 serve to add offset current to the drive current.

Figure 30:
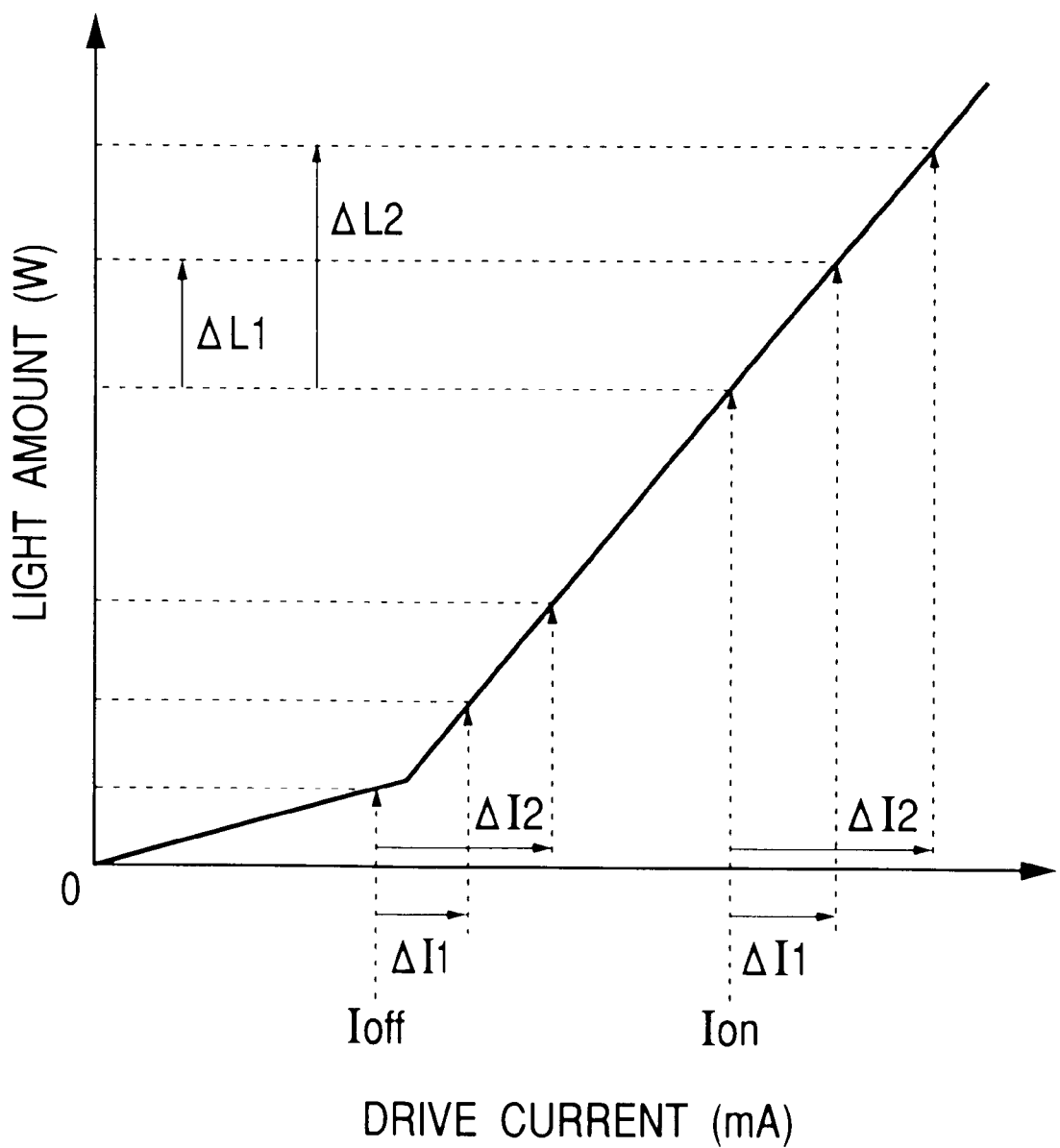
FIG. 30 is a graph showing a relation between drive current and an emitted light amount of the second laser of FIG. 29.

FIG. 30 is an I–L feature graph showing a relation between the drive current for the second laser (20) and the light amount emitted from the laser. The I–L feature graph for the laser itself is well-known and is the same as that shown in FIG. 16. The normal drive current outputted from the PWM circuit 921 is $I_{off}/I_{on}$ to which drive current $\Delta I_1$ is added by the offset current add circuit 922.

Figures 31A, 31B, 31C, 31D, 31E:
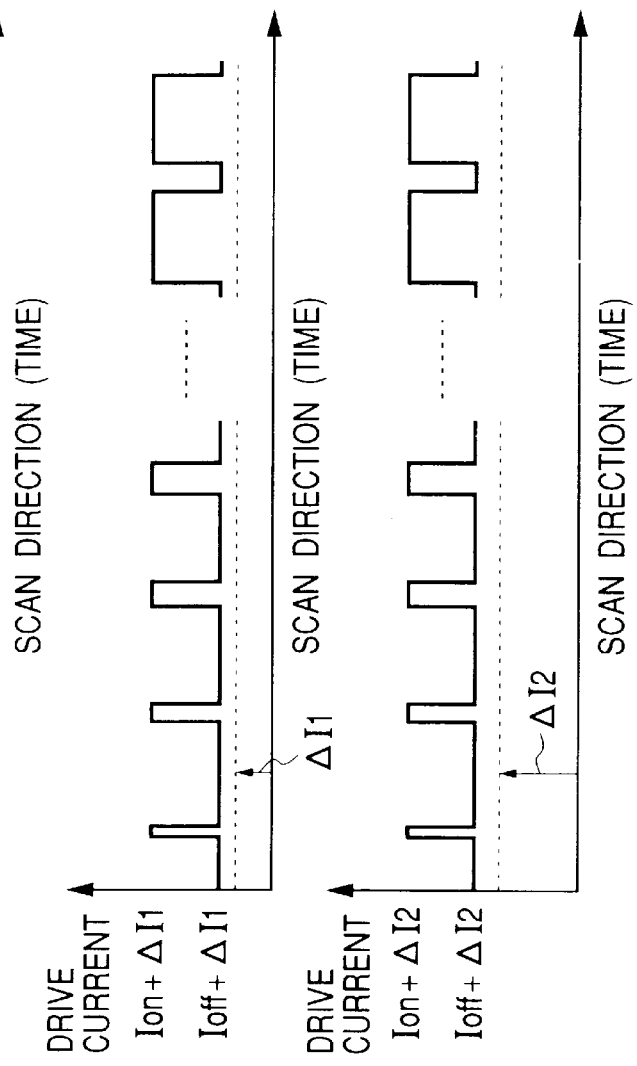
FIGS. 31A, 31B, 31C, 31D and 31E are explanatory views showing a relation between second image data and drive current of the second laser of FIG. 29.

As shown in FIGS. 31A to 31E, when the image data same as that described in connection with FIGS. 24A and 24B are sent (FIG. 31A), the laser drive signal in the PWM circuit 921 becomes as shown in FIG. 31B, and the laser drive current from the PWM circuit 921 becomes as shown in FIG. 31C. However, as shown in FIG. 31D, the laser drive current outputted from the offset current add circuit 922 becomes FIG. 31C (drive current) +$\Delta I_1$ (drive current), which is offset (increased) by an amount of $\Delta I_1$. Thus, although it is not necessary that the light amount is uniformly increased by $\Delta L_1$ from 00 hex to FF hex, illumination of laser having the light amount increased by about $\Delta L_1$ is effected.

As shown in FIGS. 30 and 31E, the other offset current add circuit 923 serves to add offset current $\Delta I_2$ (greater than $\Delta I_1$ from the offset current add circuit 922) to the normal drive current $I_{off}/I_{on}$ from the PWM circuit 921, and, similarly, although it is not necessary that the light amount is uniformly increased by $\Delta L_2$ from 00 hex to FF hex, illumination of laser having the light amount increased by about $\Delta L_2$ is effected.

The switch circuit 924 serves to send to the second laser (20) either the normal laser drive current (FIG. 31C) from the PWM circuit 921 or the laser drive current (FIG. 31D) from the offset current add circuit 922 or the laser drive current (FIG. 31E) from the offset current add circuit 923.

The first image data regarding the pixel (red image data, in this case) is inputted to the switch circuit 924 as a judge signal in order to judge whether the first color toner image was already formed or not on the target pixel area on the photosensitive drum which is to be subjected to the second exposure (i.e., whether the pixel area is the first image portion or the first non-image portion). Further, the second image data (black image data) regarding said pixel is also inputted as a judge signal in order to judge whether the presence or absence of the second image to be formed on the pixel area (second image portion or second non-image portion).

When the first image data is 00 hex and the second image data is 00 hex regarding the target pixel, the switch circuit 924 judges that the pixel area corresponds to the first non-image portion and the second non-image portion (area A on the photosensitive drum) and sends the drive current (added by $\Delta I_1$) from the offset current add circuit 922 to the laser (20). On the other hand, when the first image data is 00 hex and the second image data is not 00 hex, the switch circuit judges that the pixel area corresponds to the first non-image portion and the second image portion (area C on the photosensitive drum) and similarly sends the drive current (added by $\Delta I_1$) from the offset current add circuit 922 to the laser (20).

Further, when the first image data is not 00 hex and the second image data is 00 hex regarding the target pixel, the switch circuit 924 judges that the pixel area corresponds to the first image portion and the second non-image portion (area B1 on the photosensitive drum) and sends the normal drive current from the PWM circuit 921 to the laser (20). On the other hand, when the first image data is not 00 hex and the second image data is not 00 hex, the switch circuit judges that the pixel area corresponds to the first image portion and the second image portion (area B2 on the photosensitive drum) and sends the drive current (added by $\Delta I_2$ from the offset current add circuit 923 to the laser (20)).

Accordingly, in the portion of the photosensitive drum on which the first toner is not formed (i.e., in the first non-image portion), even when the first non-image portion becomes the non-image portion or the image portion for the second image (area A or C), the second exposure amount becomes greater than the first exposure amount. On the other hand, in the portion of the photosensitive drum on which the first toner is formed (i.e., in the first image portion), when the first image portion becomes the second non-image portion (area B1), the second exposure amount is equal to the first exposure amount, and, when the first image portion becomes the second image portion (area B2), the second exposure amount becomes greater than the first exposure amount.

The following Table 2 shows a relation between the surface areas of the photosensitive drum and the exposure amount of the second exposure.

TABLE 2

| Surface area of photosensitive drum | First image | Second image | Laser drive current | Laser light amount |
| --- | --- | --- | --- | --- |
| A | not existed | not existed | FIG. 31D + $\Delta I_1$ | Ref + $\Delta L_1$ |
| B1 | existed | not existed | FIG. 31C | Ref |
| B2 | existed | existed | FIG. 31E + $\Delta I_2$ | Ref + $\Delta L_2$ |
| C | not existed | existed | FIG. 31D + $\Delta I_1$ | Ref + $\Delta L_1$ |

In the above, for example, regarding the surface area A of the photosensitive drum, while an example that (first image data)=00 hex and (second image data)=00 hex are judged by the switch circuit 924 and the drive current from the offset current add circuit 922 is sent to the laser (20) was explained. Alternatively, if the respective data are very small (for example, 10 hex or less), the surface area of the photosensitive drum may be judged as the area A and the drive current from the offset current add circuit 922 may be sent to the laser (20). Regarding the other surface areas, the same method may be adopted.

In this way, by affording width or range of judgement to the switch circuit 924, it is possible to prevent the error of the three-color decomposing ability of the leader 18 shown in FIG. 23 and the erroneous judgement of a two-color signal generating circuit 161 (FIG. 35) of the image processing portion 22 connected to the leader 18. This is preferable.

In the present invention, by using the laser drive currents generated as mentioned above, the image forming process is performed in the following manner. The surface potential of the photosensitive drum in this case is schematically shown in FIGS. 32A to 32F.

Figure 32A:
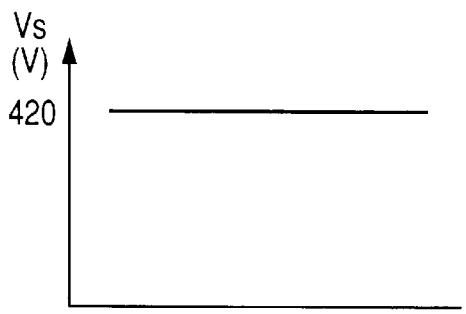
FIGS. 32A, 32B, 32C, 32D, 32E and 32F views each showing surface potential of a photosensitive drum in two-color image formation effected by the apparatus of FIG. 29.
Figure 32D:
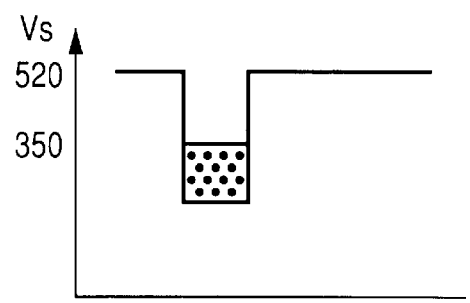
Figure 32B:
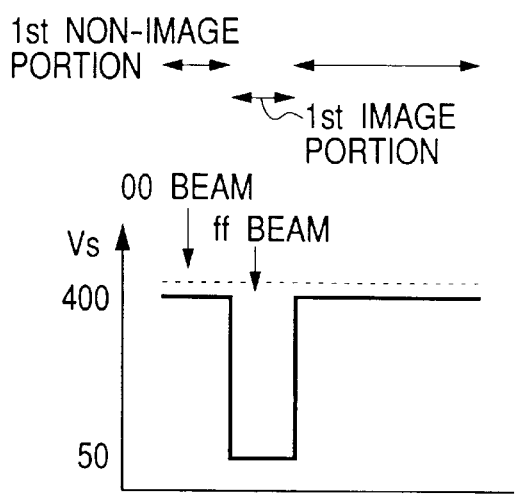

As shown in FIG. 32A, the surface of the photosensitive drum is charged to +400V, for example, by the first scorotron charger 2 shown in FIG. 23, and then, in FIG. 32B, image exposure (first exposure) 3 regarding the first image information is effected (only 00 beam and ff beam are shown) to reduce the surface potential of the first non-image portion (non-image portion of the first image) to +400V, for example, and to reduce the surface potential of the first image portion (image portion of the first image) to +50V, for example, thereby forming a first electrostatic latent image. Then, in FIG. 32C, by applying developing bias (for example, obtained by overlapping +300V DC voltage with AC voltage; DC voltage is shown by the dot and chain line) to the first developing device (two-component developing device of contact type including red toner) 4, the first image portion (exposure portion) is inversion-developed, thereby forming a red toner image.

After the first development, as shown in FIG. 32D, the photosensitive drum 1 is re-charged by the re-charger (second charger) 5. In this case, although the first non-image portion is charged to from +400V to +520V, for example, since the first image portion (on which the first red color toner image was already formed) cannot be charged sufficiently, the potential of the first image portion is increased to +350V at the most.

Figure 32E:
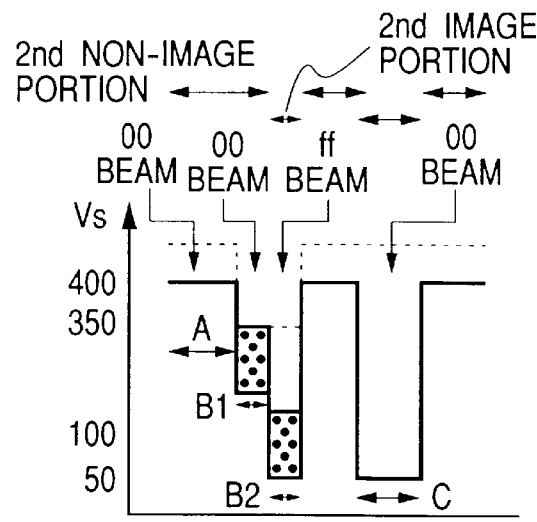
Figure 32C:
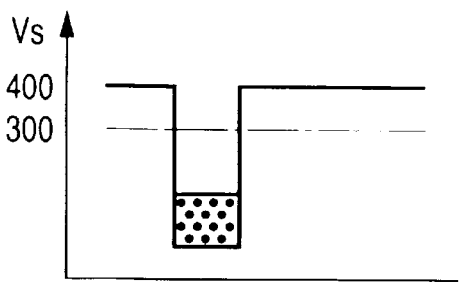

After the re-charging, as shown in FIG. 32E, although image exposure 6 (second exposure) corresponding to the second image information is effected, as mentioned above, if the first image data is 00 hex (or is very small) in the second image area, since the first toner is not adhered to the pixel area to be exposed from now, the switch circuit 924 shown in FIG. 29 sends the drive current from the offset current add circuit 922 to the laser (20), with the result that the laser (20) is driven by the drive current as shown in FIG. 31D.

Thus, in the non-image portion of the second image to which the first toner was not adhered (first non-image, second non-image portion, i.e., area A in FIG. 32E), the surface potential of the photosensitive drum which became +520V after the re-charging can be reduced to about +400V. Further, in the image portion of the second image to which the first toner was not adhered (first non-image, second image portion, i.e., area C in FIG. 32E), the surface potential of the photosensitive drum which became +520V after the re-charging can be reduced to about +50V, thereby forming a second latent image on the second image portion.

On the other hand, if the first image data is greater than 00 hex (or 10 hex) and the second image data is 00 hex (or is very small) in the second image area, since the first toner is adhered to the pixel area to be exposed from now, the switch circuit 924 shown in FIG. 29 sends the normal drive current from the PWM circuit 921 to the laser (20), with the result that the laser (20) is driven by the drive current as shown in FIG. 31C.

Thus, in the non-image portion of the second image to which the first toner was adhered (first image, second non-image portion, i.e., area B1 in FIG. 32E), since the photosensitive drum which became +350V after the re-charging is exposed with light having integrated light amount smaller than the light amount by which the second non-image portion (area A in FIG. 32E) to which the first toner was not adhered is exposed and since the light is shielded by the first toner forming the toner image on the photosensitive drum, the potential of the photosensitive drum is almost not reduced, and, thus, is maintained to +350V.

Further, if the first image data is greater than 00 hex (or 10 hex) and the second image data is greater than 00 hex (or 10 hex) in the second image area, since the first toner is adhered to the pixel area to be exposed from now, the switch circuit 924 sends the drive current from the offset current add circuit 923 to the laser (20), with the result that the laser is driven by the drive current as shown in FIG. 31E.

Thus, in the image portion of the second image to which the first toner was adhered (first image, second image portion, i.e., area B2 in FIG. 32E), although the toner shielding effect is given, since the exposure is effected with the strongest light, the surface potential of the photosensitive drum which became +350V after the re-charging can be reduced to about +100V.

The following Table 3 shows conditions of presence/absence of the first and second images on the surface areas A, B1, B2, C of the photosensitive drum and potentials in the second development.

TABLE 3

| Surface area of photosensitive drum | First image | Second image | Potential in second development |
| --- | --- | --- | --- |
| A | not existed | not existed | 400V |
| B1 | existed | not existed | 350V |
| B2 | existed | existed | 100V |
| C | not existed | existed | 50V |

In the conventional technique, although the difference in potential between the areas A and B1 during the development was 150V to make the convergence of the potential of the non-image portion difficult, in the present invention, as shown in the Table 3, such difference can be reduced to 50V ($\frac{1}{3}$ of the conventional technique), thereby improving the potential convergence. Further, in the conventional technique, although the potential of the area B2 was hard to obtained the desired contrast potential due to the shielding effect of the toner, in the present invention, the potential of the area B2 can be further reduced, thereby obtaining the contrast potential of 200V.

Figure 32F:
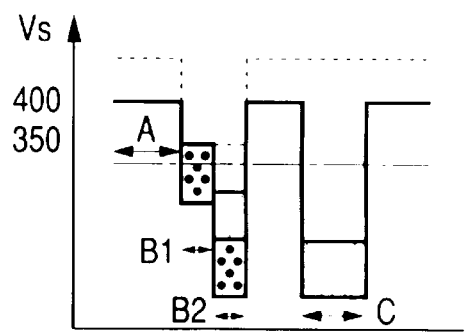

Returning to explanation of the image forming process, after the second exposure shown in FIG. 32E, as shown in FIG. 32F, by applying the developing bias (for example, obtained by overlapping +300V DC voltage with AC voltage; DC voltage is shown by the dot and chain line) to the second developing device (magnetic one-component developing device of non-contact type) 7, the second image portion (exposure portion) is inversion-developed to form the black toner image. The red and black toner images are superimposed on the photosensitive drum, thereby obtaining a multi-image.

In the illustrated embodiment, when a two-color image is formed under the condition that potential non-convergence can be reduced to the difference of about 50V and the contrast potential can be increased due to the shielding effect of the toner, the unwanted black toner is not mixed with the first color red toner image and the second black toner image is realized with sufficient density by improving the black density in the area where the red and black toners are to be mixed, thereby obtaining a sharp two-color image.

Figure 33:
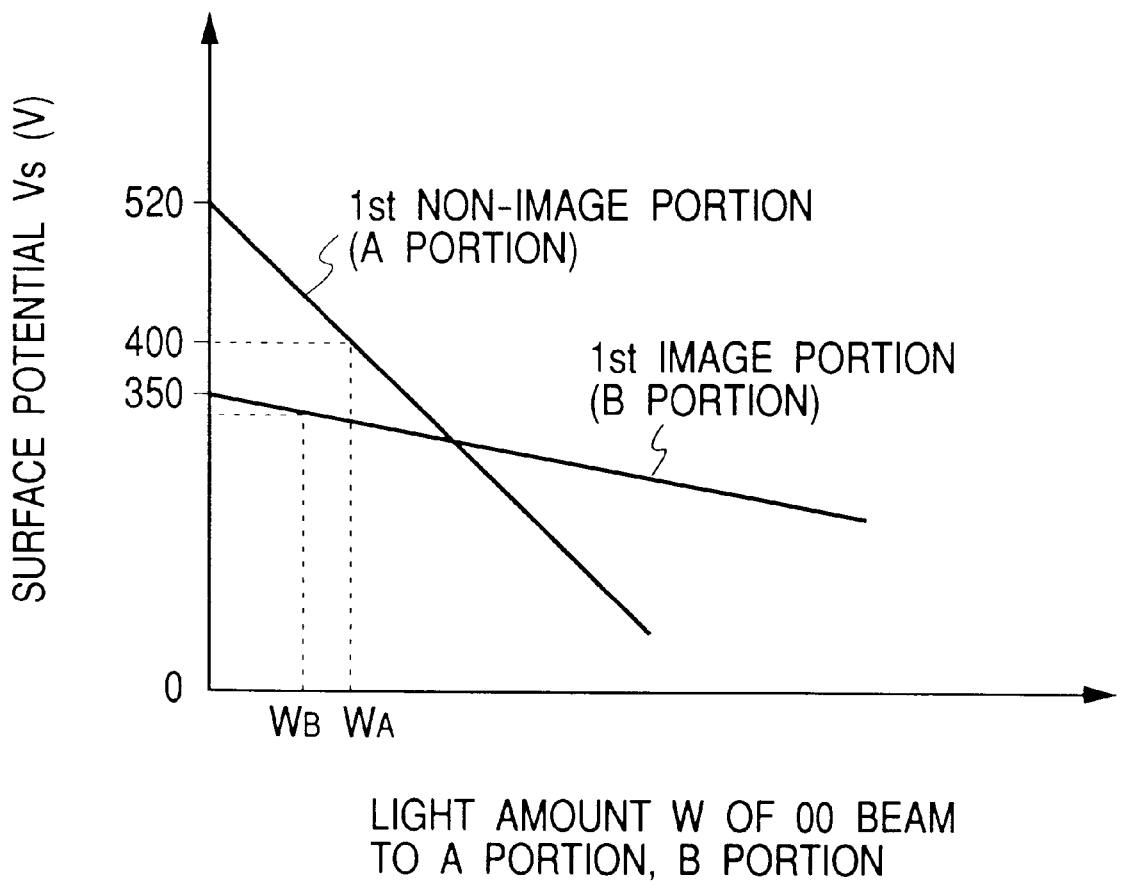
FIG. 33 is an explanatory view showing a method for determining an exposure amount of 00 beam in second exposure in the present invention.

Now, a method for determining the light amount of the second exposure after the re-charging will be described with reference to FIG. 33. FIG. 33 is a graph showing a relation between the light amount of the second exposure after the re-charging and the potentials of the first image portion (B) and the first non-image portion (A) on the photosensitive drum. In the amorphous silicone drum used in the illustrated embodiment, since it is known that the light amount to be exposed is substantially proportional to the surface potential, on the basis of this fact, the linear relation between the light amount and the surface potential (shown in FIG. 33) is calculated. The transmission (permeability) of light amount of the toner on the area B is determined to 30%.

In order to prevent the mixing of the second toner with the first toner image formed on the photosensitive drum, since the potential of the image portion (B) of the first image may be made substantially the same as the potential of the non-image portion (A) of the first image on the photosensitive drum, the light amounts for making these potentials substantially the same may be used; namely, the exposure may be effected with light amount $W_A$ for making the potential of the area A to 400V (or with light amount of 00 beam in the vicinity of the area A) and with light amount $W_B$ for making the potential of the area B to 350V (or with light amount of 00 beam in the vicinity of the area B). Of course, if necessary, the second exposure amount for exposing the area A may be greater to reduce the difference in potential.

By changing the exposure amounts of the various image portions on the photosensitive drum in accordance with the first and second images in this way, the potential non-convergence due to the re-charging which conventionally arose the problem can be improved, and the shielding effect of the toner can be made up. Further, since the second image exposure portion also has the function for effecting the uniform exposure to improve the potential non-convergence after the re-charging, unlike to the conventional technique, the additional analogue uniform exposure means is not provided, thereby making the apparatus compact and cheap.

Further, since the uniform exposure after the re-charging is performed by the digital exposure optical system for writing the image, an advantage which cannot be achieved by the analogue exposure can be obtained.

Figure 34:
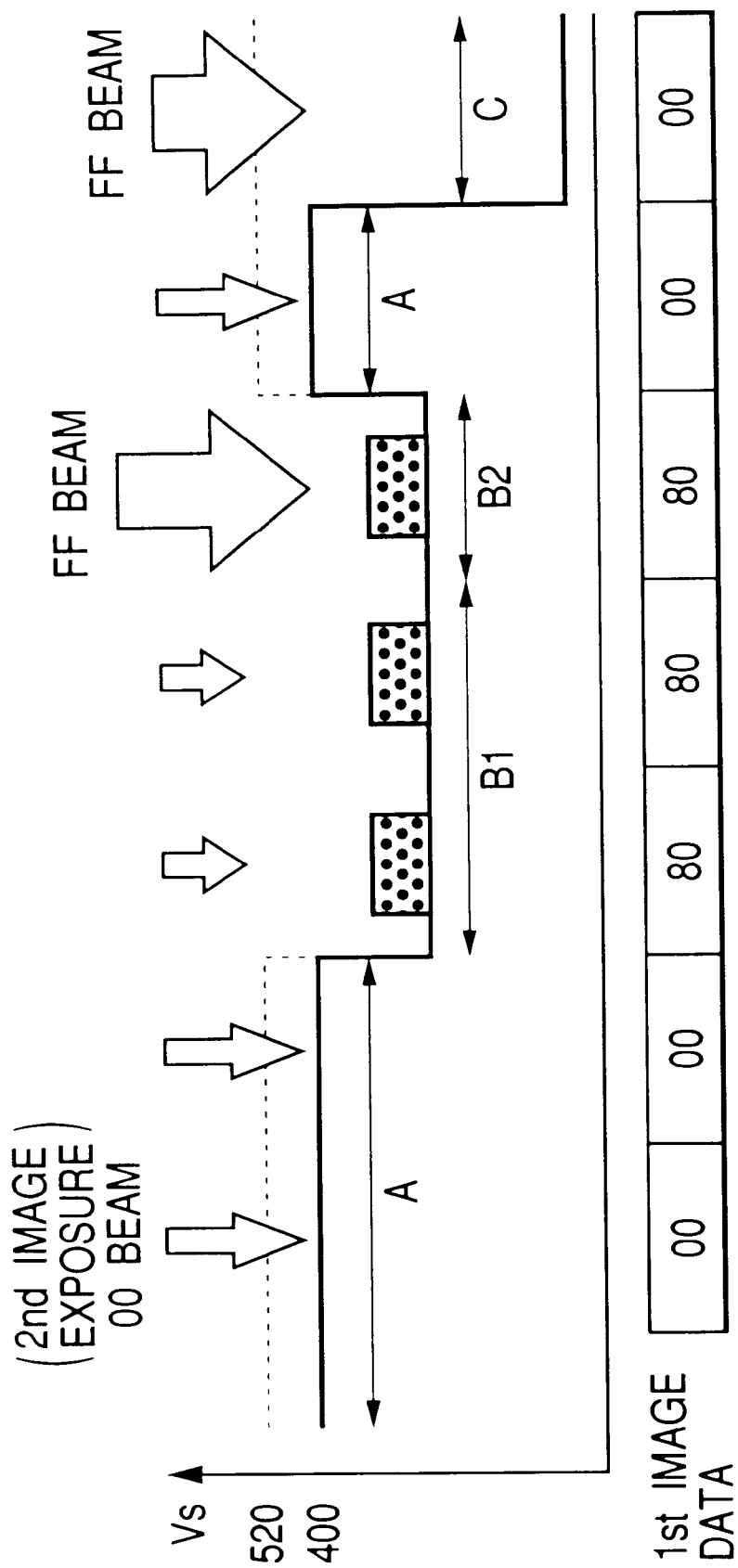
FIG. 34 is an explanatory view showing a relation between an exposure amount, surface potential of a photosensitive drum and toner adhesion in the second exposure.

FIG. 34 shows the potentials of the photosensitive drum in FIG. 32E and first toner adhering conditions for respective pixels. In FIG. 34, symbols A, B1, B2, C denote the same surface areas as those shown in FIG. 32E.

In the illustrated embodiment, since the image formation is performed by the PWM system for effecting area gradation within one pixel, in a toner adhering condition due to the first development, as shown in the area B in FIG. 34, microscopical toner adhesion is gradually widened from the center of each pixel in accordance with the image data. Thus, in the area B, a width of the toner adhesion on the photosensitive drum is greater than 00 hex of the first image data, and, if it is assumed that the first image data is 80 hex, about a half of the pixel area is covered by the toner (in the previous explanation, although the first image density in the area B was explained as ff hex, in this case, to simplify the explanation, the density is regarded as 80 hex).

In this condition, by effecting the second image exposure, the normal light amount is illuminated onto the area B1 in FIG. 34 with an exposure width in dependence upon the second image data of 00 hex, and, the light amount (normal light amount+$\Delta L_1$) is illuminated onto the area A with an exposure width in dependence upon the second image data of 00 hex. As mentioned above, the potential of the area A is reduced from +520V to +400V, for example. On the other hand, since weak light corresponding to 00 beam having a width remarkably smaller than the width of the toner adhesion is illuminated on the area B from above the adhered toner, the light is almost not passed through the toner. Such shielding effect of the toner within one pixel area cannot be expected by using the analogue uniform exposure, and this effect can be obtained by using the digital exposure as is in the present invention.

On the other hand, if the second image data is ff hex, since wide light having a width greater than the toner adhesion width by about two times is illuminated on the area B, a portion of the pixel area (of the photosensitive drum) where the toner was not adhered can be exposed. That is to say, since the exposure effected from above to toner also includes the light other than the light passing through the toner, the potential is further reduced.

In the above explanation, since the object was achieved by devising the laser drive circuit, a special image processing portion is not required. However, if necessary, an image processing portion as shown in a next ninth embodiment may be used.

(Ninth embodiment)

Figure 35:
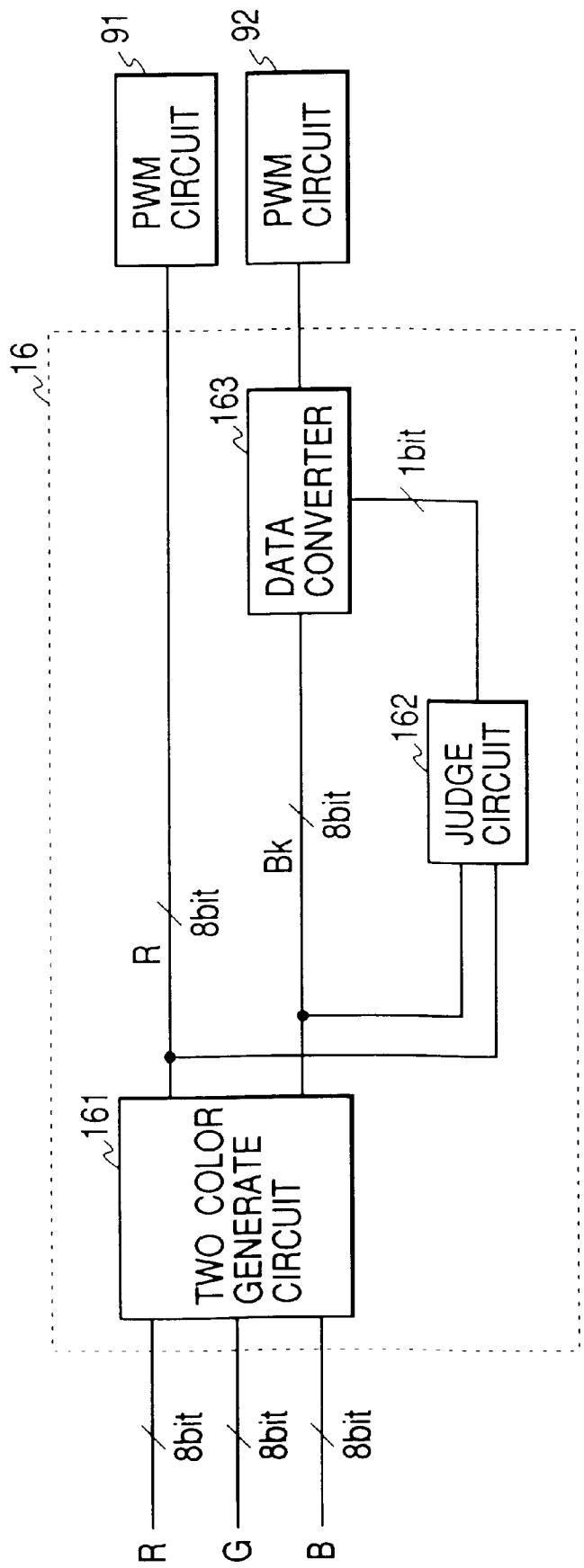
FIG. 35 is a block diagram showing an image processing portion according to another embodiment of the present invention.

FIG. 35 is a block diagram showing an image processing portion according to a ninth embodiment of the present invention. In the ninth embodiment, as shown in FIG. 35, the image processing portion 22 includes a two-color generating circuit 161, a judge circuit 162 and a data converter 163 and does not include a special laser drive circuit 23 as shown in FIG. 23. The construction of the multi-color image forming apparatus according to this embodiment is substantially the same as that of the conventional multi-color image forming apparatus shown in FIGS. 12A to 12F.

The judge circuit 162 of the image processing portion 22 serves to judge whether the first image is in the target pixel area to be subjected to the second exposure or whether the second image should be formed on that pixel area, and, two red and black signals are inputted into the judge circuit. On the basis of these signals, the judgement corresponding to the above Table 1 is effected, and the judged result is outputted to the data converter 163. The data converter 163 serves to appropriately amplify the black data (second image data) among the two color signals from the two-color generating circuit 161 on the basis of the judgement of the judge circuit. Regarding the amplifying method, 0 to 20 hex may be merely added to the input image data, and such matter belongs to design modification.

In the illustrated embodiment, as is in the first embodiment, the data is converted so that, when the laser is driven by the converted black image data signal, the light amount of the laser has the relation shown in the Table 2.

Figure 36:
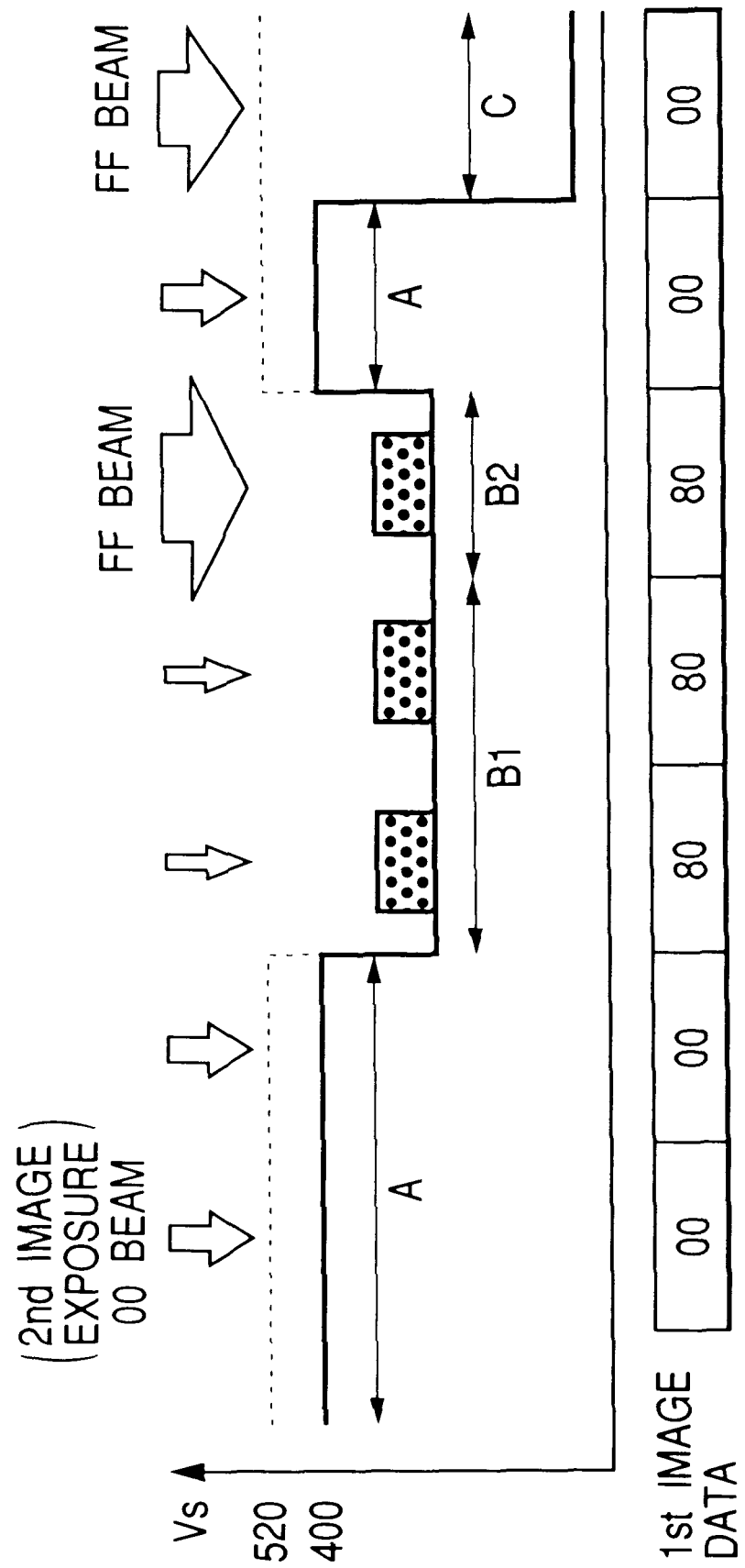
FIG. 36 is an explanatory view showing a relation between an exposure amount, surface potential of a photosensitive drum and toner adhesion in the second exposure according to the another embodiment.

FIG. 36 shows the potentials of the photosensitive drum and the first toner adhesion conditions in this case. Comparing FIG. 36 with FIG. 34, in FIG. 34, in order to increase the light amount of the second exposure amount, the laser drive current is increased, as described in connection with FIG. 30. To the contrary, in the illustrated embodiment, in order to increase the light amount of the second exposure amount, the image data for each pixel is increased by adding to it the amount of about 0 to 20 hex, as mentioned above, with the result that the light amount is increased by lengthening the laser emitting time for each pixel.

In the ninth embodiment, when the image formation similar to the eighth embodiment is performed, the same advantage as the eighth embodiment can be obtained. However, in the eighth embodiment, the second exposure is effected by increasing the light intensity; whereas, in the ninth embodiment, since the second exposure is effected by increasing the laser emitting time, the advantage obtained by the digital exposure regarding the light shielding effect of the toner is slightly reduced, particularly regarding a small portion of the first image data, i.e., narrow width portion of the first toner adhesion in one pixel area.

(Tenth Embodiment)

In a tenth embodiment of the present invention, in lieu of the scorotron charger explained regarding the conventional technique, a corotron charger is used as the re-charger (second charger). Although the scorotron charger generally has better potential convergence than the corotron charger, in this tenth embodiment, it is possible to use the corotron charger having poor potential convergence as the re-charger.

Since the corotron charger has no grid, it has a simple and cheap, and, since charges generated by the discharge wire does not flow into the grid, the corotoron charger has good charging ability. Further, since there is no grid, there arises no problem that any grid near the photosensitive drum is smudged by the toner.

Figure 37:
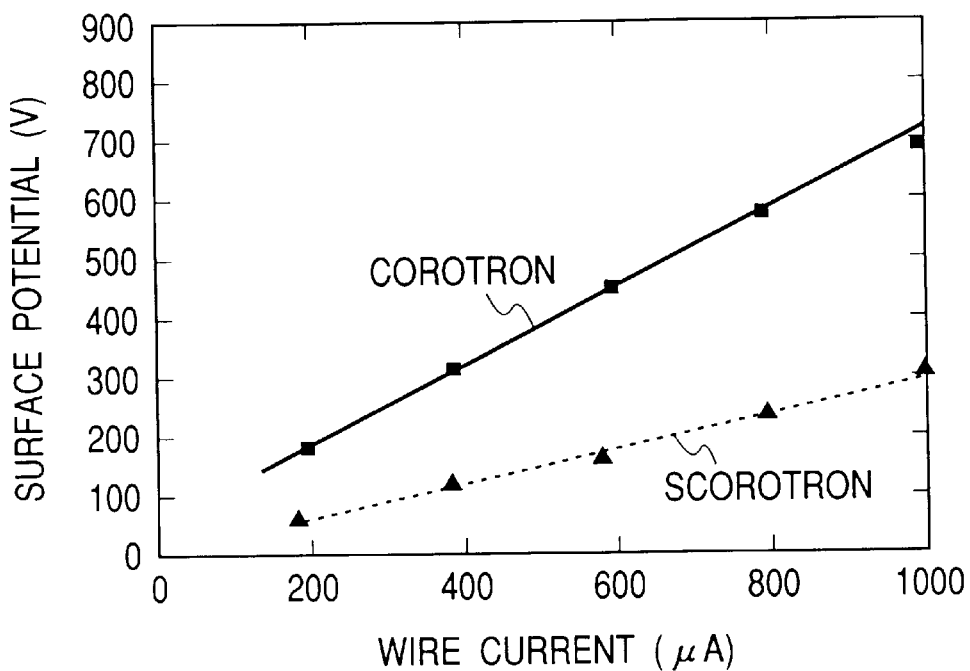
FIG. 37 is a graph showing a relation between drum surface potential and wire current applied to a corotron charger and a scorotron charger.
Figure 38:
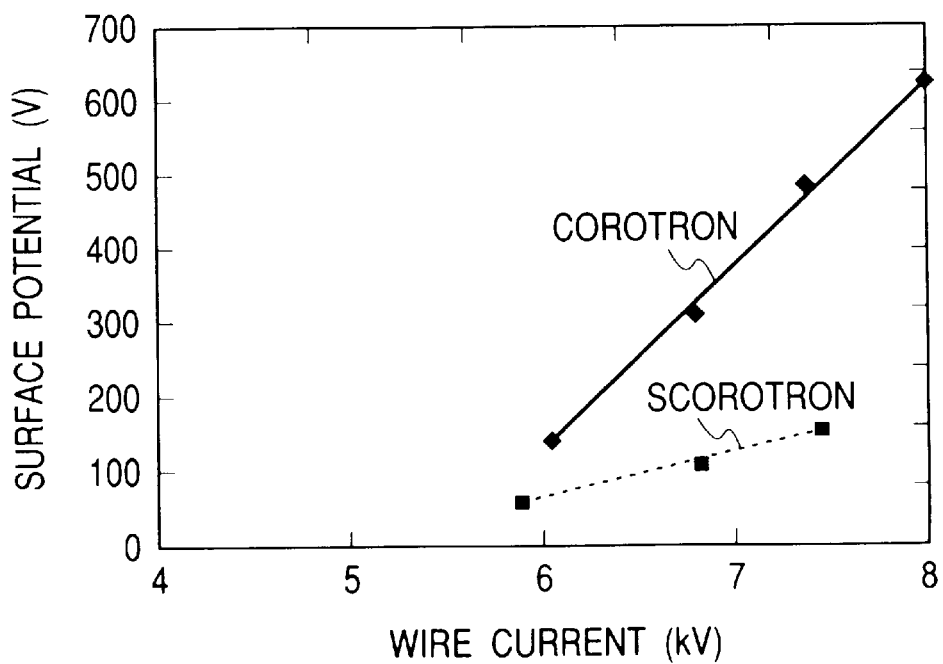
FIG. 38 is a graph showing a relation between drum surface potential and wire voltage applied to the corotron charger and the scorotron charger.

FIG. 37 is a graph showing a relation between wire current (current applied to the wire) and drum surface potential regarding both the corotron charger and the scorotron charger under the same condition, and FIG. 38 is a graph showing a relation between wire voltage and the drum surface potential regarding both the corotron charger and the scorotron charger under the same condition. From FIGS. 37 and 38, it can be seen that, when the corotron charger is used, smaller current and voltage is required to obtain the same drum surface potential in comparison with the scorotron charger; namely, it can be seen that the corotron charger has better charging ability. However, since the corotron charger has no potential convergence effect as shown in FIG. 27, when the first image portion tries to be charged to desired potential during the re-charging, the potential of the first non-image portion also increased. Thus, it was considered that the corotron charger could not be used as the re-charger.

However, in the present invention, since a good two-color image can be obtained without converging the potentials of the first image portion and the first non-image portion by the re-charging, the corotron charger can be as the re-charger.

Since the image forming process of the tenth embodiment is the same as that of the eighth embodiment, explanation thereof will be omitted. However, since the difference in potential between the first image portion and the first non-image portion after the re-charging differs from the difference caused when the scorotron charger is used, the setting for the re-charging and the setting for the second exposure must be changed.

As mentioned above, while the present invention was explained in connection with the aforementioned embodiments, the present invention can be embodied by using arrangement other than those in the aforementioned embodiments.

For example, in the above embodiments, while an example that toner having positive polarity is inversion-developed by using a-Si (amorphous silicone) photosensitive member charged positively was explained, an OPC drum may be used as the photosensitive member. In this case, since the OPC drum is normally charged negatively (negative or minus polarity), toner having negative polarity may be used.

Regarding superimpose of different color images, while an example that the second toner image is superimposed onto the first toner image regarding each pixel was explained, in this case, the provision of a mechanism for registering or aligning two color toner image with each other is required. To simplify the arrangement, it may be designed so that superimpose of two color in each pixel area is not controlled and the image processing portion can obtain desired image density and a desired red/black color-mixed image by microscopically preventing mixture between the red image and the black image and by macroscopically using surface-area gradation.

Further, regarding the method for forming the electrostatic latent image, while an example that one pixel is divided into 256 gradations by using the PWM system was explained, a digital latent image having the fewer number of gradations may be formed. In this case, to provide the gradation, a well-known error diffusion method or Tessar method having high resolving power more than 600 dpi may be used.

Although a pre-transfer charger for registering charge amounts of two color images on the photosensitive drum before the transferring was not fully described, it is known that the charge amounts can be controlled with alternate current or direct current by using a corotron charger or a scorotron charger. Of course, it is also known that separating and transferring of two color images (which will be performed later) can be performed easily by reducing the potential of the photosensitive member by also using pre-transfer exposure means (not shown). Further, regarding pre-exposure for removing electricity from the photosensitive member in the last process, it is necessary that ghost of the previous image is not generated by appropriately selecting wave length and intensity.

In the above-mentioned embodiments, while an example that two color images are formed on the photosensitive member during one revolution of the photosensitive member was explained, the present invention is not limited to such an example, but, one color image may be formed during one rotation of the photosensitive member and two color images may be formed while the photosensitive member is being rotated by two revolutions. Further, the present invention can be applied to not only the two-color image forming apparatus but also a multi-color (three or more colors) image forming apparatus.

In any case, any combinations thereof may be applied to the present invention.

(Eleventh Embodiment)

An eleventh embodiment of the present invention utilizes the apparatus of the eighth embodiment. Since the principles of the latent image formation and development are the same as those in the eighth embodiment, explanation thereof will be omitted. Further, in the eleventh embodiment, since the operation of the second laser drive circuit is the same as that in the eighth embodiment, explanation thereof will be omitted.

In the illustrated embodiment, after the signal for checking the presence/absence of image are generated by the method explained in connection with FIG. 29, the image forming process is controlled on the basis of such signals by using a control CPU of the image forming apparatus, a ROM for storing control sequence and a control substrate in the following manner.

Figure 40A:
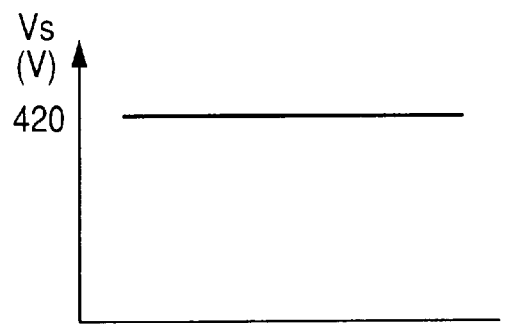
FIG. 40A, 40B and 40C are schematic views each showing surface potential of a photosensitive drum in mono-color image formation according to an embodiment of the present invention.
Figure 40B:
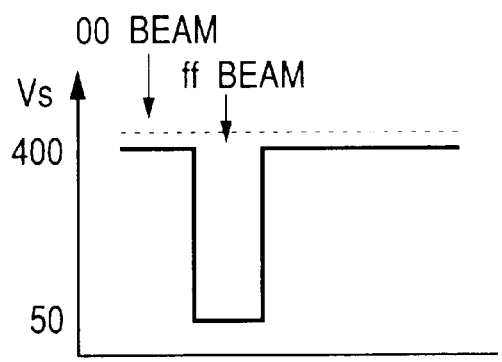
Figure 40C:
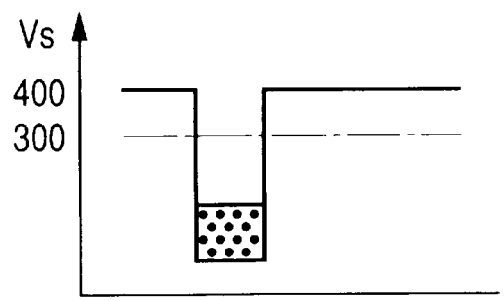

First of all, when the signal representing the presence/absence of the image is "0", since a black mono-color mode is selected by the user or the red image is not included in the original 15 rested on the original support 14 (FIG. 23) or the red image is not included in a portion which will be image-formed from now, the first charger 2, first image exposure portion 3 and first developing device (for red) 4 are not operated, and the second charger (re-charger) 5, second image exposure portion 6 and second developing device (for black) 7 are operated to form a black mono-color image. FIGS. 40A to 40C schematically show surface potentials in this case.

First of all, by operating the second charger 5 (if necessary, the first charger 2 may be operated simultaneously), the surface of the photosensitive drum 1 is charged to +420V, for example, as shown in FIG. 40A. Then, as shown in FIG. 40B, the image exposure (6) is effected (only 00 beam and ff beam are shown). In this case, as mentioned above, since the signal representing the presence/absence of the image is "0", the switch circuit 924 (FIG. 29) sends the drive current from the PWM circuit 921 to the laser 20, with the result that the laser is driven by the normal drive current as shown in FIG. 31C.

After the image exposure (6), the surface potential of the non-image portion of the photosensitive drum is reduced to +400V, for example, and the potential of the image portion is reduced to +50V, for example, thereby forming the electrostatic latent image on the image portion. Then, as shown in FIG. 40C, by applying developing bias (for example, obtained by overlapping +300V DC voltage with AC voltage; DC voltage is shown by the dotted line) to the second developing device (one-component magnetic developing device of non-contact type) 7, the image portion (exposure portion) is inversion-developed, thereby forming a black toner image.

On the other hand, if the signal representing the presence/absence of the image is "1", since a red/black multi-color mode is selected by the user or the red image is included in the original 15 rested on the original support 14 or the red image is included in a portion which will be image-formed from now, the first charger 2, first image exposure portion 3 and first developing device (for red) 4 are operated to form a red toner image, and the second charger (re-charger) 5, second image exposure portion 6 and second developing device (for black) 7 are also operated to form a black toner image in a superimposed fashion regarding the red toner image. FIGS. 41A to 41F schematically show surface potentials of the photosensitive drum in this case.

Figure 41A:
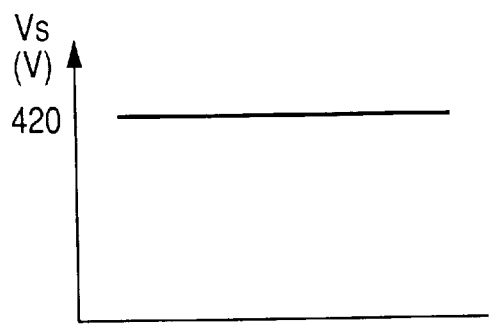
FIGS. 41A, 41B, 41C, 41D, 41E and 41F are schematic views each showing surface potential of a photosensitive drum in two-color image formation according to the embodiment of the present invention.

First of all, the surface of the photosensitive drum 1 is charged to +420V, for example, as shown in FIG. 41A. Then, as shown in FIG. 41B, the image exposure (first exposure 3) corresponding to the first image information is effected (only 00 beam and ff beam are shown) to reduce the surface potential of the first non-image portion to +400V, for example, and to reduce the potential of the first image portion to +50V, for example, thereby forming the first latent image. Then, as shown in FIG. 41C, by applying developing bias (for example, obtained by overlapping +300V DC voltage with AC voltage) to the first developing device 4, the first image portion (exposure portion) is inversion-developed, thereby forming a red toner image.

Figure 41D:
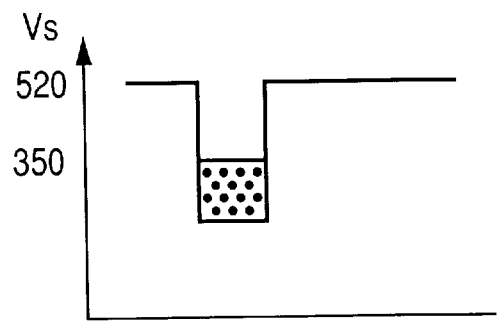
Figure 41B:
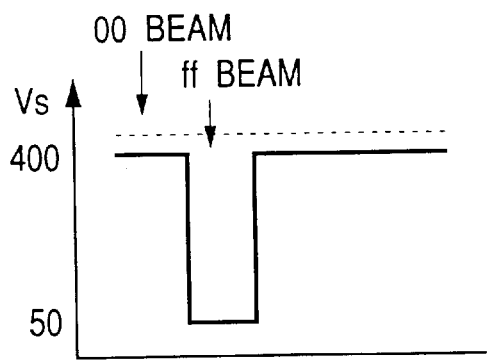
Figure 41E:
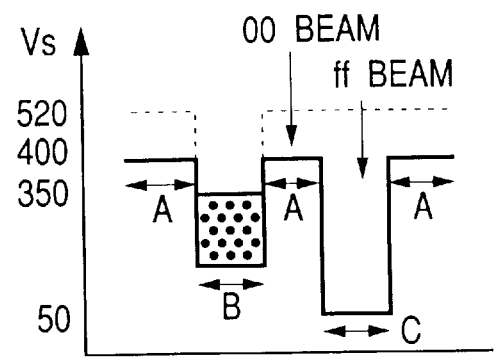
Figure 41C:
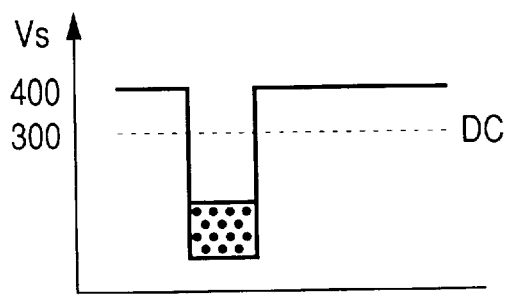

The steps shown in FIGS. 41A to 41C are the same as the steps shown in FIGS. 40A to 40C, except for formation of the red toner image in lieu of the black toner image.

After the first development, as shown in FIG. 41D, the photosensitive drum 1 is re-charged by the second charger 5 to charge the first non-image portion to +400V to +520V, for example. However, since the first image portion (on which the first color red toner image was already formed) is not charged sufficiently, the potential of the first image portion is merely +350V, for example.

After the re-charging, as shown in FIG. 41E, the image exposure (second exposure) 6 corresponding to the second image information is effected. In this case, as mentioned above, since the signal representing the presence/absence of the image is "1", the switch circuit 924 (FIG. 29) sends the drive current from the offset current add circuit 922 to the laser 20, with the result that the laser is driven by the drive current (added by $\Delta I_1$) as shown in FIG. 31D.

Thus, in the non-image portion of the second image (on the photosensitive drum) where the first toner was not adhered (area A in FIG. 41E), i.e., in the first non-image, second non-image portion, since the integrated light amount within one pixel area is greater than the light amount for exposing the non-image portion of FIG. 40B (and accordingly, FIG. 41B), the surface potential of the photosensitive drum which became +520V can be reduced to about +400V.

On the other hand, in the image portion of the second image (on the photosensitive drum) where the first toner was adhered (area B in FIG. 41E), i.e., in the first image, second non-image portion although the exposure is effected with light having the integrated light amount within one pixel area greater than the light amount for exposing the non-image portion of FIG. 40B (and accordingly, FIG. 41B), since the light is shielded by the first color red toner image already formed on the photosensitive drum, the potential of the photosensitive drum is not almost reduced and is maintained to +350V.

As mentioned above, in the conventional technique, although the difference in potential between the first non-image portion A and the first image portion B was great (170V) to make the convergence of the potential of the non-image portion difficult, in the present invention, due to the second image exposure, such difference can be reduced to 50V (=400V—350V) (about ⅓ of the conventional technique).

Returning to explanation of the image forming process, due to the second exposure of FIG. 41E, in the image portion of the second image (on the photosensitive drum) where the first toner was not adhered (area C in FIG. 41E), i.e., in the first non-image, second image portion, since the integrated light amount within one pixel area is greater than the light amount for exposing the image portion of FIG. 40B (FIG. 41B), the surface potential of the photosensitive drum can be reduced to about +50V.

Figure 41F:
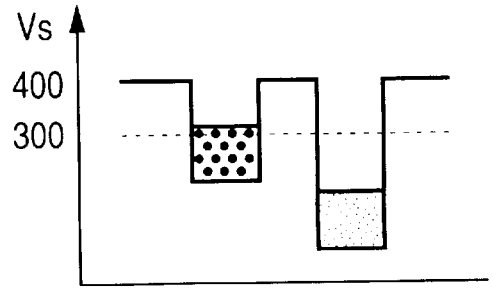

Thereafter as shown in FIG. 41F, by applying the developing bias (for example, obtained by overlapping +300V DV voltage with AC voltage) to the second developing device (magnetic one-component developing device of non-contact type) 7, the second image portion (exposure portion) is inversion-developed to form the black toner image. The red and black toner images are superimposed on the photosensitive drum, thereby obtaining a multi-image.

In the illustrated embodiment, as mentioned above, when a two-color image is formed under the condition that potential non-convergence can be reduced to the difference of about 50V, the unwanted black toner is not mixed with the first color red toner image and the second black toner image is realized, thereby obtaining a sharp two-color image.

Figure 42:
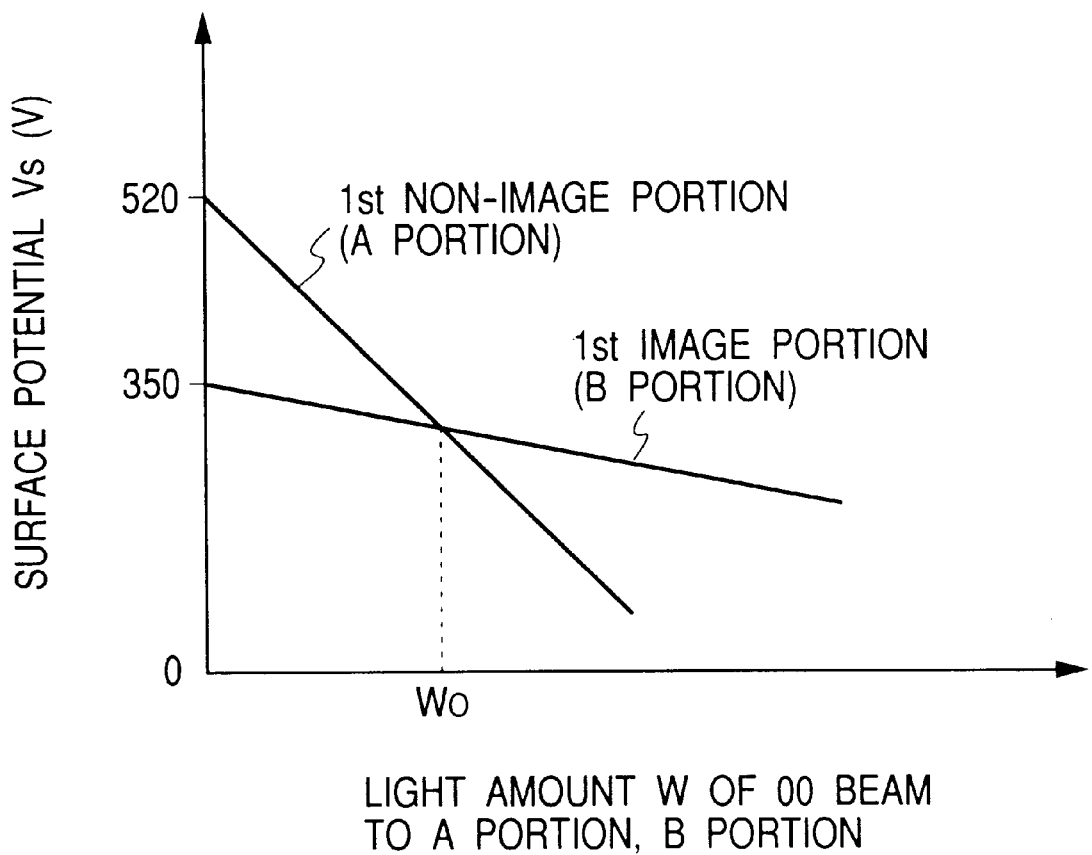
FIG. 42 is an explanatory view showing a method for determining an exposure amount of 00 beam in second exposure in the present invention.

Now, a method for determining the light amount of 00 beam of the second exposure will be described with reference to FIG. 42. FIG. 42 is a graph showing a relation between the light amount of the second exposure after the re-charging and the potentials of the first image portion (B) and the first non-image portion (A) on the photosensitive drum. In the amorphous silicone drum used in the illustrated embodiment, since it is known that the light amount to be exposed is substantially proportional to the surface potential, on the basis of this fact, the linear relation between the light amount and the surface potential (shown in FIG. 42) is calculated. The transmission (permeability) of light amount of the toner on the area B is determined to 30%.

In order to prevent the mixing of the second toner with the first toner image, since the potential of the first image portion (B) may be made substantially the same as the potential of the first non-image portion (A) on the photosensitive drum by the exposure after the re-charging, the light amounts for making these potentials substantially the same may be used; namely, the exposure may be effected with light amount $w_0$ for making the potentials substantially the same (or with light amount of 00 beam in the vicinity thereof). Of course, if necessary, the second exposure amount may be greater to reduce the difference in potential, or the condition for the re-charging may be changed.

In the illustrated embodiment, as mentioned above, since the mono-color mode (black mode by the second image, in this case) and the multi-color mode (two-color red/black mode by the first and second images, in this case) of the image forming process are judged and, when the multi-color mode is judged, the image formation is performed with the exposure amount of the second image greater than the exposure amount of the image in the mono-color mode, the potential non-convergence due to the re-charger (which arose the problem in the conventional technique) can be improved. Further, since the second image exposure portion also has the function for effecting the uniform exposure to improve the potential non-convergence after the re-charging, unlike to the conventional technique, the additional analogue uniform exposure means is not provided, thereby making the apparatus compact and cheap.

Further, since the uniform exposure after the re-charging is performed by the digital exposure optical system for writing the image, an advantage which cannot be achieved by the analogue exposure can be obtained, as will be described hereinbelow.

Figure 43:
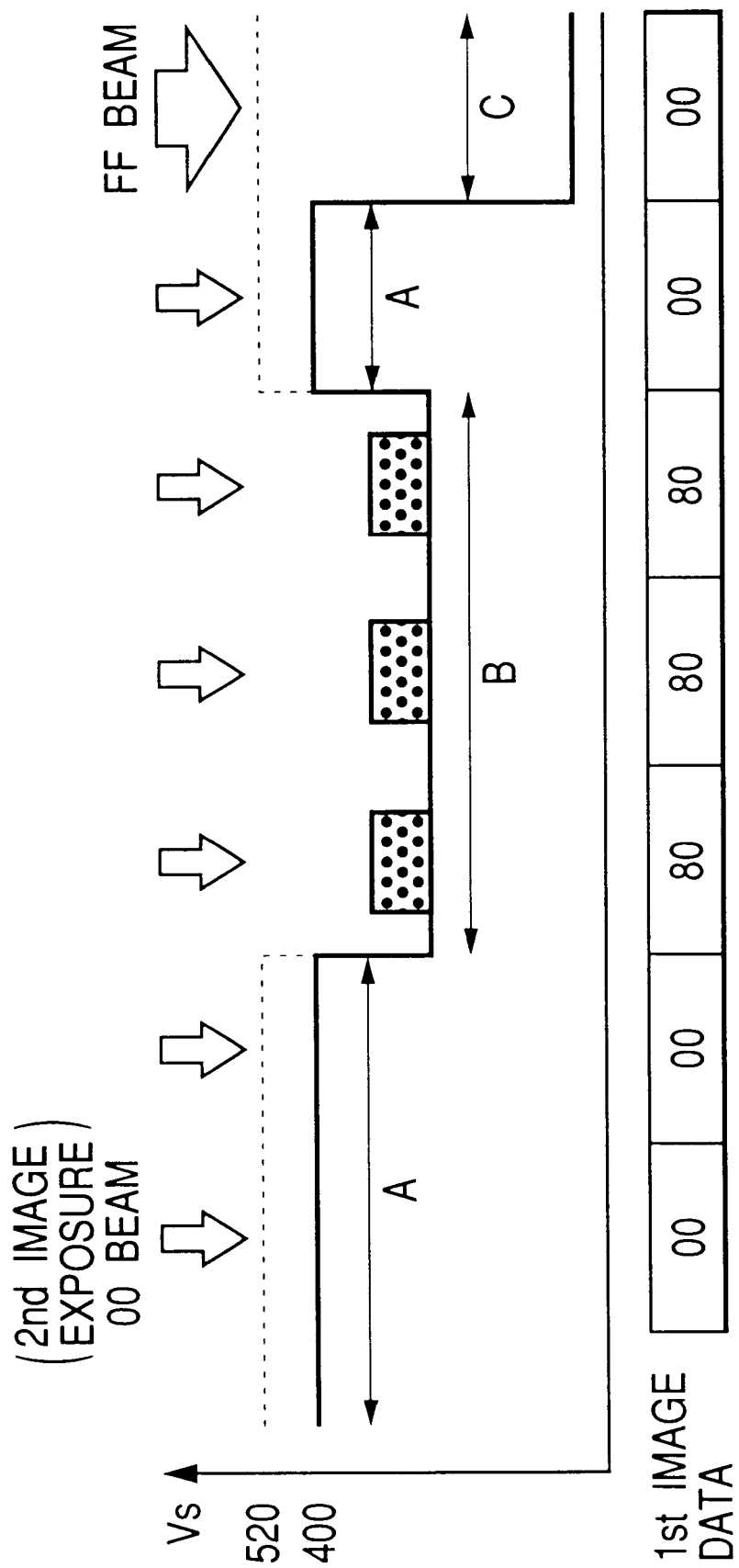
FIG. 43 is an explanatory view showing a relation between an exposure amount, surface potential of a photosensitive drum and first toner adhesion in the second exposure according to an embodiment of the present invention.

FIG. 43 shows the potentials of the photosensitive drum in FIG. 41E and first toner adhering conditions for respective pixels. In FIG. 43, symbols A, B and C denote the same surface areas as those shown in FIG. 41E.

In the present invention, since the image formation is performed by the PWM system for effecting area gradation within one pixel, in a toner adhering condition on the photosensitive drum due to the first development, as shown in the area B in FIG. 43, microscopical toner adhesion is gradually widened from the center of each pixel in accordance with the pixel data. If it is assumed that the first image data is 80 hex, about a half of the pixel area is covered by the toner (in the previous explanation, although the first image density in the area B was explained as ff hex, in this case, to simplify the explanation, the density is regarded as 80 hex).

In this condition, by effecting the second image exposure, both the area A and the area B in FIG. 43 are exposed with an exposure width in dependence upon the second image data of 00 hex and with exposure amount greater than that shown in FIG. 40B. In this case, as mentioned above, the potential of the area A is reduced from +520V to +400V, for example. On the other hand, since weak light having a width smaller than the width of the toner adhesion is illuminated on the area B from above the adhered toner, the light is almost not passed through the toner.

Such shielding effect of the toner within one pixel area cannot be expected by using the analogue uniform exposure, and this effect can be obtained by using the digital exposure as is in the present invention.

In the above explanation, since the object was achieved by devising the laser drive circuit, a special image processing portion is no required. However, if necessary, an image processing portion as shown in a next twelfth embodiment may be used.

(Twelfth Embodiment)

Figure 44:
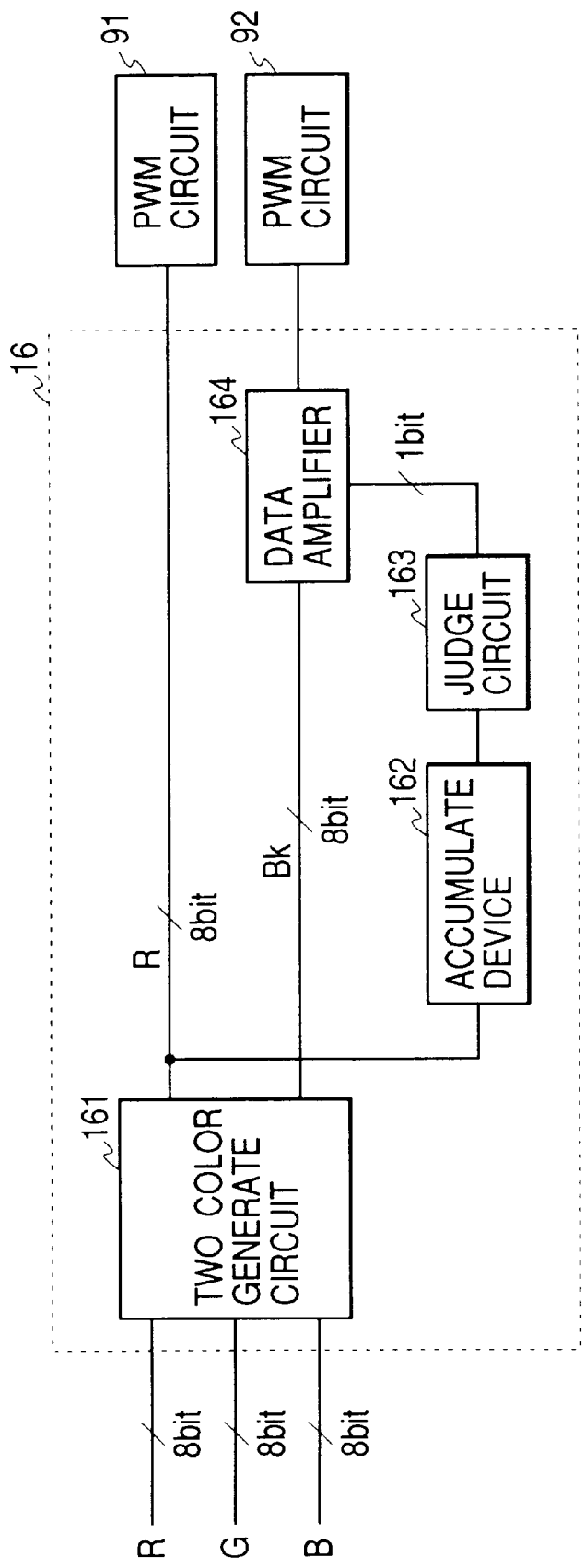
FIG. 44 is a block diagram showing an image processing portion according to another embodiment of the present invention.

FIG. 44 is a block diagram showing an image processing portion according to a twelfth embodiment of the present invention. In the twelfth embodiment, as shown in FIG. 44, the image processing portion 22 includes a two-color generating circuit 161, an accumulate circuit 162, a judge circuit 163 and a data amplifier 164 and does not include a special laser drive circuit as shown in FIG. 29. The construction of the multi-color image forming apparatus according to this embodiment is substantially the same as that of the conventional multi-color image forming apparatus shown in FIG. 23.

The data amplifier 164 of the image processing portion 22 is a circuit for amplifying the data by a so-called look-up table system and serves to appropriately amplify the black data (second image data) among two color signals from the two-color generating circuit 161, on the basis of the judged result (for example, the judgement of the presence of the red first image) from the judge circuit 163. Regarding the amplifying method, 0 to 20 hex may be merely added to the input image data, and such matter may be determined to improve the potential non-convergence.

Figure 45:
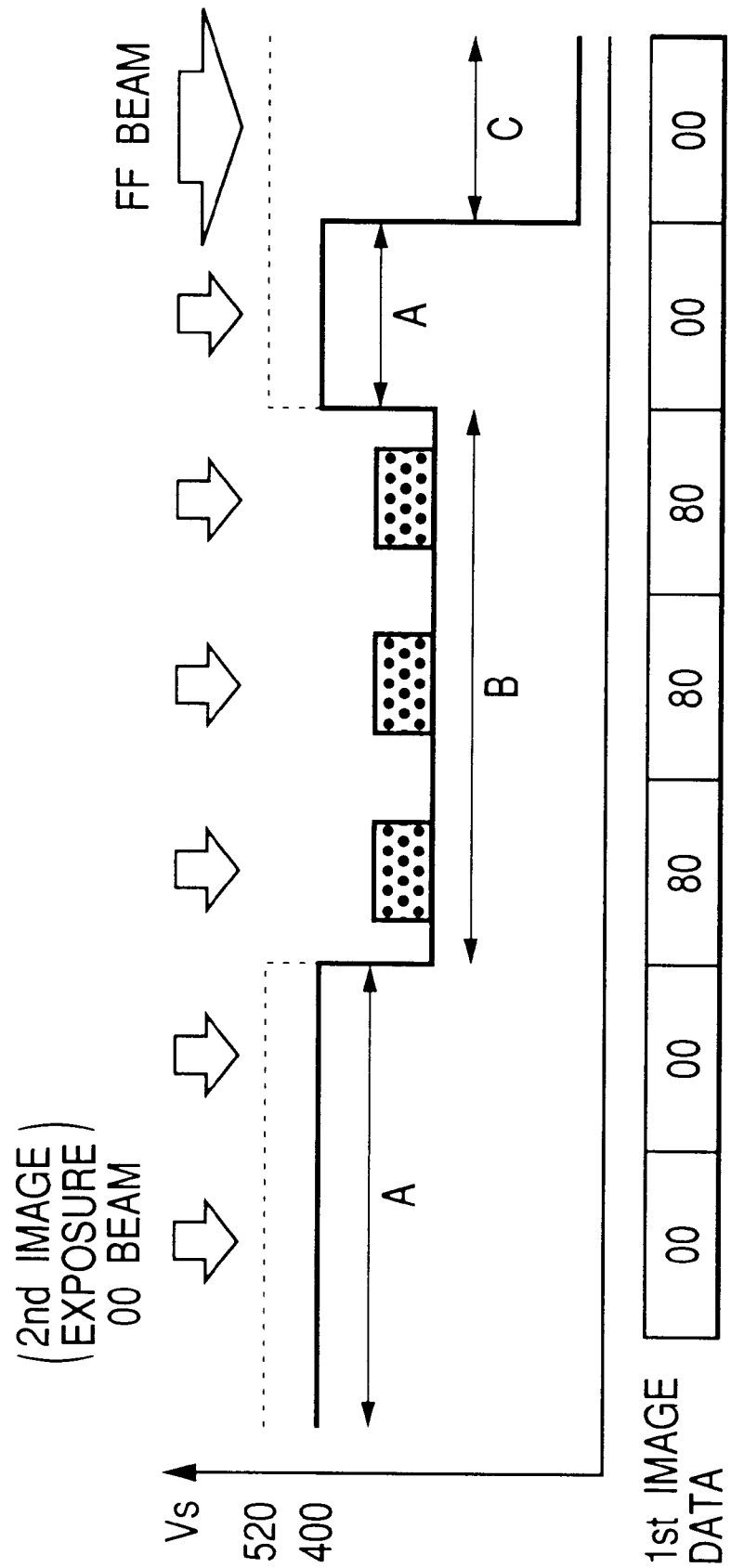
FIG. 45 is an explanatory view showing a relation between an exposure amount, surface potential of a photosensitive drum and first toner adhesion in the second exposure according to another embodiment of the present invention.

FIG. 45 shows the potentials of the photosensitive drum and the first toner adhesion conditions in this case. Comparing FIG. 45 with FIG. 43, in FIG. 43, in order to increase the light amount of the second exposure amount, the laser drive current is increased, as described in connection with FIG. 30. To the contrary, in the illustrated embodiment, in order to increase the light amount of the second exposure amount, the image data for each pixel is increased by adding to it the amount of about 0 to 20 hex, as mentioned above, with the result that the light amount is increased by lengthening the laser emitting time for each pixel.

In the twelfth embodiment, when the image formation similar to the eleventh embodiment is performed, the same advantage as the eleventh embodiment can be obtained. However, in the eleventh embodiment, the second exposure is effected by increasing the light intensity; whereas, in the twelfth embodiment, since the second exposure is effected by increasing the laser emitting time, the advantage obtained by the digital exposure regarding the light shielding effect of the toner (described in connection with FIG. 43) is slightly reduced, particularly regarding a small portion of the first image data, i.e., narrow width portion of the first toner adhesion in one pixel area.

(Thirteenth Embodiment)

In a thirteenth embodiment of the present invention, in lieu of the scorotron charger explained regarding the conventional technique, a corotron charger is used as the re-charger (second charger) 5. Although the scorotron charger generally has better potential convergence than the corotron charger, in this embodiment, it is possible to use the corotron charger having poor potential convergence as the re-charger.

As is in the aforementioned embodiment, since the corotron charger has no grid, it has a simple and cheap, and, since charges generated by the discharge wire does not flow into the grid, the corotron charger has good charging ability. Further, since there is no grid, there arises no problem that any grid near the photosensitive drum is smudged by the toner. However, since the corotron charger has no potential convergence effect, when the first image portion tries to be charged to desired potential during the re-charging, the potential of the first non-image portion also increased. Thus, it was considered that the corotron charger could not be used as the re-charger.

However, in the illustrated embodiment, since a good two-color image can be obtained without converging the potentials of the first image portion and the first non-image portion by the re-charging, the corotron charger can be as the re-charger.

Although the image forming process of the twelfth embodiment is omitted, since the difference in potential between the first image portion and the first non-image portion after the re-charging differs from the difference caused when the scorotron charger is used, the setting for the re-charging and the setting for the second exposure must be changed appropriately.

As mentioned above, while the present invention was explained in connection with the aforementioned embodiments, the present invention can be embodied by using arrangement other than those in the aforementioned embodiments.

For example, in the above embodiments, while an example that toner having positive polarity is inversion-developed by using a-Si (amorphous silicone) photosensitive member charged positively was explained, an OPC drum may be used as the photosensitive member. In this case, since the OPC drum is normally charged negatively (negative or minus polarity), toner having negative polarity may be used.

Regarding superimpose of different color images, while an example that the second toner image is superimposed onto the first toner image regarding each pixel was explained, in this case, the provision of a mechanism for registering or aligning two color toner image with each other is required. To simplify the arrangement, it may be designed so that superimpose of two color in each pixel area is not controlled and the image processing portion can obtain desired image density and a desired red/black color-mixed image by microscopically preventing mixture between the red image and the black image and by macroscopically using surface-area gradation.

Further, regarding the method for forming the electrostatic latent image, while an example that one pixel is divided into 256 gradations by using the PWM system was explained, a digital latent image having the fewer number of gradations may be formed. In this case, to provide the gradation, a well-known error diffusion method or Tessar method having high resolving power more than 600 dpi may be used.

Although a pre-transfer charger for registering charge amounts of two color images on the photosensitive drum before the transferring was not fully described, it is known that the charge amounts can be controlled with alternate current or direct current by using a corotron charger or a scorotron charger. Of course, it is also known that separating and transferring of two color images (which will be performed later) can be performed easily by reducing the potential of the photosensitive member by also using pre-transfer exposure means (not shown). Further, regarding pre-exposure for removing electricity from the photosensitive member in the last process, it is necessary that ghost of the previous image is not generated by appropriately selecting wave length and intensity.

In the above-mentioned embodiments, while an example that two color images are formed on the photosensitive member during one revolution of the photosensitive member was explained, similar to the other embodiments, the present invention is not limited to such an example. But, one color image may be formed during one revolution of the photosensitive member and two color images may be formed while the photosensitive member is being rotated by two revolutions. Further, the present invention can be applied to not only the two-color image forming apparatus but also a multi-color (three or more colors) image forming apparatus.

In any case, any combinations thereof may be applied to the present invention.

As mentioned above, according to the illustrated embodiments when a multi-color image is obtained by repeating the charging of the image bearing member, digital exposure of each pixel and development, since the integrated light amount per unit pixel for exposing the non-image portion and the integrated light amount per unit pixel for exposing the image portion are made greater in the first color exposure wherein the toner image was not formed than in the second and other exposures wherein one or more toner images were formed, the potential non-convergence can be improved by the re-charging from above the toner image. Accordingly, during the second and other developments, the previously formed image is not distorted and the color mixing and density unevenness of the second and other toner images can be prevented, thereby obtaining a high quality multi-color image. Further the second image exposure portion also has the function for improving the potential non-convergence during the second image exposure, the additional analogue uniform exposure means is not required, thereby making the apparatus cheap and compact.

What is claimed is:

1. An image forming apparatus in which plural color toner images are formed on a photosensitive member and are collectively transferred onto a transfer material, comprising:

a first charge means for charging said photosensitive member;

a digital optical means for exposing an image information on said photosensitive member;

a first developing means for inversion-developing a first latent image formed on said photosensitive member with a first toner;

a second charge means for charging said photosensitive member developed by said first developing means;

a second developing means for developing a second latent image formed on said photosensitive member by exposing a second image information onto the charged photosensitive member with the second toner; and a transfer means for collectively transferring a first toner image and second toner image formed on said photosensitive member onto a transfer material;

wherein an exposure amount of each pixel at a non-image portion in a second exposure is made substantially equal to or greater than an exposure amount at a non-image portion in a first exposure.

2. An image forming apparatus in which plural color toner images are formed on a photosensitive member and are collectively transferred onto a transfer material, comprising:

a first charging device for charging said photosensitive member;

a digital optical system for exposing an image information on said photosensitive member;

a first developing device for inversion-developing a first latent image formed on said photosensitive member with a first toner;

a second charging device for charging said photosensitive member developed by said first developing device;

a second developing device for developing a second latent image formed on said photosensitive member by exposing a second image information onto the charged photosensitive member with second toner, and a transfer device for collectively transferring a first toner image and second toner image formed on said photosensitive member onto a transfer material;

wherein in second exposure, an exposure amount of a non-image portion is selected so that an integrated amount of the exposure amount of each pixel becomes greater than an exposure amount at a non-image portion of a first image.

3. An image forming apparatus according to claim 2, wherein, in the second exposure, an exposure amount at an image portion is selected so that an integrated amount of the exposure amount of each pixel becomes smaller in an image portion of a first image than in a non-image portion thereof.

4. An image forming apparatus according to claim 1 or 2, wherein second and other charging operations for said photosensitive member are effected so that a surface potential of a non-image portion in a previous process becomes greater than surface potential of an image portion, regarding an absolute value.

5. An image forming apparatus in which plural color toner images are formed on a photosensitive member and are collectively transferred onto a transfer material, comprising:

a first charging device for charging said photosensitive member;

a digital optical system for exposing image information on said photosensitive member;

a first developing device for inversion-developing a first latent image formed on said photosensitive member with a first toner;

a second charging device for charging said photosensitive member developed by said first developing device;

a second developing device for developing a second latent image formed on said photosensitive member by exposing a second image information onto the charged photosensitive member with a second toner; and a transfer device for collectively transferring a first toner image and a second toner image formed on said photosensitive member onto a transfer material;

wherein in the second exposure, an exposure amount at a non-image portion is selected so that an integrated amount of the exposure amount of each pixel becomes greater than an exposure amount at a non-image portion of a first image, and wherein in the second exposure, an exposure amount at an image portion is selected so that an integrated amount of the exposure amount of each pixel becomes greater in an image portion of the first image than in the non-image portion of the first image.

6. An image forming apparatus according to claim 5, wherein a difference in light amount between the first and second non-image portions is substantially the same as a difference in light amount between the first and second image portions.

7. An image forming apparatus according to claim 5 or 6, wherein a charged amount of said photosensitive member is selected so that a second surface potential of said photosensitive member becomes greater than a first surface potential of said photosensitive member, regarding an absolute value.

8. An image forming apparatus according to claim 5 or 6, wherein a charged amount of said photosensitive member is selected so that a surface potential of the non-image portion of the first image becomes greater than at least a surface potential of the image portion of the first image, regarding an absolute value.

9. An image forming apparatus in which plural color toner images are formed on a photosensitive member and are collectively transferred onto a transfer material, comprising:

a first charging device for charging said photosensitive member;

a digital optical system for exposing image information on said photosensitive member;

a first developing device for inversion-developing a first latent image formed on said photosensitive member with a first toner;

a second charging device for charging said photosensitive member developed by said first developing device;

a second developing device for developing a second latent image formed on said photosensitive member by exposing a second image information onto the charged photosensitive member with second toner; and a transfer device for collectively transferring a first toner image and second toner image formed on said photosensitive member onto a transfer material;

wherein in second exposure, an exposure amount of each pixel at a non-image portion is substantially equal to or greater than an exposure amount of a non-image portion in first exposure, and, in the second exposure, an exposure amount of each pixel at an image portion is substantially equal to or greater than an exposure amount of an image portion in the first exposure.

10. An image forming apparatus according to claim 9, wherein a difference between first and second exposure amounts is determined by a first image information.

11. An image forming apparatus according to claim 10, wherein, in development of a second image, potential of a non-image portion of the second image is greater than potential of a non-image portion of a first image, regarding an absolute value.

12. An image forming apparatus according to claim 9, wherein a difference in light amount between the first and second non-image portions is substantially the same as a difference in light amount between the first and second image portions.

13. An image forming apparatus according to claim 10 or 12, wherein surface potential of said photosensitive member obtained by second charging is selected so that potential of a non-image portion of a first image becomes greater than potential of an image portion of the first image, regarding an absolute value.

* * * * *

UNITED STATES PATENT AND TRADEMARK OFFICE
CERTIFICATE OF CORRECTION

PATENT NO. : 5,983,045

DATED : November 9, 1999

INVENTORS : Kazuo Suzuki, et al.

It is certified that error appears in the above-identified patent and that said Letters Patent is hereby corrected as shown below:

COVER PAGE

Under [56] References Cited, Foreign Patent Documents, "05197253" should read -- 5-197253 --.

COLUMN 1

Line 55, "as" should be deleted.

COLUMN 3

Line 35, "is arisen" should read --increases--.

COLUMN 6

Line 11, "potential" should read --potentials--.

COLUMN 8

Line 47, "affecting" should read --causing--.

COLUMN 9

Line 18, "nversion-developed" should read --inversion-developed--.

UNITED STATES PATENT AND TRADEMARK OFFICE
CERTIFICATE OF CORRECTION

PATENT NO. : 5,983,045

DATED : November 9, 1999

INVENTORS : Kazuo Suzuki, et al.

It is certified that error appears in the above-identified patent and that said Letters Patent is hereby corrected as shown below:

COLUMN 10

Line 11, "arise" should read --give rise to--; and
   Line 65, "as" should read --used as--.

COLUMN 13

Line 9, "superimpose" should read --superimposition--;
   Line 15, "superimpose" should read --superimposition--;
   Line 16, "color" should read --colors--; and
   Line 24, "alternate" should read --alternating--.

COLUMN 15

Line 9, "affecting" should read --causing--;
   Line 51, "pJ" should read --$\mu$J--.

COLUMN 17

Line 19, "has a" should read --is--; and
   Line 44, "as" should read --used as--.

COLUMN 18

Line 14, "As is in" should read --In--.

UNITED STATES PATENT AND TRADEMARK OFFICE
CERTIFICATE OF CORRECTION

PATENT NO. : 5,983,045

DATED : November 9, 1999

INVENTORS : Kazuo Suzuki, et al.

It is certified that error appears in the above-identified patent and that said Letters Patent is hereby corrected as shown below:

COLUMN 19

Line 29, "circuit" should read --circuits--.

COLUMN 20

Line 29, "cases," should read --case,--;
  Line 55, "the first image, image" should read --in the case the first image, the image--.

COLUMN 21

Line 19, "is existed" should read --exists--;
  Line 27, "is not" should be deleted;
  Line 28, "existed" (first occurrence) should read --does not exist-- and "(existed)" should read --exists--.

COLUMN 22

Line 6, "be existed" should read --exist--.

COLUMN 24

Line 11, "the both" should read --both--;
  Line 21, "affecting" should read --causing--.

UNITED STATES PATENT AND TRADEMARK OFFICE
CERTIFICATE OF CORRECTION

PATENT NO. : 5,983,045

DATED : November 9, 1999

INVENTORS : Kazuo Suzuki, et al.

It is certified that error appears in the above-identified patent and that said Letters Patent is hereby corrected as shown below:

COLUMN 25

Line 42, "judge whether" should read --determine--.

COLUMN 26

Line 2, "$\Delta l_2$" should read --$\Delta l_2)$--;
Line 3, "(20))." should read --(20).--;
Line 34, "while" should be deleted; and
Line 35, "are" should read --is--.

COLUMN 28

Line 25, "the potential of the area B2 was hard to" should read --it is hard to adjust the potential of the area B2 so as to obtain--.

COLUMN 29

Line 14, "arose" should read --gave rise to--; and
Line 18, "to" should be deleted.

COLUMN 30

Line 62, "has a" should read --is--.

UNITED STATES PATENT AND TRADEMARK OFFICE
CERTIFICATE OF CORRECTION

PATENT NO. : 5,983,045

DATED : November 9, 1999

INVENTORS : Kazuo Suzuki, et al.

It is certified that error appears in the above-identified patent and that said Letters Patent is hereby corrected as shown below:

COLUMN 31

Line 34, "arrangement" should read --arrangements--;
   Line 44, "superimpose" should read --the superimposition--;
   Line 50, "superimpose" should read --superimposition--; and
   Line 67, "alternate" should read --alternating--.

COLUMN 32

Line 34, "are" should read --is--.

COLUMN 35

Line 3, "arose" should read --gave rise to--; and
   Line 7, "to" should be deleted.

COLUMN 36

Line 38, "has a" should read --is--;
   Line 39, "charges" should read --charge--; and
   Line 52, "as" should read --used as--.

UNITED STATES PATENT AND TRADEMARK OFFICE
CERTIFICATE OF CORRECTION

PATENT NO. : 5,983,045

DATED : November 9, 1999

INVENTORS : Kazuo Suzuki, et al.

It is certified that error appears in the above-identified patent and that said Letters Patent is hereby corrected as shown below:

<u>COLUMN 37</u>

```
Line 7,  "superimpose" should read --the superimposition--;
Line 11, "image" should read --images--;
Line 13, "superimpose of two color" should read
  --superimposition of two colors--; and
Line 30, "alternate" should read --alternating--.
```

Signed and Sealed this

Seventeenth Day of October, 2000

Attest:

Q. TODD DICKINSON

*Attesting Officer*    *Director of Patents and Trademarks*